(12) United States Patent
Jenks et al.

(10) Patent No.: US 11,784,951 B1
(45) Date of Patent: Oct. 10, 2023

(54) DETERMINING CONTEXTUALLY RELEVANT APPLICATION TEMPLATES ASSOCIATED WITH ELECTRONIC MESSAGE CONTENT

(71) Applicant: Amazon Technologies, Inc., Seattle, WA (US)

(72) Inventors: Jessica Nicole Jenks, Seattle, WA (US); Samuel Scott Gigliotti, Seattle, WA (US); Catherine Ann Hendricks, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 16/706,114

(22) Filed: Dec. 6, 2019

Related U.S. Application Data

(63) Continuation of application No. 14/855,340, filed on Sep. 15, 2015, now Pat. No. 10,505,875.

(60) Provisional application No. 62/050,713, filed on Sep. 15, 2014.

(51) Int. Cl.
*H04L 51/10* (2022.01)
*G06F 40/186* (2020.01)
*H04L 51/48* (2022.01)
*H04L 51/58* (2022.01)

(52) U.S. Cl.
CPC ............ *H04L 51/10* (2013.01); *G06F 40/186* (2020.01); *H04L 51/48* (2022.05); *H04L 51/58* (2022.05)

(58) Field of Classification Search
CPC ......... H04L 51/10; H04L 51/28; H04L 51/38; G06F 17/248; G06F 40/186
USPC .......................................... 709/206
See application file for complete search history.

(56) References Cited

U.S. PATENT DOCUMENTS

| | | | |
|---|---|---|---|
| 10,505,875 B1 | 12/2019 | Jenks et al. | |
| 2005/0114781 A1* | 5/2005 | Brownholtz | G06F 3/0482 715/733 |
| 2009/0298476 A1* | 12/2009 | Choi | G06Q 10/107 455/412.2 |
| 2010/0138784 A1 | 6/2010 | Colley | |
| 2011/0185025 A1* | 7/2011 | Cherukuri | H04L 12/1813 709/206 |
| 2012/0004926 A1 | 1/2012 | Samar et al. | |
| 2012/0030194 A1 | 2/2012 | Janin | |
| 2012/0239761 A1* | 9/2012 | Linner | G06F 40/279 709/206 |
| 2012/0303452 A1* | 11/2012 | Xue | H04L 51/02 705/14.49 |
| 2013/0031196 A1* | 1/2013 | Yan | H04L 51/16 709/206 |
| 2014/0243028 A1* | 8/2014 | Colombo | H04L 51/063 455/466 |
| 2014/0278675 A1 | 9/2014 | DeLuca et al. | |
| 2014/0288990 A1 | 9/2014 | Moore et al. | |
| 2014/0337751 A1* | 11/2014 | Lim | G06F 40/279 715/744 |
| 2015/0317836 A1 | 11/2015 | Beaurepaire et al. | |
| 2015/0365448 A1 | 12/2015 | Stifelman et al. | |
| 2016/0308794 A1* | 10/2016 | Kim | H04L 51/02 |

\* cited by examiner

*Primary Examiner* — Brian Whipple
(74) *Attorney, Agent, or Firm* — Eversheds Sutherland (US) LLP

(57) ABSTRACT

Systems, methods, and computer-readable media are disclosed for determining contextually relevant application templates associated with electronic message content.

16 Claims, 56 Drawing Sheets

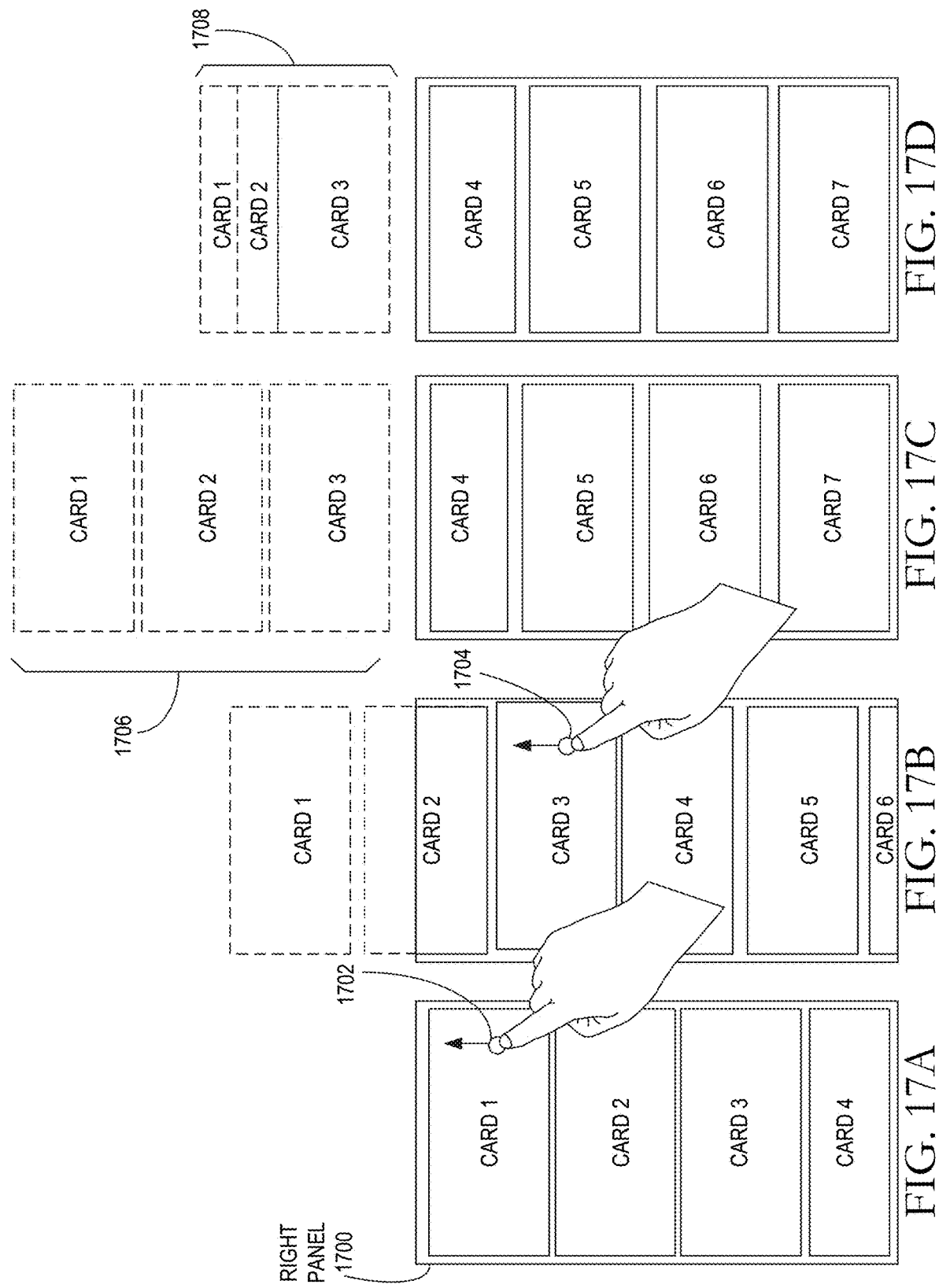

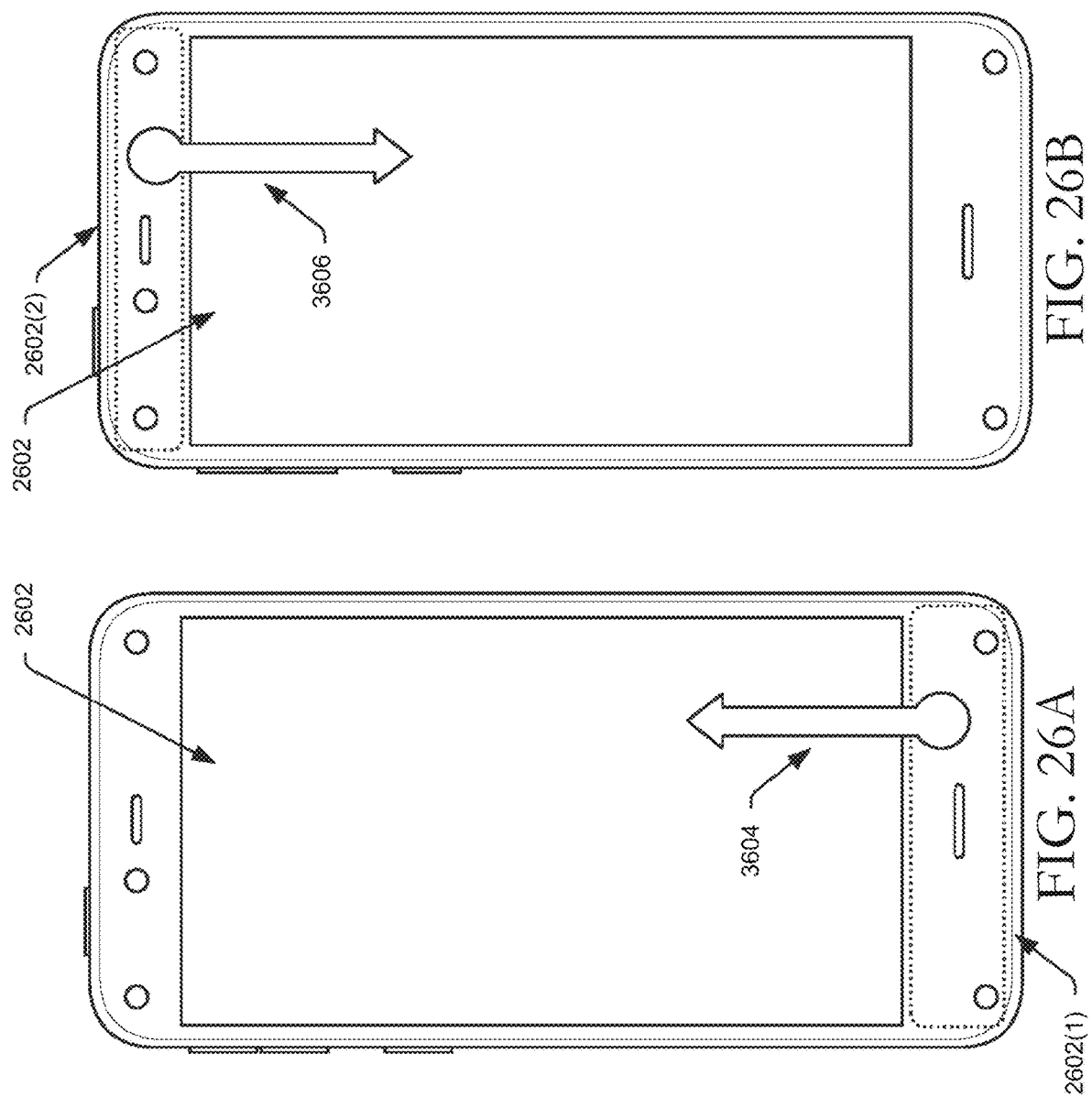

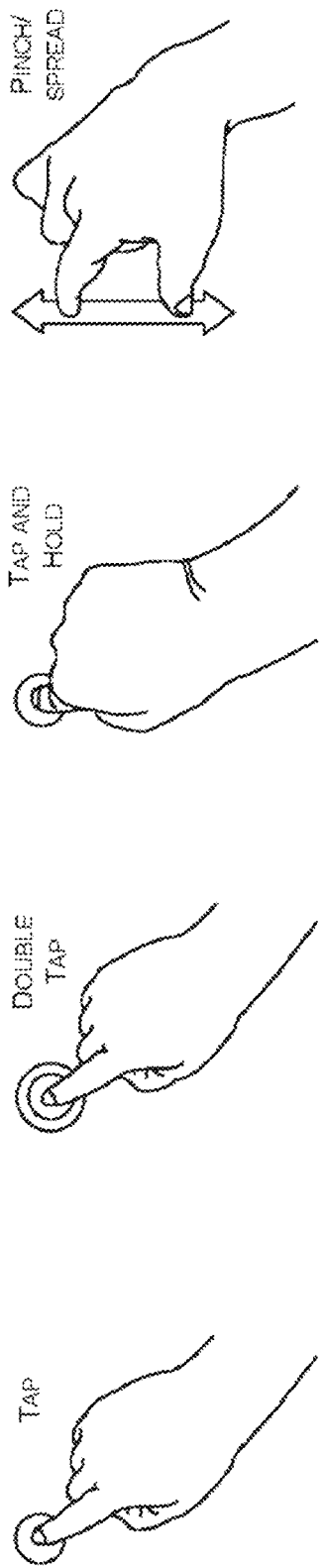
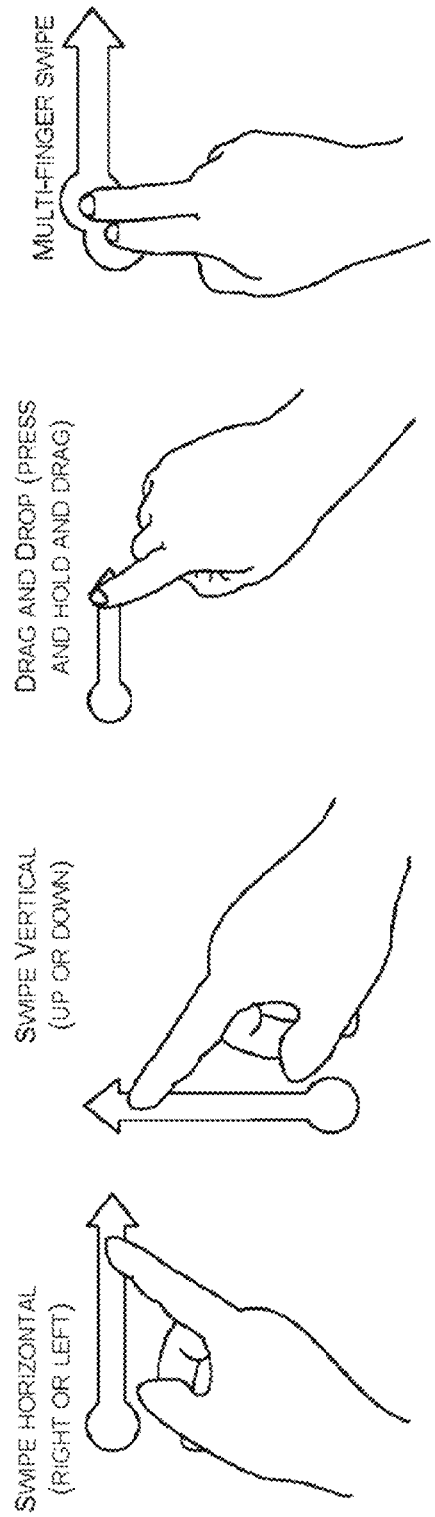

DETERMINING CONTEXTUALLY RELEVANT APPLICATION TEMPLATES ASSOCIATED WITH ELECTRONIC MESSAGE CONTENT

CROSS-REFERENCE TO RELATED APPLICATION(S)

This application is a continuation of U.S. application Ser. No. 14/855,340, filed Sep. 15, 2015, which claims the benefit of U.S. Provisional Application No. 62/050,713, filed on Sep. 15, 2014, the disclosures of which are hereby incorporated by reference.

BACKGROUND

The last decade has seen a dramatic increase in the availability and use of mobile devices. Advances in device and network capabilities, coupled with the rapid expansion in the breadth of available content and the number and variety of applications available for accessing such content, have caused mobile device users to increasingly rely on their mobile devices to obtain desired information, perform daily tasks, and so forth. Some mobile device applications provide users with notifications regarding available software updates, new content, and so forth. Such notifications may be pushed to a mobile device from a remote server or pulled by a device from a remote server at periodic intervals or as new information becomes available, and may be presented to a user in a predefined manner such as, for example, as part of a notifications menu.

BRIEF DESCRIPTION OF DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 17A-17D are schematic diagrams of a series of illustrative user actions for scrolling through a list of cards presented via a user interface of a card consumer in accordance with one or more example embodiments of the disclosure.

FIGS. 26A-26B illustrate example swipe gestures originating at a bezel of a user device and terminating at a display of the device in accordance with one or more example embodiments of the disclosure.

FIGS. 27A-27H illustrate various example touch and multi-touch gestures that may be performed using a user device in accordance with one or more example embodiments of the disclosure.

DETAILED DESCRIPTION

Overview

Figure 1:
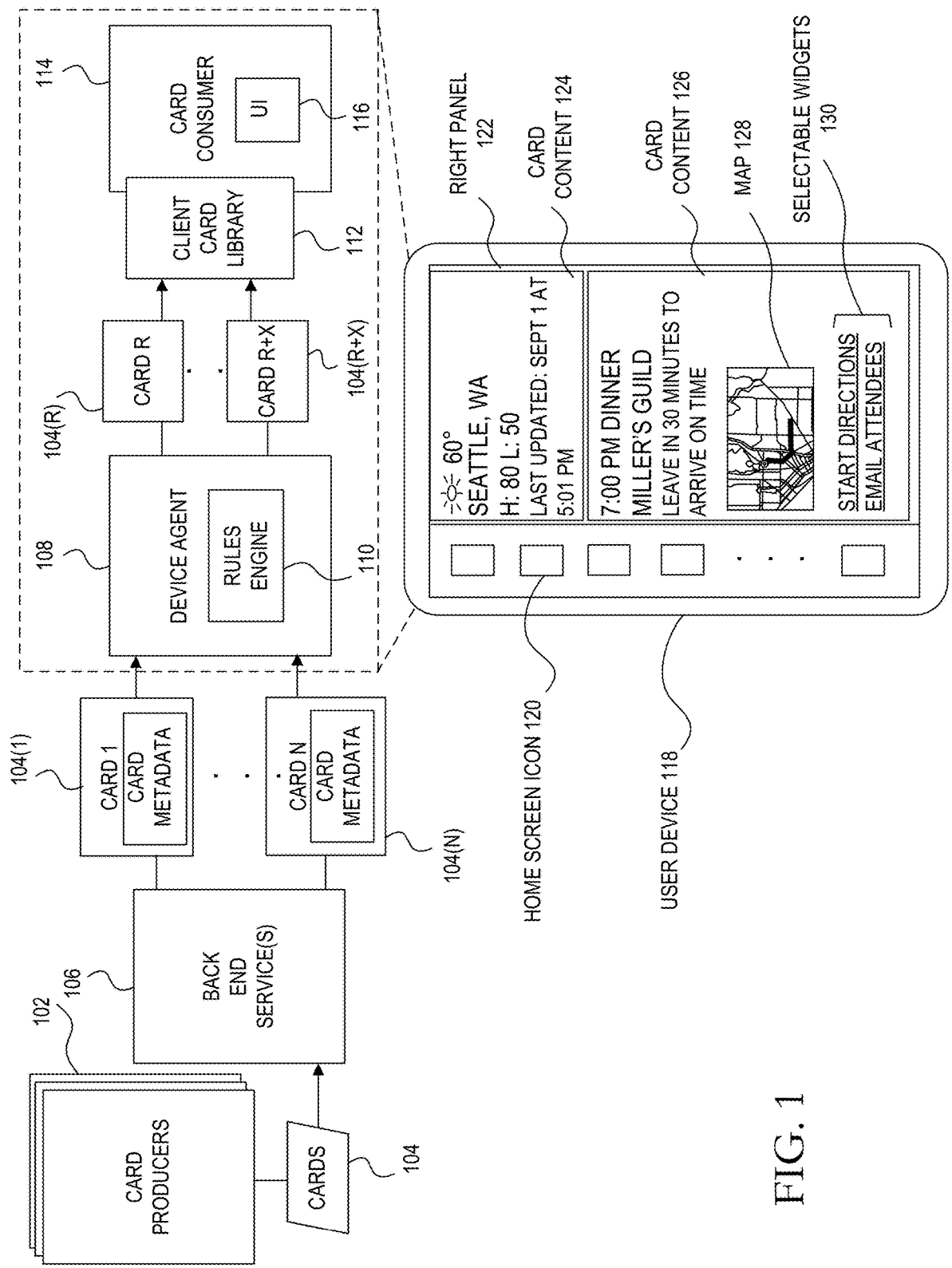
FIG. 1 is a schematic diagram of example data flows as part of an illustrative use case in accordance with one or more example embodiments of the disclosure.

This disclosure relates to, among other things, systems, methods, computer-readable media, techniques, and methodologies for generating cards that include personalized content that is relevant to tastes or preferences of a user and/or that is contextually relevant to a current, historical, or future use context of a user device, determining when card content of a card is relevant to a current use context of the device based on an evaluation of contextual data, and transmitting the card content to a card consumer when the card content is deemed relevant to the current use context of the device. The card content may be rendered in a user interface of the card consumer or may be otherwise utilized by the card consumer to perform one or more actions such as to identify and present an advertisement that is relevant to the card content.

In one or more example embodiments of the disclosure, a device agent may be provided in connection with a user device such as a smartphone, tablet device, wearable computing device, desktop or laptop device, or the like. The device agent may include any suitable combination of software, firmware, and/or hardware. In an example embodiment of the disclosure, the device agent may include one or more software modules configured to manage the receipt of cards from card producers and the delivery of card content to card consumers. The device agent may be referred to herein, at times, as a card delivery management module or the like.

In certain example embodiments of the disclosure, card producers may operate in an environment that is remote from a local device environment. For example, a card producer may be an application, script, module, component, or the like executing on a remote server from the user device. In such example embodiments, the device agent may communicate with one or more remote services which may, in turn, communicate with the card producer. In other example embodiments, a card producer may be provided locally on a device. Short messaging service (SMS) clients, electronic mail (e-mail) clients, or the like may be examples of local card producers.

The device agent may receive contextual data from one or more context sources. The context sources may include, for example, location-based services, personal information management (PIM) services, device sensors, or the like. The contextual data received from one or more context sources may include location data that indicates a current location of a user device, historical device locations over some period of time, and so forth. The contextual data may further include time data that includes a date/timestamp indicating a current date and/or time; user speed data that indicates a current speed, historical average speed, or historical range of speeds at which a user of the user device travels over some period of time (as gleaned from, for example, inertial sensor data); calendar data that indicates appointments or tasks scheduled on a calendar of the user device; data identifying voice calls or electronic communications (e.g., SMS messages, e-mails, instant messages, social networking messages, etc.) received over some period of time, and so forth.

The contextual data may further include data indicating a change in the current use context of the user device. For example, the contextual data may indicate a change in a user activity or mode. Various user activities or modes may be associated with particular user speeds or ranges of user speeds. Such activities may include, for example, walking, biking, jogging, running, an in-vehicle mode, a stationary mode, flying, and so forth. As another example, the contextual data may indicate a change in location in relation to a known location such as a work location, home location, frequently visited location, a point-of-interest (POI) location, etc. For example, a known location may be associated with a tag, label, or the like that identifies it as a particular type of location. The known location may be associated with a geo-fence that defines a virtual perimeter around the location. Generation of contextual data may be triggered if the user device passes a boundary of a geo-fence associated with a known location, and thus, may indicate a change in a location-based context of the user device. Similarly, contextual data may be generated by a context source and received by the device agent whenever a current location of the device is altered by a predetermined distance.

Other types of changes to the use context of a user device that may trigger the generation of contextual data include, without limitation, large location changes (e.g., the device moves into a region with a different postal code, the device changes location to a new country, etc.); establishment of a connection with another device over, for example, a personal area network (e.g., Bluetooth™) or movement within range of a network connection with another device (e.g., headphones, another user device, an in-vehicle system, etc.); daily routine events (e.g., daily commute); the beginning or end of a particular time range during the day (e.g., sunrise, sunset, etc.) that may be associated with a typical activity (e.g., breakfast-time, lunch-time, dinner-time, etc.); a change to predicted future locations of the user device; proximity to another user device associated with another user with whom the user of the user device is connected via, for example, a social networking platform; and so forth. It should be appreciated that the above examples of changes to a use context of the user device are merely illustrative and not exhaustive.

Contextual data may further include information that is captured from an electronic messaging conversation, session, or the like. In certain example embodiments, various predetermined types of data may be recognized and captured from messages transmitted as part of an electronic messaging conversation. For example, a uniform resource identifier (URI), a character string, a product identifier, or the like may be detected within an electronic message, and as will be described in more detail later in this disclosure, a card that includes content that is related to the detected data may be generated and presented to one or more participants in an electronic messaging conversation. For example, certain predetermined character strings (e.g., "dinner") may be detected within an electronic message, and a card that includes content indicative of restaurants located within a specified radius of a location of a user device from which the message originated may be presented on the user device, and may be further presented on one or more other user devices operated by other participant(s) in an electronic messaging conversation to which the electronic message relates.

Further, in certain example embodiments, natural language processing techniques or the like may be utilized to process the text of electronic messages and generate contextually-relevant cards. For example, the text of electronic messages transmitted as part of an electronic messaging conversation between two or more participants may be analyzed to determine that the conversation includes a discussion relating to scheduling a dinner. Analysis of the text of the electronic messages may further reveal that a participant has indicated a desire not to eat at a particular restaurant or at any restaurant located within a particular geographic area. One or more cards that include contextually relevant card content may then be generated based on the results of the analysis of the electronic messages. For example, a card that provides an indication of various restaurant options for dinner may exclude the particular restaurant identified as being undesirable and/or may exclude restaurants within the geographic area identified as being undesirable.

In certain example embodiments, the processing of electronic message text to generate processing results that may be then used to identify contextually relevant card content may be performed on the user device, while in other example embodiments, the processing may occur on one or more remote servers. Further, in certain example embodiments, the processing may occur partially on a user device and partially on one or more remote servers. The processing results may indicate, for example, words or phrases representative of tastes, preferences, topics of interest, or the like of one or more participants in an electronic messaging conversation. The processing results may further indicate, for example, any constraints or restrictions on card content gleaned from processing of electronic messaging text. For example, the processing results may indicate that a particular participant in an electronic messaging conversation has expressed a desire to see or not to see a particular movie, to dine at or not to dine at a particular restaurant or at any restaurant within a particular geographic area, and so forth. The processing results may be provided to a card producer which may utilize the results to generate a card that includes content that is relevant to subject matter of an electronic messaging conversation and that meets any constraints or restrictions indicated by the processing results. It should be appreciated that the above examples relating to generation of cards that include card content that is relevant to the subject matter of an electronic messaging conversation, session, or the like are merely illustrative and not exhaustive.

Natural language processing may include any suitable algorithm or set of algorithmic processes for performing one or more of the following tasks: co-reference resolution, discourse analysis, machine translation, morphological segmentation, named entity recognition, natural language understanding, part-of-speech tagging, parsing, sentiment analysis, topic segmentation and recognition, word sense disambiguation, information extraction, or the like. It should be appreciated that the above examples are merely illustrative and not exhaustive.

As previously noted, contextual data received by the device agent from one or more context sources may be communicated, potentially via a proxy or firewall, from the device agent to a device service executing on a remote server. In certain example embodiments, the device service may transmit the contextual data to a context service executing on a same or different remote server. The context service may be configured to store the contextual data and push the contextual data to interested card producers and/or provide the contextual data to card producers in response to queries received from the card producers. Contextual data may be pushed to a card producer when, for example, the contextual data indicates a change in the use context of a device, the results of natural language processing performed on text of electronic messages, or the like. Any one or a combination of the device agent, the device service, the context service, and/or a card service (described hereinafter) may form part of a card delivery management platform, as that term is used herein.

In certain example embodiments, the context service may be configured to generate historical contextual data that may indicate, for example, a percentage of time spent at a particular known location (e.g., a work location, a home location, another known location) over some period of time (e.g., the current day, the past week, the past month, etc.); a number of times a particular known location was visited over some period of time; an average time of day or an average time range during which the user of the user device is engaged in a particular activity (e.g., ate lunch, went for a jog, started his/her work commute, etc.); an average time of day or an average time range during which the user consumed content on the user device or another device; a breakdown of the types of content consumed over some period of time; and so forth. The context service may be further configured to generate predictions regarding potential future use contexts for the user device. Such predictions may be generated based on an analysis of historical contextual data. It should be appreciated that the above examples are merely illustrative and not exhaustive.

A card producer may utilize the contextual data to generate a card that includes content that is contextually relevant to a historical, current, or future use context of a user device. For example, a card producer may generate a card that provides current traffic information along a travel route in response to receiving contextual data indicating the user device has passed a geo-fence boundary associated with a work or home location or in response to receiving historical or predictive contextual data indicating that the user typically begins a daily commute at or around a particular time. A card producer may also update card content in response to receiving contextual data. For example, a card producer that generates weather-related cards may update the content indicating weather data for a particular location upon receiving contextual data indicating that the user device's location has changed (e.g., entered a zip code associated with a different city).

A card generated by a card producer may include card content configured for presentation via a user interface of a card consumer, and may further include, card metadata that indicates various attributes of the card. A card consumer may include any combination of software, hardware, and/or firmware configured to present card content and/or utilize the card content to identify other related content (e.g., advertisement content) for presentation. The card content may be presented in any suitable manner. For example, the card content may be visually displayed or may be presented as auditory or haptic output. The card content may include text, graphics, video content, animated content, or the like. The card content may further include selectable widgets that, responsive to selection, may initiate various actions. For example, the card content may include a representation of a uniform resource identifier (URI), such as a hyperlink, that responsive to selection causes other content to be presented to the user (e.g., related web content). As another example, the card content may include a selectable widget that causes a related mobile application to be launched responsive to selection. The card may be generated using a template that may define the organization, formatting, size, and/or type of card content that can be presented. In certain example embodiments, a template may define an overall structure or organization for card content, and a card consumer may adjust formatting (e.g., font type, font size, positioning of content items, etc.) based on the capabilities of a user interface of the card consumer via which the card content may be presented. Card content and the card or card object that includes the card content may, at times, be interchangeably referred to herein as being presented via a user interface of a card consumer.

The card metadata may include various identifiers associated with the card. For example, the card metadata may include a version identifier that indicates a version of an Application Programming Interface (API) used by the card producer to post the card to a card service which, in turn, may transmit the card to the device agent executing on the user device. The card metadata may further include a request identifier. The request identifier may be used by the device agent and the device service for synchronization purposes to ensure that the same card data is being maintained both locally on the device and remotely on one or more servers on which the device service is executing. The request identifier may also be used to stamp feedback data (described in more detail later in this disclosure) to link the feedback data to the card to which the feedback data relates. The card metadata may further include a producer identifier that creates a namespace of card types and identifies the card producer. The card metadata may additionally include a card type identifier that indicates the type of card (e.g., a meal-related card, a weather-related card, etc.). The card metadata may additionally include a card identifier that identifies a particular presentable card. The producer identifier in conjunction with the card type identifier may create a namespace of card identifiers. In certain example embodiments, a user may be able to select a setting to selectively turn on or off the presentation of cards based on the card type identifier. For example, a user may select a setting instructing a card consumer to always exclude presentation of weather-related cards.

The card metadata may also include a card instance identifier that identifies a particular instance of a card. In certain example embodiments, a card producer may produce multiple instances of a card, with each instance having a different card instance identifier but the same card identifier. Different instances of a card may correspond to different versions of a card with different card content relevant to different contextual conditions. For example, a card producer may produce multiple instances of a "lunchtime" card that provide different restaurant recommendations in relation to different geo-coordinates. The different contextual conditions to which different instances of a card may be relevant may be embodied as constraints within the card metadata. If the contextual conditions of two instances overlap, the device agent and/or the card consumer may select the more relevant instance based, for example, on user preferences, historical contextual data, or the like.

The card metadata may further include a time/datestamp that indicates a point in time at which the card expires and is no longer available for presentation, a time/datestamp indicating a point in time at which the card producer generated the card (which may differ from a point in time at which the card is pushed to the card service via a call to a corresponding API), a customer identifier that may indicate a particular user for whom the card is intended, and a device identifier that may indicate a particular device on which the card is to be presented. If no device identifier is specified, the card may be presented on any device associated with the customer identifier. Card producers may not be required to store customer and/or device identifiers. Rather, these identifier(s) may be provided to the card producer in association with the contextual data. For example, the payload of an event notification transmitted to a card producer that indicates a change in device location may include the device identifier associated with the device.

The card metadata may further include constraints that specify desired contextual conditions or contextual conditions that must be present before the card content is presented. For example, the card metadata may specify a desired location or time during which the card content is deemed more relevant. For example, a "lunch mealtime" card intended for presentation on a weekday may specify a user's work location as the most relevant location and a time that corresponds to when people typically eat lunch (or a time that the user typically eats lunch) as a most relevant time. The card metadata may further specify one or more constraints on when the card content can be presented. An example set of constraints may include the following: 1) within a specified radius of the most relevant location, 2) not the home location, and 3) within a specified time range. The card metadata may further include various other data which will be described in more detail later in this disclosure.

Upon generating a card, a card producer may transmit the card to a card service via an associated API. The card service may store the card in a datastore and may communicate the card to the device service which, in turn, may communicate the card to the device agent executing on the user device. If no constraints are specified in the card metadata of the card, the device agent may transmit the card to a card consumer for presentation via a user interface associated with the card consumer. In certain example embodiments, a client card library may be provided that receives the card and manages the loading and rendering of the card in the user interface of the card consumer. In certain example embodiments, the card consumer may be a system-level resource such as a display panel that is accessible on a device in response to a user gesture such as a swipe, tap, tilt, peek, swivel, or other type of gesture. The card content may be rendered in the display panel by the client card library. It should be appreciated, however, that other types of card consumers may be configured to present card content such as, for example, a browser application, a mobile application, a web-based application, or the like.

If constraints are specified in the card metadata, the device agent may utilize a rules engine to evaluate current contextual data to determine whether the contextual data satisfies the constraints. For example, if the card metadata specifies the following constraints: 1) within 10 miles of the user's work location, 2) not the user's home location, and 3) within a specified time range, the device agent may evaluate current contextual data received from various context sources to determine if the constraints are satisfied. If a constraint is not satisfied (e.g., the user device is at the home location because, for example, the user is working from home), the device agent may refrain from communicating the card to a card consumer. If, on the other hand, the device agent determines that the constraints are met, the device agent may transmit the card to a card consumer.

Assuming that the card is transmitted to a card consumer and the card content is presented via a user interface of the card consumer, the user may interact with the card in a variety of ways. For example, the user may dismiss the card from the user interface by applying a particular gesture to a touch-sensitive display of the user device (e.g., a swipe, a double tap, etc.). The card content may include various elements that may trigger various actions responsive to selection such as, for example, selectable icons, selectable images, selectable representations of URIs (such as a hyperlink to a web resource), video content capable of being selected to initiate playback, or the like.

Various feedback data may be collected by the card consumer (or the client card library). The feedback data may indicate one or more user interactions with the card content. For example, the feedback data may indicate a number of impressions of the card content (e.g., a number of times the card content has been presented), an amount of time the card content was displayed by the card consumer, whether the card was dismissed (e.g., swiped away), an amount of time that elapsed between display of the card content and dismissal of the card, whether and/or how many action(s) were triggered responsive to selection of selectable elements of the card content, head tracking data gathered by image sensors of the device that may indicate an amount of time that the user viewed the card content, and so forth. The feedback data may further include data that may provide a more direct assessment of the user's sentiment towards the card content. For example, the card itself (or the card consumer or the client card library) may provide a user with the capability to rate or review the card content.

The feedback data may be communicated to the device agent, which may, in turn, communicate the feedback data to the device service. The device service may convey the feedback data to the card service which may store the feedback data and provide the feedback data to the producer of the card. The feedback data may include the card identifier of the card to which it relates so that the card producer can link the feedback data to the appropriate card. The card producer may utilize the feedback data to update the card content with the goal of increasing positive user sentiment towards the card content. For example, if the feedback data indicates that the user dismissed the card after a short period of time, the producer may update the card content to increase the relevance of the card to the user's preferences or tastes. More specifically, the card producer may receive customer data for the user from the device agent via, for example, the context service and/or the card service. The customer data may include, for example, search/browsing history data indicating previous search or browsing activity of the user, purchase history data indicating previous items/services purchased by the user, content consumption data indicating previous content consumed on the user device or other device(s), and so forth. The card producer may utilize the feedback data and the customer data to generate updated card content having increased personalization for the user. The card producer may also utilize the feedback data in conjunction with the contextual data to generate updated card content that is more contextually relevant. Cards with updated card content may include the same card identifier as a previously generated card (but perhaps a new instance identifier), while a new card may include a new card identifier, which may cause existing cards of the same card type to be deleted.

In selecting or updating card content for a card, and in addition to contextual data, feedback data, and/or customer data, a card producer may utilize settings data to improve the personalization and/or contextual relevance of a card to a user. The user may be provided with a capability to specify various values reflected in the settings data. For example, the settings data may indicate a desired language; a desired unit system (e.g., metric vs. English system); desired activities, interests, content, or the like; a desired ordering of card types, and so forth. In certain example embodiments, default settings may be used if the user has not specified settings values. For example, if the registered address of a device is in Sunnyvale, Calif., the user's favorite sports teams may default to the 49ers and the Giants.

The card metadata for a card may include a score generated by the producer that reflects a perceived degree of contextual relevance and/or personalization of the card content to a user. The producer may update the score assigned to a card based on received feedback data. The card delivery management platform may also utilize the feedback data to generate a score or ranking for a card. For example, the card delivery management platform may utilize a ranking engine that executes a ranking model that receives the feedback data and the card content and any number of other forms of data (e.g., customer data, settings data, contextual data, etc.) as input and outputs a score or ranking for the card. In certain example embodiments, the score may be an absolute score determined in accordance with a scoring formula, while in other example embodiments, the score may be a relative score that indicates the card's degree of relevance and/or personalization (e.g., likelihood to generate positive user sentiment) in relation to other cards. The ranking model may be a static model or a dynamic model that is refined over time as additional contextual data and feedback data are collected.

In certain example embodiments, the score itself may serve as a ranking of the card, while in other example embodiments, a ranking for the card may be provided in addition to or in lieu of the score. For example, a priority designator may be provided for a card that indicates a relative importance of card content of a card. The priority designator may be assigned to a card by the card producer or the card delivery management platform. The priority designator may be a value selected from a predetermined set of values representing different potential priority levels for card content. A priority designator may indicate a relative importance of card content to an aggregate group of users in relation to other types of card content (e.g., a card that provides emergency warnings) or an importance of the card content to a specific user for whom the card is intended, which may be gleaned from contextual data, settings data, customer data, feedback data, or the like. A ranking for a card may be determined from a producer and/or platform generated score for the card, a priority designator assigned to the card, and/or any other suitable input such as, for example, contextual data, customer data, feedback data, settings data, or the like. A card with a higher ranking may be prioritized for display over a card with a lower ranking. In certain example embodiments in which both a score and a ranking is assigned to cards, a card with a higher ranking but a lower score may be prioritized over a card with a lower ranking but a higher score, or vice versa, depending on how other inputs (e.g., priority designator, contextual data, settings data, feedback data, customer data, etc.) affect the ranking assigned to a card.

The term "priority metric" may be used herein to describe a score and/or a ranking for a card. In certain example embodiments, a score determined by the card delivery management platform may be based, at least in part, on a score assigned to the card by the card producer. Further, in certain example embodiments, a card producer may assign an initial score or ranking to a card, which may be later modified by the card delivery management platform. Any component of the card delivery management platform (e.g., the device agent, the device service, the card service, or the context service) may generate a score and/or a ranking for a card.

Example embodiments of the disclosure can provide a number of technical features and/or technical effects. For example, in accordance with example embodiments of the disclosure, cards that include content that is personalized to a user's taste/preferences may be presented to a user when the content is determined to be contextually relevant based on a current use context of a user device. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Case

FIG. 1 is a schematic diagram of an illustrative use case in accordance with one or more example embodiments of the disclosure. While any given component depicted in any of FIGS. 1-91 may be described in the singular, it should be appreciated that multiple such components may be provided in accordance with example embodiments of the disclosure. As shown in FIG. 1, one or more card producers 102 (remote or local) may generate one or more cards 104. The cards may be new cards with new content that does not relate to an existing, non-expired card, or may be cards with updated content that may include the same card identifier as an existing, non-expired card (such cards may be referred to herein as "updated cards"). The card producers 102 may communicate the cards 104 to one or more back-end services 106. The back-end services 106 may include, for example, a context service, a card service, and/or a device service. In one or more example embodiments, the card producers 102 may push the cards 104 to the card service via an API.

Upon receipt of the cards 104, the card service may store the card data and communicate the cards 104 to the device service which may, in turn, communicate the cards 104 to a device agent 108 hosted on a user device 118. The cards 104 may include, for example, cards 104(1)-104(N) produced by any number of card producers 102. Each card 104 (e.g., card 104(1)) may include respective card content for presentation to a user and respective card metadata that may include any of the types of data previously described. For example, a card 104 (e.g., card 104(N)) may include card metadata that specifies one or more constraints. The device agent 108 may utilize a rules engine 110 to evaluate contextual data (not shown in FIG. 1) to determine whether the contextual data satisfies the constraint(s) of the card. As previously described, the contextual data may be received from any number of context sources and may include any data that may indicate a current use context for the user device 118 such as, for example, location data, time data, user speed data, activity mode data (e.g., a particular user speed or range of speeds may correspond to a particular activity such as walking, running, etc.), calendar data, data relating to other device applications (e.g., SMS messages recently sent or received via an SMS application, e-mails recently sent or received via an e-mail application, etc.), and so forth. Further, in certain example embodiments, the contextual data may include the results of natural language processing performed on electronic message text.

The device agent 108 may identify one or more cards 104(R)-104(R+X) of the cards 104 that are associated with constraints that are satisfied by the contextual data and may transmit the cards 104(R)-104(R+X) (generically referred to hereinafter as cards 104') to a client card library 114 for rendering in a user interface (UI) 118 of a card consumer 116. It should be appreciated that in various example embodiments, the cards 104' may be transmitted to the card consumer 116 directly and not via the client card library 114. In such example embodiments, the client card library 114 may or may not be present.

In certain example embodiments, the cards 104' may include one or more cards that do not include metadata that specifies constraints on contextual conditions for display of the cards. Further, in certain example embodiments, even if the constraint(s) associated with a card are met, the device agent 108 may nonetheless refrain from transmitting the card to the client card library 114 for display in the UI 118 of the card consumer 116. For example, as previously described, one or more cards 104 may have an assigned priority metric (e.g., a score generated by a producer of the card, a score generated by the card delivery management platform, a ranking assigned to the card by the card producer and/or the card delivery management platform, etc.). In certain example embodiments, the device agent 108 may select only those cards having a priority metric above a certain threshold value for inclusion in the set of cards 104' transmitted to the client card library 114. In other example embodiments, the device agent 108 may select the X cards having the highest priority metrics even if the priority metric of any particular card of the X cards does not meet or exceed a threshold value. The priority metric that is compared against a threshold value or otherwise evaluated to determine the X cards having the highest priority metric may be the producer-generated score, the platform-generated score, an assigned ranking (e.g., producer-generated, platform-generated, producer-generated and platform-modified, etc.), or any combination thereof. The threshold value may be determined by the card delivery management platform (e.g., the device agent 108, a back-end service 106, etc.) and may be a static value or a dynamic value that is adjusted using a machine-learning ranking model that receives feedback data as input.

In addition to selecting a subset of X cards to communicate to the client card library 114 and/or the card consumer 116, the device agent 108 may further generate display order data based on associated priority metrics of the cards. The display order data may specify an order in which the cards are to be presented via the UI 118 of the card consumer 116. In other example embodiments, the device agent 108 may transmit all of the cards 104 determined to be contextually relevant, and the client card library 114 or the card consumer 116 may determine which cards to display and a display order for the cards based on associated scores or rankings for the cards.

FIG. 1 depicts various example cards that may be presented via the UI 116 of the card consumer 116. The card consumer 116 may be, for example, a right panel 122 of the user device 118 that may be accessed via a suitable gesture. The appropriate user gesture may cause the right panel 122 to appear as an overlay over the home screen image or another image associated with, for example, a foreground application. One or more home screen icons 120 may remain visible even after the right panel 122 is accessed. Card content 124 of an example weather-related card and card content 126 of an example meal-reminder card are illustratively shown in FIG. 1. The card content 124 and/or the card content 126 may be displayed in accordance with templates from which the corresponding cards are generated. The card content 126 for the meal-reminder card may include, for example, a map image displaying a proposed route from a current location to a restaurant as well as one or more selectable widgets 130 that may cause various actions to be triggered responsive to selection such as, for example, initiating a navigation application or generating an e-mail message to attendees. Any other portions of the card content 124 and/or the card content 126 may also be selectable. For example, the map image 128 may be selectable, and if selected, may launch a maps application. As another example, any portion of the card content 124 may be selectable, and if selected, may launch a weather application on the user device 118, redirect the user to a web resource (e.g., a weather-related website), or the like.

It should be appreciated that the right panel 122 (or other component(s) that render card content) may be accessed from user interfaces other than the home screen such as, for example, from another foreground application executing on the device. Further, the card content that is displayed may be prioritized or de-prioritized based on the content of the foreground application.

Illustrative Architecture

Figure 2A:
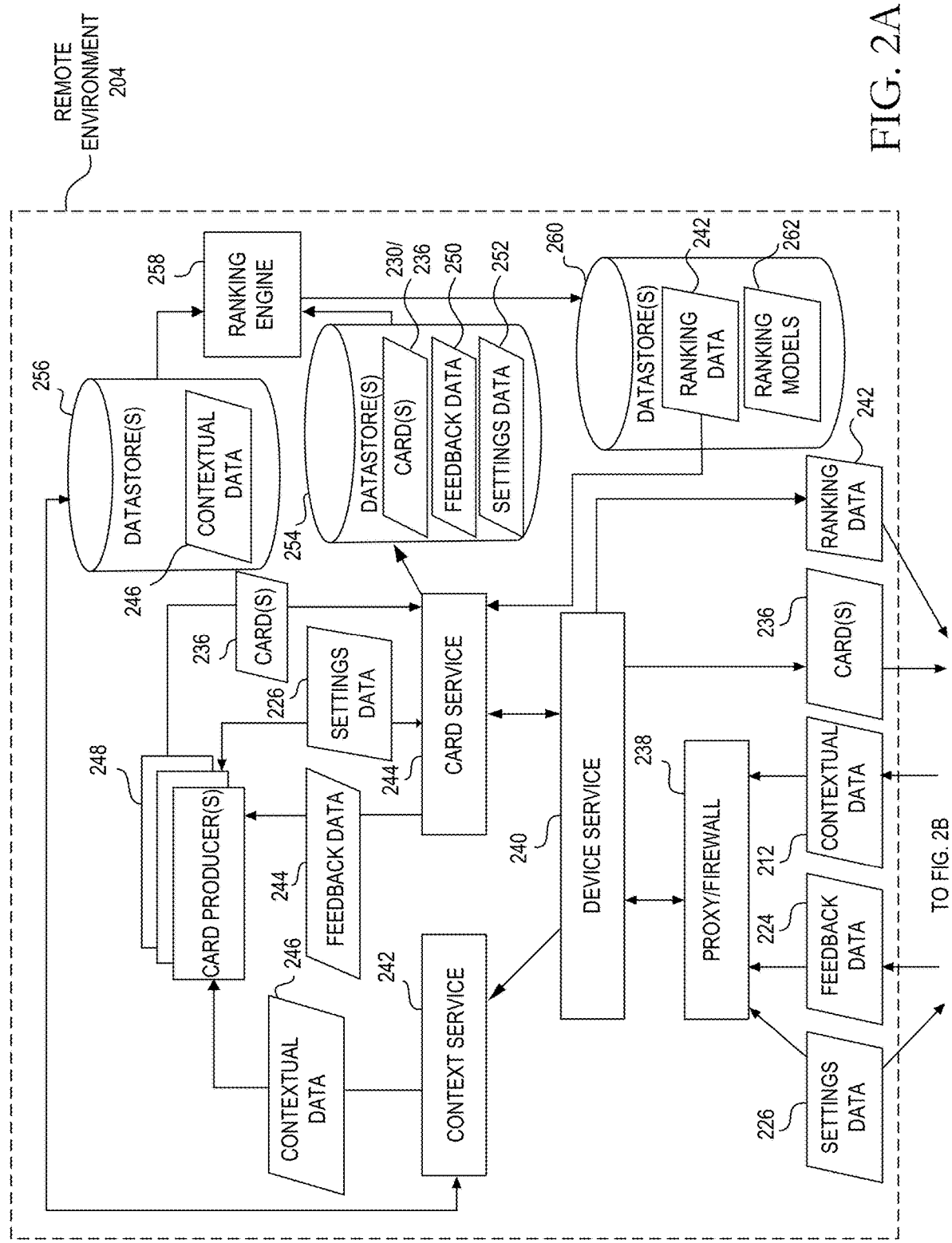
FIGS. 2A-2B are hybrid system architecture and data flow diagrams in accordance with one or more example embodiments of the disclosure.
Figure 2B:
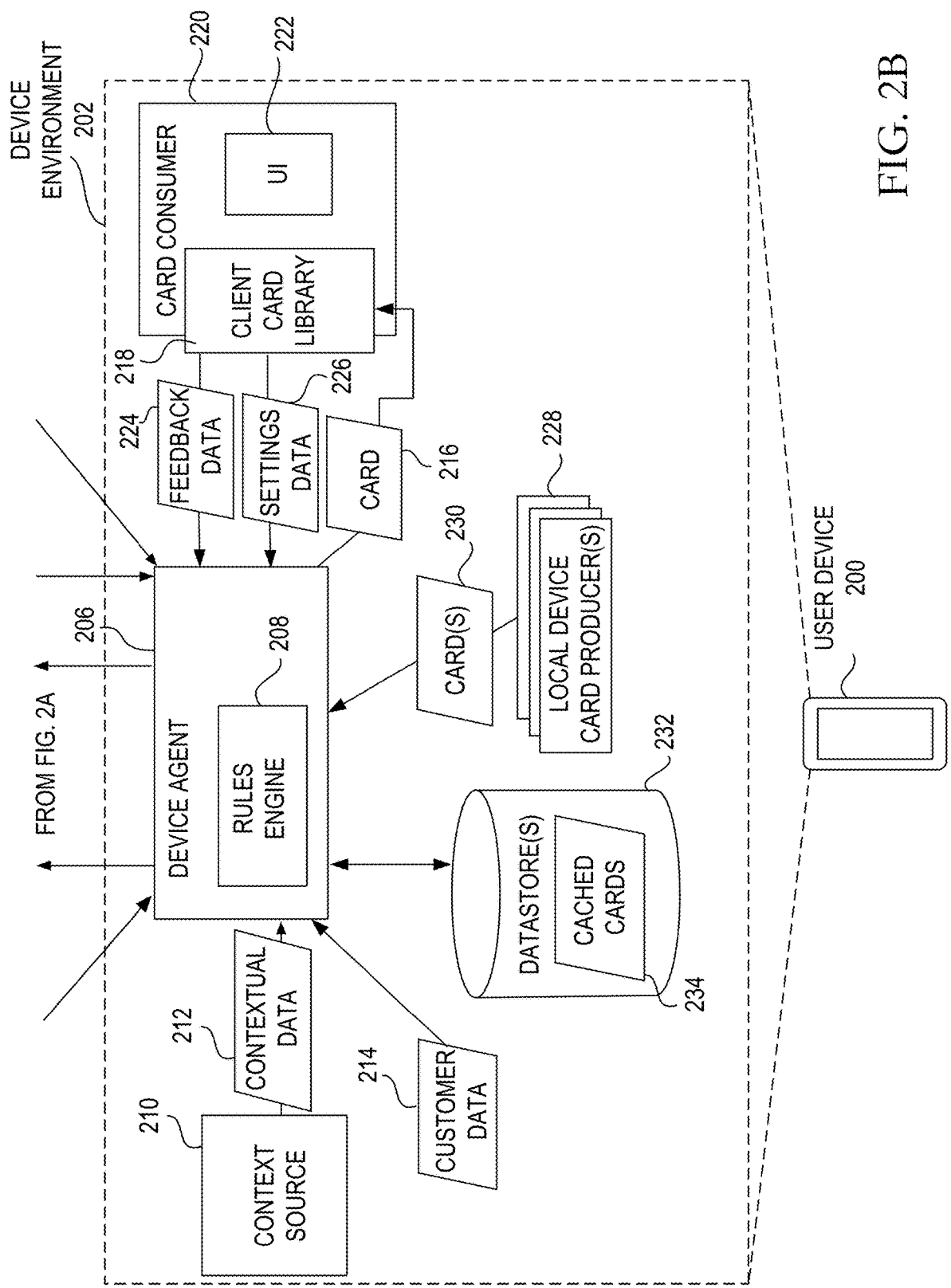

FIGS. 2A-2B are hybrid system architecture and data flow diagrams in accordance with one or more example embodiments of the disclosure. FIG. 2A depicts a remote environment 204 and FIG. 2B depicts a device environment 202 associated with a user device 200. The device environment 202 may include one or more hardware, software, and/or firmware components of a user device 200. For example, the device environment 202 may include data storage components, processing components, applications, services, or the like.

In an illustrative configuration, the device environment 202 may include a device agent 206 that includes a rules engine 208. In one or more example embodiments, the device agent 206 and the rules engine 208 may correspond to the device agent 108 and the rules engine 110 depicted in FIG. 1. The device agent 206 may receive contextual data 212 from a context source 210. The context source 210 may be, for example, a location-based service configured to determine a position of the user device 200 using any suitable positioning technology such as, for example, the Global Positioning System (GPS) or another Global Navigation Satellite System (GNSS), Wi-Fi based indoor positioning, hybrid positioning systems such as Assisted GPS, or any other technology involving multilateration of radio signals between radio towers of a network and the user device 200. The context source 210 may further include a PIM application that provides contextual data 212 including device calendar data, messaging data, or the like. The context source 210 may also include one or more sensors of the user device 200 such as biometric sensors, inertial sensors, gyroscopes, and so forth that may provide contextual data 212 in the form of acceleration data, user speed data, user biometric data, or the like. The context source 210 may further include an engine or the like that performs natural language processing on electronic message text and generates processing results that may be used to generate and/or identify contextual relevant cards.

In addition to the contextual data 212, the device agent 206 may also receive customer data 214. The customer data 214 may include, for example, search/browsing history data indicating previous search or browsing activity of the user, purchase history data indicating previous items/services purchased by the user, content consumption data indicating previous content consumed on the user device or another device associated with the user, and so forth. Although not depicted in FIG. 2, the device agent 206 may communicate the customer data 214 to a device service 240 of the remote environment, potentially via a proxy service or firewall 244. The device service 246 may, in turn, communicate the customer data 214 to one or more card producers 248 via a card service 244 of the remote environment 204. The card producer(s) 248 may utilize the customer data 214, potentially in conjunction with various other types of data described herein, to generate cards with card content that relates to the preferences, tastes, or the like of particular users (e.g., to personalize card content).

The device agent 206 may receive cards 230 from one or more local card producers 228. The local card producer(s) 228 may include, for example, a communication application of the user device 200 such as an SMS application, an email application, a voice calling application, or the like. The device agent 206 may also receive cards 236 from one or more remote card producers 248. Once generated, the remote card producers 248 may push the cards to the card service 244 using a corresponding API, and the card service 244 may transmit the cards 236 to the device agent 208 via the device service 240. Upon receipt of the cards 230/236, the device agent 208 may store the cards 230/236 as cached cards 234 in one or more datastores 232.

The contextual data 212 received by the device agent 206 may include data indicating a change in a current use context of the device 200. A change in the current use context of the device 200 may include a change to one or more use characteristics of the device 200 such as, for example, a change in a user activity or mode, a change in location in relation to a known location a change in a current location by a predetermined distance, or any of the other use context changes described earlier.

The device agent 206 may communicate the contextual data 212 to the device service 240, potentially via the proxy service or firewall 238. The device agent 208 may communicate the contextual data 212 to the device service 240 at periodic intervals or upon receipt of the contextual data 212 such as, for example, in those example embodiments in which the contextual data 212 indicates a change to a current use context of the device 200. The device service 240 may, in turn, communicate the contextual data 212 to a context service 242 which may push the contextual data 212 to one or more card producers 248.

In particular, the context service 242 may push event notifications to a card producer 248 responsive to receipt of contextual data 212 that indicates a change in a use context of the device 200 that is relevant to one or more cards generated by that card producer 248. The event notification may include an indication of the device from which the contextual data was received and an indication of the nature of the changed context (e.g., an indication that the device passed a geo-fence associated with a work location at a time of day that corresponds when the user typically starts his/her daily commute home). In certain example embodiments, the context service 242 may broadcast messages comprising the contextual data 212, and card producers 248 listening for the messages may retrieve the contextual data 212 from the broadcast. A card producer 248 may determine that a broadcasted message contains contextual data that is relevant to one or more cards generated by the card producer based, for example, on the presence of a customer identifier or device identifier in the broadcasted message.

In certain example embodiments, a card producer 248 may also query the context service 242 for contextual data. The context service 242 may respond to the query by providing contextual data 246. The contextual data 246 may include the contextual data 212 indicating a current use context of the device 200 or a change to the use context of the device 200. Alternatively, or additionally, the contextual data 246 may include historical contextual data that provides various context metrics over a period of time of use of the device 200. The historical contextual data may include, for example, a percentage of time spent at a particular known location over some period of time; a number of times a particular known location was visited over some period of time; an average time of day or an average time range during which the user of the user device engaged in a particular activity; an average time of day or an average time range during which the user consumed content on the user device; a breakdown of the types of content consumed over some period of time; and so forth. The contextual data 246 may further include predictive contextual data that indicates a predicted future use context for the device 200. For example, the context service 242 may process historical contextual data to make predictions about future use context of the device. For example, if the user typically eats lunch at an off-peak time such as 2 PM, the historical contextual data received from the user device 200 may indicate this, and the context service 242 may generate predictive contextual data that indicates a likelihood that the user will continue to take lunch around 2 PM. In certain example embodiments, any one or a combination of the predictive contextual data, the historical contextual data, or the current contextual data 212 may be expressed as a probabilistic value. For example, the predictive contextual data may indicate an 80% likelihood that the user will continue to take lunch around 2 PM. Similarly, if a card producer queries the context service 242 for a current activity of the user, the context service 242 may respond to the query with an indication that there is a 60% percent chance that the true state of the user is "walking." It should be appreciated that the above examples of probabilistic contextual values are merely illustrative and not exhaustive.

As previously described, a card producer 248 may generate a card intended for a particular user based at least in part on at least a portion of the contextual data 246. While FIG. 1 depicts example data flows involving a particular user device 200 and a particular user, it should be appreciated that the context service 242 may receive the contextual 246 data from any number of user devices and may respond to queries from card producers for contextual data relating to any number of users. Upon generating a card object, a card producer 248 may call an API associated with the card service 244 to push the card object 236 to the card service 244. The card service 244 may then transmit the card object 236 to the device service 240 which may, in turn, transmit the card object to the device agent 206.

Upon receipt of a card object (which may be a card 230 produced locally on the user device 200 or a card 236 received from a remote card producer), the device agent 206 may determine whether current contextual data 212 satisfies one or more constraints specified in a card metadata of the card object. As previously described, the device agent 206 may leverage the rules engine 208 to determine whether the constraints are satisfied. If the card constraints are satisfied, the device agent 206 may transmit the card 216 to a client card library 218 that may cause card content of the card object 216 to be rendered in a UI 222 of a card consumer 220. The client card library 218 may be a thin client library that loads card objects, renders card content of the card objects, and handles user input events such as, for example, user selections of selectable portions of the card content. In certain example embodiments, the client card library 218 may not be provided as part of the device environment 202. Rather, the device agent 206 may transmit a card object 216 directly to a card consumer for rendering of card content of the card object 216. The card consumer 220 may support other functionality in addition to presenting card content or may be a dedicated application that specifically supports card content presentation.

In certain example embodiments, the device agent 206 may receive a card object 230/236 that was generated in response to contextual data indicating a change in a current use context of the device 200. In such example embodiments, as long as the current context of the device 200 has not changed from the time when the card producer was informed of the change in use context of the device 200 and the time when the corresponding card 230/236 is received, the device agent 206 may determine that any constraints associated with the card are satisfied and may transmit the card for presentation in the UI 222 of the card consumer 220. On the hand other, in certain example embodiments, while the card may be tailored to the new device context 200 resulting from the change in device context, the card may nonetheless specify additional constraints that need not be related to the change in device context and which need to be met in order to present card content of the card. Accordingly, the device 200 may leverage the rules engine 208 to determine whether such additional constraints are satisfied before delivering the card for presentation by a card consumer. As previously noted, a card producer 248 may generate multiple instances of a card object, each instance specifying different constraints (e.g., different contextual conditions) that may need to be met before the associated card content can be presented. Accordingly, the device agent 206 may determine which, if any, of the constraints are met to identify the appropriate card instance to transmit for presentation.

In certain example embodiments, the context source 210 may be a natural language processing engine or the like that processes electronic message text and generates processing results indicative of the subject matter of an electronic messaging conversation. The contextual data 212 provided to the device agent 206 may include the processing results. In certain other example embodiments, the device agent 206 may transmit at least a portion of electronic message text to the remote environment, and the natural language processing or the like may be performed by one or more remote servers forming part of the remote environment 204. For example, the card service 244, context service 242, or the like may leverage a natural language processing engine to perform natural language processing of the electronic message text. The results of the natural language processing may be provided to a card producer 248 to facilitate generation of cards that include card content that is relevant to the subject matter of an electronic messaging conversation and/or that meets constraints or restrictions gleaned from the subject matter (as indicated by the processing results). In certain example embodiments, initial processing may be performed on the user device 200 to identify words or phrases indicative of the subject matter of an electronic messaging conversation, and the results of the initial processing may be provided to the remote environment 204 for further processing. Further, in certain example embodiments, the device agent 206 may evaluate the results of natural language processing performed on electronic message text to determine whether any cards that have already been generated include card content that is relevant to the subject matter of an electronic messaging conversation.

A card presented by the card consumer 220 may include various selectable elements. The card metadata of the card may specify various actions to be taken responsive to selection of various selectable elements. For example, card metadata associated with a traffic-related card may specify that tapping on the card (or otherwise interacting with a portion of the card content) may cause a navigation application to be launched. In addition, various selectable links (e.g., hyperlinks) may be displayed as part of the content of the card. Selection of a hyperlink may direct a browser application of the user device 200 to a web resource containing content that may be related to the card content. In certain example embodiments, selection of link may cause another card to be displayed via the UI 222 of the card consumer 220. The additional card that is displayed may have been generated by the same card producer or a different card producer, and may be linked to the card containing the selected link via linked data included in the card metadata of each card.

Various feedback data 224 may be collected by the card consumer 220 (or the client card library 218) in connection with a card that is being displayed. The feedback data 224 may indicate one or more user interactions with the card content. For example, the feedback 224 data may indicate a number of impressions of the card content, an amount of time the card content was displayed by the card consumer 220, whether the card was dismissed (e.g., swiped away), an amount of time that elapsed between display of the card content and dismissal of the card, head tracking data gathered by image sensors of the device 200 that may indicate an amount of time that a user viewed the card content, a number of selectable elements of the card content that the user selected, and so forth. The feedback data 224 may further include data that may provide a more direct assessment of the user's sentiment towards the card content. For example, the card itself (or the card consumer 220 or the client card library 218) may provide a user with the capability to rate or review the card content.

The feedback data 224 may be communicated to the device agent 206, which may, in turn, communicate the feedback data 224 to the device service 240, potentially via the proxy service or firewall 238. The device service 240 may communicate the feedback data 224 to the card service 244 which may store the feedback data 224 as at least a portion of aggregate feedback data 250 in one or more datastores 254 and transmit a notification to a card producer 248 of the card to which the feedback data 224 relates. The notification may include the feedback data 224 and a card identifier to identify the card to which the feedback data 224 relates. The card producer 248 may receive the feedback data 224 via a feedback API exposed by the card service 244 to card producers 248. The feedback data 250 may include the feedback data 224 as well as feedback data associated with other cards and/or feedback data associated with one or more cards displayed on other user devices. In certain example embodiments, a card producer 248 may query the card service 244 for at least a portion of the feedback data 250 representative of a feedback history for a card and may perform batch or offline processing on the feedback history data to identify updated/new card content.

More specifically, a card producer 248 may utilize feedback data to update content of a card with the goal of increasing positive user sentiment towards the card content. For example, if the feedback data 224 indicates that the user dismissed the card 216 after a short period of time, the producer 248 may update the card content to increase the extent to which the card 216 is personalized to the user and/or to increase the contextual relevance of the card 216 to the user. For example, the card producer 248 may utilize the feedback data 224 and the contextual data 246 (e.g., current contextual data 212, historical contextual data, and predictive contextual data, etc.) to generate updated card content having a potentially increased contextual relevance to the user. Additionally, or alternatively, the card producer 248 may receive the customer data 214 for the user from the device agent 206 via, for example, the device service 240, the context service 242, and/or the card service 244, and may utilize the customer data 214 and the feedback data 244 to generate updated card content that is more personalized to the user to whom the card 216 was presented. The card producer 248 may generate a card with updated card content that may include the same card identifier as the card 216 with the existing content (but perhaps a new instance identifier), in which case, the existing content may be replaced with updated card content in the card 216. In certain other example embodiments, the card producer 248 may generate a new card that may include a new card identifier, in which case, the existing card 216 (as well as any other existing cards having the same card identifier) may be deleted.

In addition to the contextual data 246, feedback data 244, and/or the customer data 214, a card producer 248 may utilize settings data 226 to improve the personalization and/or contextual relevance of the card 216 to the user. For example, the user may be provided with a capability to specify various values reflected in the settings data 226. For example, the settings data 226 may indicate a desired language; a desired unit system (e.g., metric vs. English system); desired activities, interests, content, or the like; a desired ordering of card types, and so forth. In certain example embodiments, default settings may be used if the user has not specified settings values. For example, if the registered address of a device is in Sunnyvale, Calif., the user's favorite sports teams may default to the 49ers and the Giants.

The device agent 206 may receive the settings data 226 from the client card library 118 and/or the card consumer 220, and may transmit the settings data 226, potentially via the proxy service or firewall 238, to the card service 244. The card service 244 may, in turn, store the settings data 226 as at least a portion of settings data 252. The settings data 252 may also include settings data pertaining to one or more other user devices. In addition, the card service 244 may transmit the settings data 226 to a card producer 248 that produces cards intended for the user (e.g., card 216) to permit the card producer 248 to utilize the settings data 226 to improve the personalization of the card content of the cards generated for the user.

In certain example embodiments, the card metadata for the card 216 may include a score generated by the card producer 248 that reflects a perceived degree of contextual relevance and/or personalization of the card content to a user. The card producer 248 may update the score assigned to the card 216 based on the feedback data 244. In certain example embodiments, the score may be an absolute score determined in accordance with a scoring formula, while in other example embodiments, the score may be a relative score that indicates the card's degree of relevance and/or personalization (e.g., likelihood to generate positive user sentiment) in relation to other cards. The card delivery management platform may also utilize the feedback data to generate a score or ranking for a card. For example, the card delivery management platform may include a ranking engine 258 that accesses a ranking model 262 from one or more datastores 260, provides the feedback data 244, the card content, and optionally, any number of other forms of data (e.g., the settings data 226, the contextual data 246, the customer data 214, etc.) as input to the ranking model 262, and receives as output from the ranking model a ranking for the card 216. The ranking generated for the card 216 may be stored as at least a portion of ranking data 242 in the datastore(s) 260.

In certain example embodiments, the score itself may serve as a ranking of the card 216, while in other example embodiments, a ranking for the card 216 may be provided in addition to or in lieu of the score. For example, a priority designator may be provided for the card 216 that indicates a relative importance of card content of the card 216. The priority designator may be assigned to the card 216 by a card producer 248 or the card delivery management platform. The priority designator may be a value selected from a predetermined set of values representing different potential priority levels for card content. A priority designator may indicate a relative importance of card content to an aggregate group of users in relation to other types of card content (e.g., a card that provides emergency warnings) or an importance of the card content to a specific user for whom the card is intended. A ranking for the card 216 may be determined from a producer and/or platform generated score for the card 216, a priority designator assigned to the card 216, and/or any other suitable input such as, for example, contextual data 246, customer data 214, feedback data 224, settings data 226, or the like. The score and/or the ranking for the card 216 may determine an order in which the card 216 is transmitted by the device agent 206 to the card consumer 220 in relation to one or more other cards and/or an order in which the card 216 is displayed in the UI 222 of the card consumer 220 in relation to other cards that are displayed or are intended to be displayed.

The ranking data 242 may include a score and/or ranking for the card 216, as well as, scores and/or ranking for one or more other cards. The ranking data 242 may further include one or more thresholds against which the ranking data 242 may be compared to determine whether and/or in what order the card 216 is to be transmitted to the card consumer 220 and/or an order in which the card 216 is to be displayed with respect to one or more other cards. The card service 244 may access the ranking data 242 from the datastore(s) 260 and communicate the ranking data 242 to the device service 240 which may, in turn, transmit the ranking data 242 to the device agent 206. The device agent 206 may evaluate the ranking data 242 to determine whether the card 216 has a suitably high score and/or ranking to be selected for transmission to and presentation by the card consumer 220. This evaluation may include selecting the N cards with the highest scores, rankings, or some combination thereof. Alternatively, this evaluation may include determining whether a score, ranking, or combination thereof for the card 216 meets or exceeds a threshold for delivering the card 216 to the card consumer 220. If the device agent 206 determines that the card 216 is to be delivered to the card consumer 220, the device agent 206 may, in certain example embodiments, further generate display order data that indicates an order in which the card content of the card 216 is to be displayed with respect to one or more other cards. The device agent 206 may provide the display order data in association with the card 216. Alternatively, or additionally, the client card library 218 and/or the card consumer 220 may independently determine the display order.

An example device environment 202 and remote environment 204 have been depicted and described with respect to FIGS. 2A-2B. It should be appreciated, however, that numerous variations to the illustrative environments depicted in FIGS. 2A-2B are within the scope of this disclosure. Further, FIGS. 2A-2B merely depict an example use case in accordance with one or more example embodiments of the disclosure. It should be appreciated that the environments depicted in FIGS. 2A-2B are applicable to a wide range of additional use cases.

Figure 3:
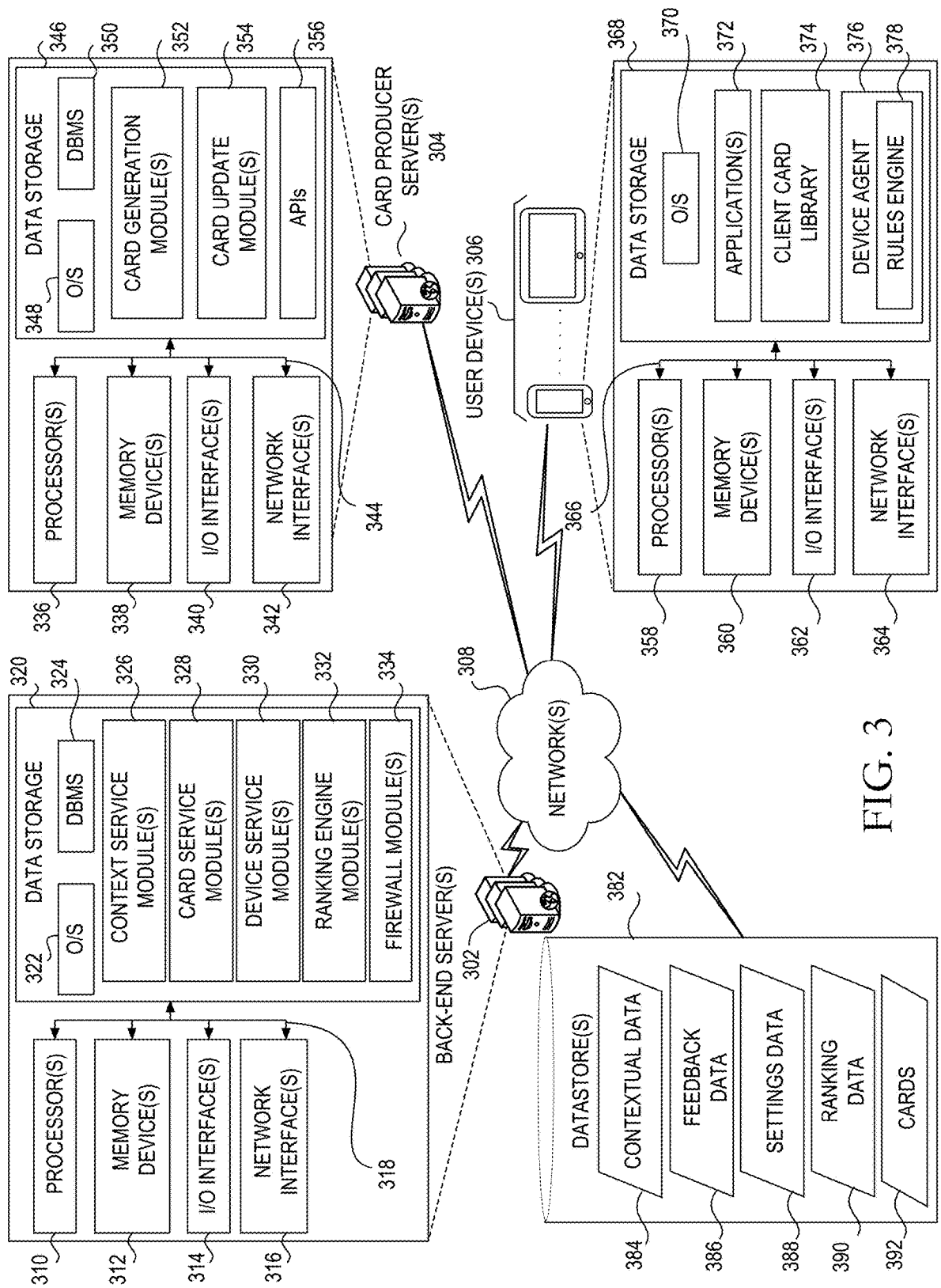
FIG. 3 is a schematic block diagram of an illustrative networked architecture in accordance with one or more example embodiments of the disclosure.

FIG. 3 is a schematic block diagram of an illustrative networked architecture 300 in accordance with one or more example embodiments of the disclosure. The networked architecture 300 may include one or more back-end servers 302, one or more card producer servers 304, and one or more user devices 306. The device service 240, the context service 242, and/or the card service 244 may be configured to execute on one or more of the back-end servers 302. Further, other components of the card delivery management platform (e.g., the proxy/firewall 238, the ranking engine 258, etc.) may be executable on one or more back-end servers 302. While the back-end server(s) 302, the card producer server(s) 304, and/or the user device(s) 306 may be referred to herein in the singular, it should be appreciated that multiple ones of any of the illustrative components of the networked architecture 300 may be provided, and any processing described as being performed by a particular component of the architecture 300 may be performed in a distributed manner by multiple such components.

The back-end server 302, the card producer server 304, and/or the user device 306 may be configured to communicate via one or more networks 308. The network(s) 308 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 308 may have any suitable communication range associated therewith and may include, for example, global networks (e.g., the Internet), metropolitan area networks (MANs), wide area networks (WANs), local area networks (LANs), or personal area networks (PANs). In addition, the network(s) 308 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the back-end server 302 may include one or more processors (processor(s)) 310, one or more memory devices 312 (generically referred to herein as memory 312), one or more input/output ("I/O") interface(s) 314, one or more network interfaces 316, and data storage 320. The back-end server 302 may further include one or more buses 318 that functionally couple various components of the server 302. These various components of the server 302 will be described in more detail hereinafter.

The bus(es) 318 may include at least one of a system bus, a memory bus, an address bus, or a message bus, and may permit exchange of information (e.g., data (including computer-executable code), signaling, etc.) between various components of the server 302. The bus(es) may include, without limitation, a memory bus or a memory controller, a peripheral bus, an accelerated graphics port, and so forth. The bus(es) 318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 312 of the server 302 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 312 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 312 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 320 may include removable storage and/or non-removable storage including, but not limited to, magnetic storage, optical disk storage, and/or tape storage. The data storage 320 may provide non-volatile storage of computer-executable instructions and other data. The memory 312 and the data storage 320, removable and/or non-removable, are examples of computer-readable storage media (CRSM) as that term is used herein.

The data storage 320 may store computer-executable code, instructions, or the like that may be loadable into the memory 312 and executable by the processor(s) 310 to cause the processor(s) 310 to perform or initiate various operations. The data storage 320 may additionally store data that may be copied to memory 312 for use by the processor(s) 310 during the execution of the computer-executable instructions. Moreover, output data generated as a result of execution of the computer-executable instructions by the processor(s) 310 may be stored initially in memory 312, and may ultimately be copied to data storage 320 for non-volatile storage.

More specifically, the data storage 320 may store one or more operating systems (O/S) 322; one or more database management systems (DBMS) 324; and one or more program modules, applications, or the like such as, for example, one or more context service module(s) 326, one or more card service module(s) 328, one or more device service module(s) 330, one or more ranking engine module(s) 332, and proxy/firewall module(s) 334. Any of the program modules may include one or more sub-modules. In addition, the data storage 320 may store various other types of data such as, for example, any of the data stored in the datastore(s) 382. Any of the modules depicted in FIG. 3 may include computer-executable code, instructions, or the like that may be loaded into the memory 312 for execution by one or more of the processor(s) 310. Further, any data stored in the data storage 320 may be loaded into the memory 312 for use by the processor(s) 310 in executing computer-executable code. In addition, any data stored in the datastore(s) 382 may be accessed via the DBMS 324 and loaded in the memory 312 for use by the processor(s) 310 in executing computer-executable code.

The processor(s) 310 may be configured to access the memory 312 and execute computer-executable instructions loaded therein. For example, the processor(s) 310 may be configured to execute computer-executable instructions of the various program modules of the server 302 to cause or facilitate various operations to be performed in accordance with one or more embodiments of the disclosure. The processor(s) 310 may include any suitable processing unit capable of accepting data as input, processing the input data in accordance with stored computer-executable instructions, and generating output data. The processor(s) 310 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 310 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 310 may be capable of supporting any of a variety of instruction sets.

Referring now to functionality supported by the various program modules of the server 302 depicted in FIG. 2, the context service module(s) 326 may form part of the context service 242 and may support any of the functionality described as being provided by the context service 242. The context service module(s) 326 may include computer-executable instructions, code, or the like that responsive to execution by one or more of the processor(s) 310 may cause operations to be performed including, without limitation, receiving contextual data and generating event notifications for notifying card producers of the contextual data, generating predictive contextual data, providing card producers with current, historical, or predictive contextual data in response to received queries, and so forth.

The card service module(s) 328 may form part of the card service 244 and may support any of the functionality described as being provided by the card service 244. The card service module(s) 328 may include computer-executable instructions, code, or the like that responsive to execution by one or more of the processor(s) 310 may cause operations to be performed including, without limitation, receiving cards from card producers and transmitting the cards to a device agent for ultimate presentation by a card consumer; receiving various types of data (e.g., settings data, feedback data, customer data, etc.) from a device agent and transmitting the data to a card producer; transmitting ranking data to a device agent, responding to queries from card producers for feedback data, settings data, and/or customer data; and so forth.

The device service module(s) 330 may form part of the device service 240 and may support any of the functionality described as being provided by the device service 240. The device service module(s) 330 may include computer-executable instructions, code, or the like that responsive to execution by one or more of the processor(s) 310 may cause operations to be performed including, without limitation, serving as a point of communication for a device agent with a remote environment of a card delivery management platform by relaying data to/from the device agent and various other components/services of the remote environment.

The ranking engine module(s) 332 may form part of the ranking engine 258 and may support any of the functionality described as being provided by the ranking engine 258. The ranking engine module(s) 332 may include computer-executable instructions, code, or the like that responsive to execution by one or more of the processor(s) 310 may cause operations to be performed including, without limitation, applying one or more ranking models to generate ranking data including scores and/or ranking of one or more cards.

The proxy/firewall module(s) 334 may form part of the proxy/firewall 238 and may support any of the functionality described as being provided by the proxy/firewall 238. The proxy/firewall module(s) 334 may include computer-executable instructions, code, or the like that responsive to execution by one or more of the processor(s) 310 may cause operations to be performed including, without limitation, providing proxy/firewall services for receipt of data from a device agent and transmission of data to the device agent.

Referring now to other illustrative components depicted as being stored in the data storage 320, the O/S 322 may be loaded from the data storage 320 into the memory 312 and may provide an interface between other application software executing on the server 302 and hardware resources of the server 302. More specifically, the O/S 322 may include a set of computer-executable instructions for managing hardware resources of the server 302 and for providing common services to other application programs (e.g., managing memory allocation among various application programs). The O/S 322 may include any operating system now known or which may be developed in the future including, but not limited to, any server operating system, any mainframe operating system, or any other proprietary or non-proprietary operating system.

The DBMS 324 may be loaded into the memory 314 and may support functionality for accessing, retrieving, storing, and/or manipulating data stored in the memory 312 and/or data stored in the data storage 320. The DBMS 324 may use any of a variety of database models (e.g., relational model, object model, etc.) and may support any of a variety of query languages. The DBMS 324 may access data represented in one or more data schemas and stored in any suitable data repository such as any of the datastore(s) 382. The datastores(s) 382 may include any of the datastores depicted in FIG. 2 and the contextual data 384, feedback data 386, settings data 388, ranking data 390, and cards 392 may include any of the corresponding data described with reference to FIG. 2. The datastore(s) 382 may include, without limitation, databases (e.g., relational, object-oriented, etc.), file systems, flat files, distributed datastores in which data is stored on more than one node of a computer network, peer-to-peer network datastores, or the like.

Referring now to other illustrative components of the server 302, one or more input/output (I/O) interfaces 314 may be provided that may facilitate the receipt of input information by the server 302 from one or more I/O devices as well as the output of information from the server 302 to the one or more I/O devices. The I/O devices may include, for example, one or more user interface devices that facilitate interaction between a user and the server 302 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 302 may further include one or more network interfaces 316 via which the server 302 may communicate with any of a variety of other systems, platforms, networks, devices, and so forth. Such communication may occur via any of one or more of the network(s) 308.

Referring now to other illustrative components of the networked architecture 300, in an illustrative configuration, the card producer server 304 may include one or more processors (processor(s)) 336, one or more memory devices 338 (generically referred to herein as memory 338), one or more input/output ("I/O") interface(s) 340, one or more network interfaces 342, and data storage 344. The card producer server 304 may further include one or more buses 344 that functionally couple various components of the server 304. The bus(es) 344 of the card producer server 204 may include any of the example buses and bus architectures described with reference to the server 302. Similarly, the processor(s) 336 may include any of the example types of processors described with reference to the processor(s) 310, the memory 338 may include any of the example types of memory described with reference to the memory 312, the I/O interface(s) 340 may include any of the example types of I/O interfaces described with reference to the I/O interface(s) 314, and the network interface(s) 342 may include any of the example types of network interface(s) described with reference to the network interface(s) 316.

The data storage 346 may include any of the example types of data storage described with reference to the data storage 320. The data storage 346 may store computer-executable code, instructions, or the like that may be loadable into the memory 338 and executable by the processor(s) 336 to cause the processor(s) 336 to perform or initiate various operations. The data storage 346 may additionally store data that may be copied to memory 338 for use by the processor(s) 336 during the execution of the computer-executable instructions. Moreover, output data generated as a result of execution of the computer-executable instructions by the processor(s) 336 may be stored initially in memory 338, and may ultimately be copied to data storage 346 for non-volatile storage.

More specifically, the data storage 346 may store one or more operating systems (O/S) 348; one or more database management systems (DBMS) 350; and one or more program modules, applications, or the like including one or more card generation modules 350, one or more card updated modules 354, and one or more APIs 356. The O/S 348 may include any of the example types of operating systems and may support any of the example functionality described with reference to the O/S 322. Similarly, the DBMS 350 may include any of the example types of database management systems and may support any of the example functionality described with reference to the DBMS 324. Any of the program modules may include computer-executable code, instructions, or the like that may be loaded into the memory 338 for execution by one or more of the processor(s) 336. Further, data stored in the data storage 346 may be loaded into the memory 338 for use by the processor(s) 336 in executing computer-executable code.

Referring now to functionality supported by the various program modules over the server 304 depicted in FIG. 2, the card generation module(s) 352 may include computer-executable instructions, code, or the like that responsive to execution by one or more of the processor(s) 336 may cause operations to be performed including, without limitation, generating, based at least in part on the contextual data 384 and/or the settings data 388, cards 392 that are personalized to the tastes/preferences of a user and contextually relevant to a current, historical, or future use context of a user device 306.

The card update module(s) 354 may include computer-executable instructions, code, or the like that responsive to execution by one or more of the processor(s) 336 may cause operations to be performed including, without limitation, generating new cards or updated cards with updated card content having an increased degree of personalization and/or an increased contextual relevance based at least in part on the feedback data 386 and at least one of the contextual data 384 or the settings data 388.

The APIs 356 may include computer-executable instructions, code, or the like that responsive to execute by one or more of the processor(s) 336 may cause operations to be performed including, without limitation, querying the context service module(s) 326 for the contextual data 384, querying the card device module(s) 328 for the feedback data 386 and/or the settings data 388, pushing new cards or updated cards 392 to the device service module(s) 330, and so forth.

Referring now to other illustrative components of the server 302, one or more input/output (I/O) interfaces 314 may be provided that may facilitate the receipt of input information by the server 302 from one or more I/O devices as well as the output of information from the server 302 to the one or more I/O devices. The I/O devices may include, for example, one or more user interface devices that facilitate interaction between a user and the server 302 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The server 302 may further include one or more network interfaces 316 via which the server 302 may communicate with any of a variety of other systems, platforms, networks, devices, and so forth. Such communication may occur via any of one or more of the network(s) 308.

Referring now to other illustrative components of the networked architecture 300, in an illustrative configuration, the user device 306 may include one or more processors (processor(s)) 358, one or more memory devices 360 (generically referred to herein as memory 360), one or more input/output ("I/O") interface(s) 362, one or more network interfaces 364, and data storage 368. The user device 306 may further include one or more buses 366 that functionally couple various components of the user device 306. The bus(es) 366 of the user device 306 may include any of the example buses and bus architectures described with reference to the server 302 or the server 304. Similarly, the processor(s) 358 may include any of the example types of processors described with reference to the processor(s) 310 or the processor(s) 336, the memory 360 may include any of the example types of memory described with reference to the memory 312 or the memory 338, the I/O interface(s) 362 may include any of the example types of I/O interfaces described with reference to the I/O interface(s) 314 or the I/O interface(s) 340, and the network interface(s) 364 may include any of the example types of network interface(s) described with reference to the network interface(s) 316 or the network interface(s) 342.

The data storage 368 may include any of the example types of data storage described with reference to the data storage 320 or the data storage 346. The data storage 368 may store computer-executable code, instructions, or the like that may be loadable into the memory 360 and executable by the processor(s) 358 to cause the processor(s) 358 to perform or initiate various operations. The data storage 368 may additionally store data that may be copied to memory 360 for use by the processor(s) 358 during the execution of the computer-executable instructions. Moreover, output data generated as a result of execution of the computer-executable instructions by the processor(s) 358 may be stored initially in memory 360, and may ultimately be copied to data storage 368 for non-volatile storage.

More specifically, the data storage 368 may store one or more operating systems (O/S) 370; and one or more program modules, applications, or the like including one or more applications 372, a client card library 374, a device agent 376, and a rules engine 378. In one or more example embodiments, the application(s) 372 may include a card consumer such as, for example, the card consumer 320. Further, in one or more example embodiments of the disclosure, the client card library 374, the device agent 376, and the rules engine 378 may correspond to the client card library 218, the device agent 206, and the rules engine 208, respectively. Any of the program modules, applications, or the like may include computer-executable code, instructions, or the like that may be loaded into the memory 360 for execution by one or more of the processor(s) 358. Further, data stored in the data storage 368 may be loaded into the memory 360 for use by the processor(s) 358 in executing computer-executable code. The O/S 370 may include any of the example types of operating systems and may support any of the example functionality described with reference to the O/S 322 or the O/S 348.

It should be appreciated that the program modules, applications, computer-executable instructions, code, or the like depicted in FIG. 3 as being stored in the data storage 320, the data storage 346, and/or the data storage 368 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 302, the server 304, or the user device 306 and/or hosted on other computing device(s) accessible via one or more of the network(s) 308, may be provided to support functionality provided by the program modules, applications, or computer-executable code depicted in FIG. 3 and/or additional or alternate functionality. Further, functionality may be modularized differently such that processing described as being supported collectively by the collection of program modules depicted in FIG. 3 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 3 may be implemented, at least partially, in hardware and/or firmware across any number of devices.

It should further be appreciated that the server 302, the server 304, and/or the user device 306 may include alternate and/or additional hardware, software, or firmware components beyond those described or depicted without departing from the scope of the disclosure. More particularly, it should be appreciated that software, firmware, or hardware components depicted as forming part of the server 302, the server 304, and/or the user device 306 are merely illustrative and that some components may not be present or additional components may be provided in various embodiments. While various illustrative program modules have been depicted and described as software modules stored in data storage 320, the data storage 346, and/or the data storage 368, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 4:
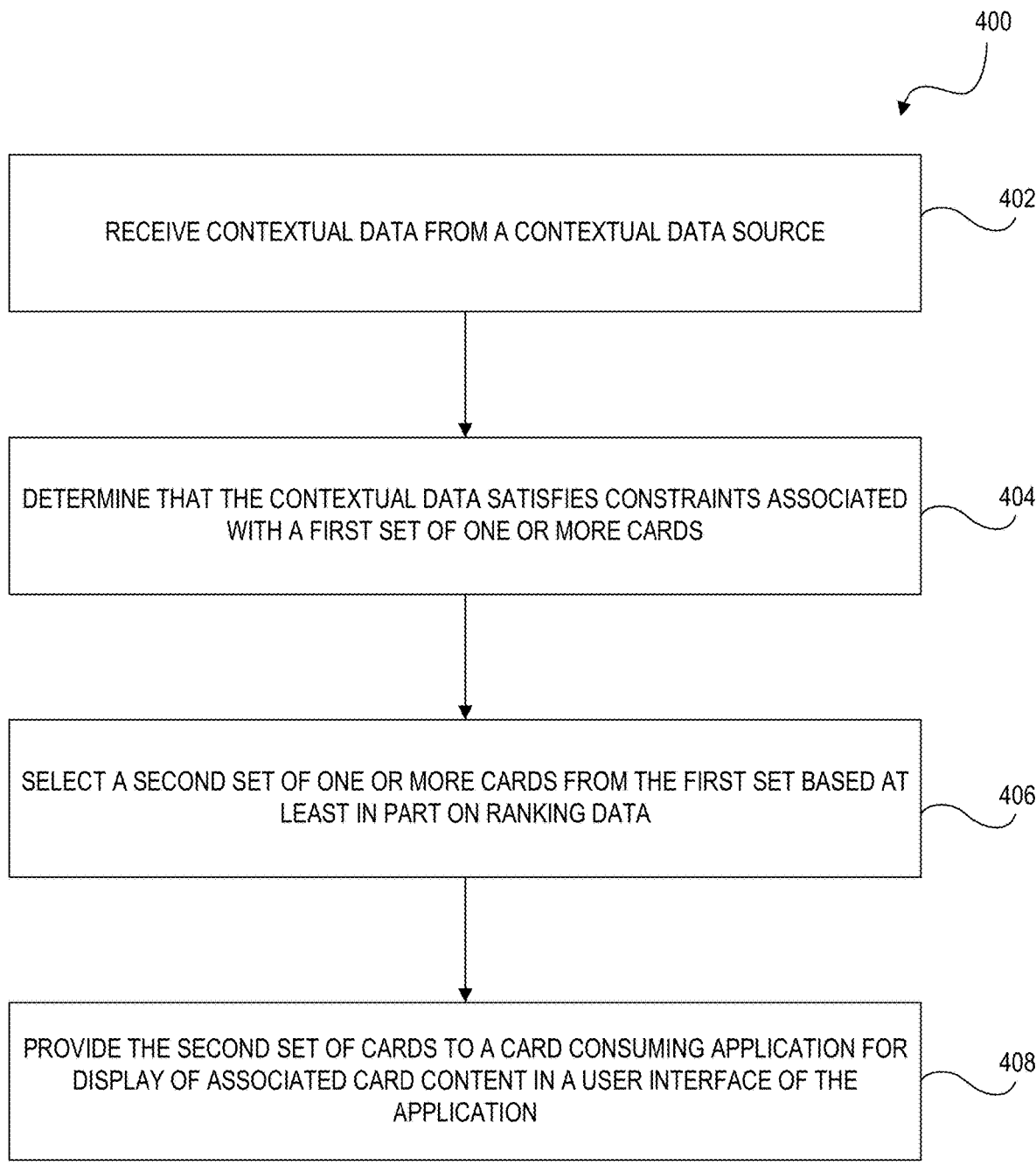
FIG. 4 is a process flow diagram of an illustrative method for selecting one or more cards for display by a card consumer in accordance with one or more example embodiments of the disclosure.

FIG. 4 is a process flow diagram of an illustrative method 400 for selecting one or more cards for display by a card consumer in accordance with one or more example embodiments of the disclosure.

At block 402, the device agent 376 may receive contextual data from a contextual data source. The contextual data may include data indicative of a current use context of the user device 306.

At block 404, the device agent 376 may leverage the rules engine 378 to analyze the contextual data to determine whether constraints associated with various cards are satisfied. Based on an analysis result of the rules engine 378, the device agent may determine, at block 404, that the contextual data satisfies the constraints associated with a first set of one or more cards. As previously noted, the constraints may be specified in card metadata of the cards.

At block 406, the device agent 376 may select a second set of one or more cards from the first set based at least in part on ranking data. The ranking data may indicate scores, rankings, or the like associated with the various card(s) in the first set of cards. The ranking data may further indicate various threshold(s) against which the scores/rankings may be compared to determine which cards are to be selected for inclusion in a second set of one or more cards selected from the first set. The ranking data may further specify a selection methodology for selecting cards based on the ranking data. For example, the ranking data may specify that the first N cards having the highest priority metrics (e.g., highest scores, rankings, or combinations thereof) are to be selected. As another example, the ranking data may specify that any card selected must have a score, ranking, or combination thereof that meets or exceeds a threshold value.

At block 408, the device agent 376 may provide the second set of cards to a card consumer (e.g., one of application(s) 372, card consumer 220, etc.) for display of card content of the cards in a user interface of the card consumer. In certain example embodiments, the device agent 376 may provide the second set of cards to the client card library 374 which may coordinate the rendering of the card content in the user interface of the card consumer.

Figure 5:
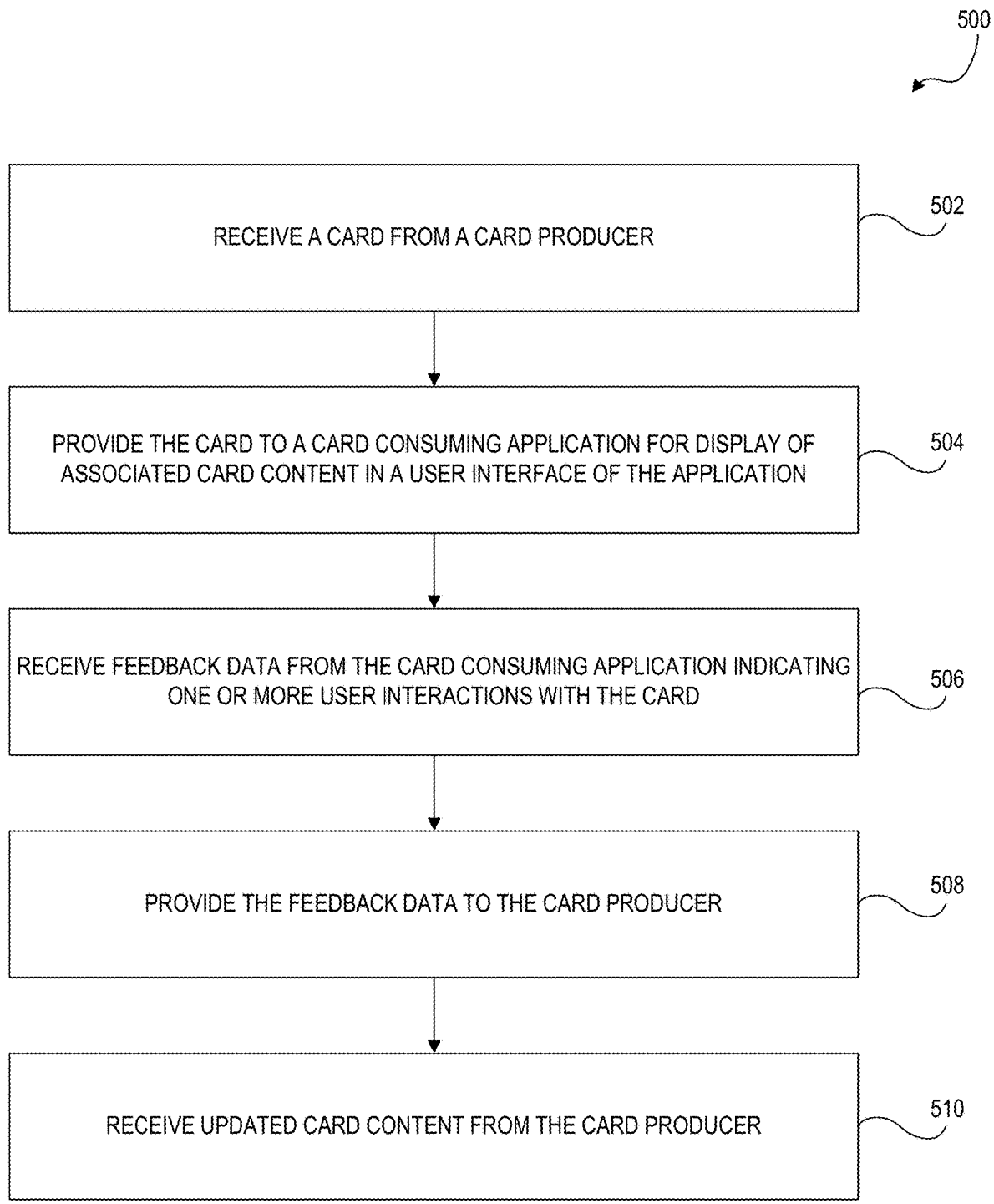
FIG. 5 is a process flow diagram of an illustrative method for receiving feedback data indicating user interaction with a card, providing the feedback data to a card producer, and receiving updated card content from the card producer in accordance with one or more example embodiments of the disclosure.

FIG. 5 is a process flow diagram of an illustrative method 500 for receiving feedback data indicating user interaction with a card, providing the feedback data to a card producer, and receiving updated card content from the card producer in accordance with one or more example embodiments of the disclosure.

At block 502, the device agent 376 may receive a card from a card producer. The card may be received from a local card producer or from a remote card producer via the card service module(s) 328 and the device service module(s) 330.

At block 504, the device agent 376 may provide the card to a card consumer (e.g., one of application(s) 372, card consumer 220, etc.) for display of card content of the card in a user interface of the card consumer. In certain example embodiments, the device agent 376 may provide the card to the client card library 374 which may coordinate the rendering of the card content in the user interface of the card consumer.

At block 506, the device agent 376 may receive feedback data from the card consumer (potentially via the card client library 374) that indicates data relating to one or more user interactions with the card. The feedback data may indicate any of the metrics relating to possible user interactions with the card discussed earlier.

At block 508, the device agent 376 may provide the feedback data to the card producer of the card. In particular, the device agent 376 may transmit the feedback data to the device service module(s) 330 which may, in turn, transmit the feedback data to the card service module(s) 328. The card service module(s) 328 may then transmit a notification message to the card producer that contains the feedback data. The card service module(s) 328 may also store the feedback data and provide it to the card producer in response to a query received from the card producer.

Upon receipt of the feedback data, the card producer may generate updated card content as part of a new card with a new card identifier or as part of an updated card that includes the same card identifier as the card for which the feedback data was received. At block 510, the device agent 376 may receive the new card or updated card containing the updated card content. In the case of a new card having updated card content and a new card identifier, the new card may replace the existing card. In the case of an updated card having updated card content but the same card identifier as the existing card, the existing card may continue to exist and the card content of the existing card may be changed so that the updated card content is displayed. The device agent 376 may provide an instruction to the card consumer to display the updated card content or the card consumer may, upon receipt of the updated card content, independently determine that the updated card content is to replace the existing card content.

While one or more operations of the methods 400 and 500 may be described below as being performed by one or more components of a user device 306 having the illustrative configuration depicted in FIG. 3, it should be appreciated, however, that any of the operations of method 400 or method 500 may be performed by the user device 200 depicted in FIG. 2 or a user device having an alternate configuration. Further, any of the operations of method 400 or method 500 may be performed, at least in part, in a distributed manner by one or more other devices (e.g., the back-end server 302, the card producer server 304, etc.), or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Figure 6:
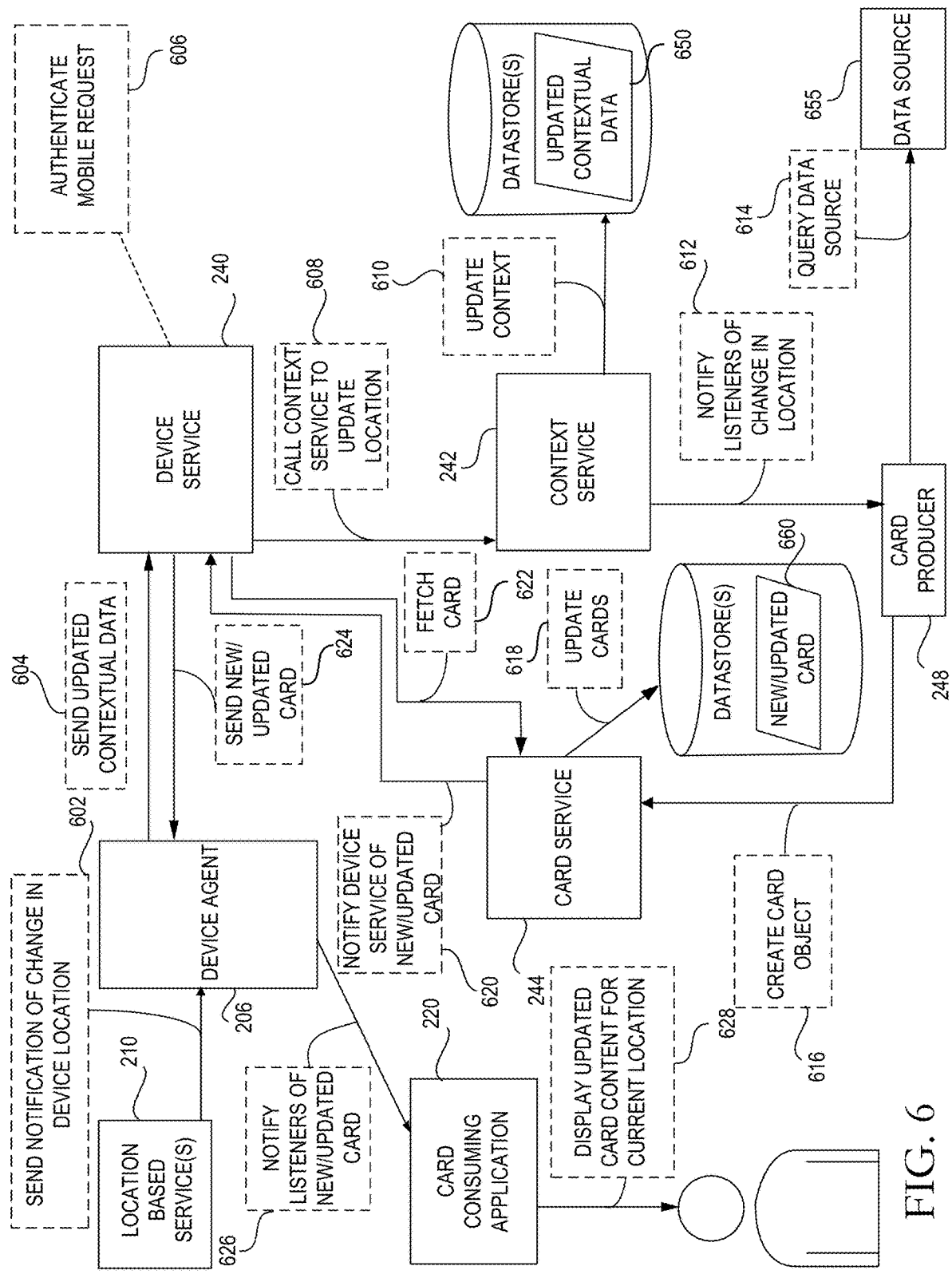
FIG. 6 is a hybrid system and process flow diagram illustrating generation and presentation of new or updated cards in response to a change in device use context in accordance with one or more example embodiments of the disclosure.

FIG. 6 is a hybrid system and process flow diagram illustrating generation and presentation of new or updated cards in response to a change in device use context in accordance with one or more example embodiments of the disclosure. While FIG. 6 may be described using a change in device location as an example of a change in use context for a device, it should be appreciated that the process flow is applicable to any of a variety of device use context changes.

At operation 602, the contextual data source 210 such as a location-based service may send the device agent 206 a notification including updated contextual data indicating a change in a location of the user device 200.

At operation 604, the device agent 206 may send the updated contextual data to the device service 240 in the form of a request for new or updated cards containing updated card content that is contextually relevant to the new device location.

At operation 606, the device service 240 may authenticate the mobile request. At operation 608, the device service 240 may make a call to the context service 242 to update stored contextual data to indicate the change in device location. At operation 610, the context service 242 may store the updated contextual data 650 indicative of the new device location. At operation 612, the context service 242 may notify listeners of the changed device location. The listeners may include one or more card producers that generate cards that may be affected by the change in device location. A particular card producer 248 may detect the changed device location and may query a data source 655, at operation 614, for updated card content that is pertinent to the new device location. For example, if the producer 248 generates a weather-related card, the producer 248 may query a weather service for a current or future weather forecast associated with the new device location. Upon receiving the updated card content from the data source 655, the card producer 248 may generate a new card object or an updated card object at operation 616. A new card object may include the updated card content and a new card identifier, and may replace an existing card of the same card type. An updated card object may include the updated card content and the same card identifier as an existing card of the same card type such that the existing card content of the existing card is replaced with the updated card content while maintaining the existing card.

Upon creating the new/updated card, the card producer 248 may call an API to push the new/updated card to the card service 244. At operation 618, the card service 244 may store the new/updated card 660. At operation 620, the card service 244 may notify the device service 240 of the new/updated card. At operation 622, the device service 240 may make a call to the card service 244 to fetch the new/updated card. At operation 624, the device service 240 may send the new/updated card to the device agent 206. At operation 620, the device agent 206 may notify listeners of the availability of the new/updated card. Listeners may include any card consumer currently displaying a card of the same card type (e.g., card consumer 220). The client card library 118 may also be a listener. At operation 628, the card consumer 220 may display the updated card content for the current device location. If a new card with a new card identifier was generated, the existing card may be replaced with the new card. If an updated card with the same card identifier as an existing card was generated, the content of the existing card may be replaced with the updated card content.

Figure 7:
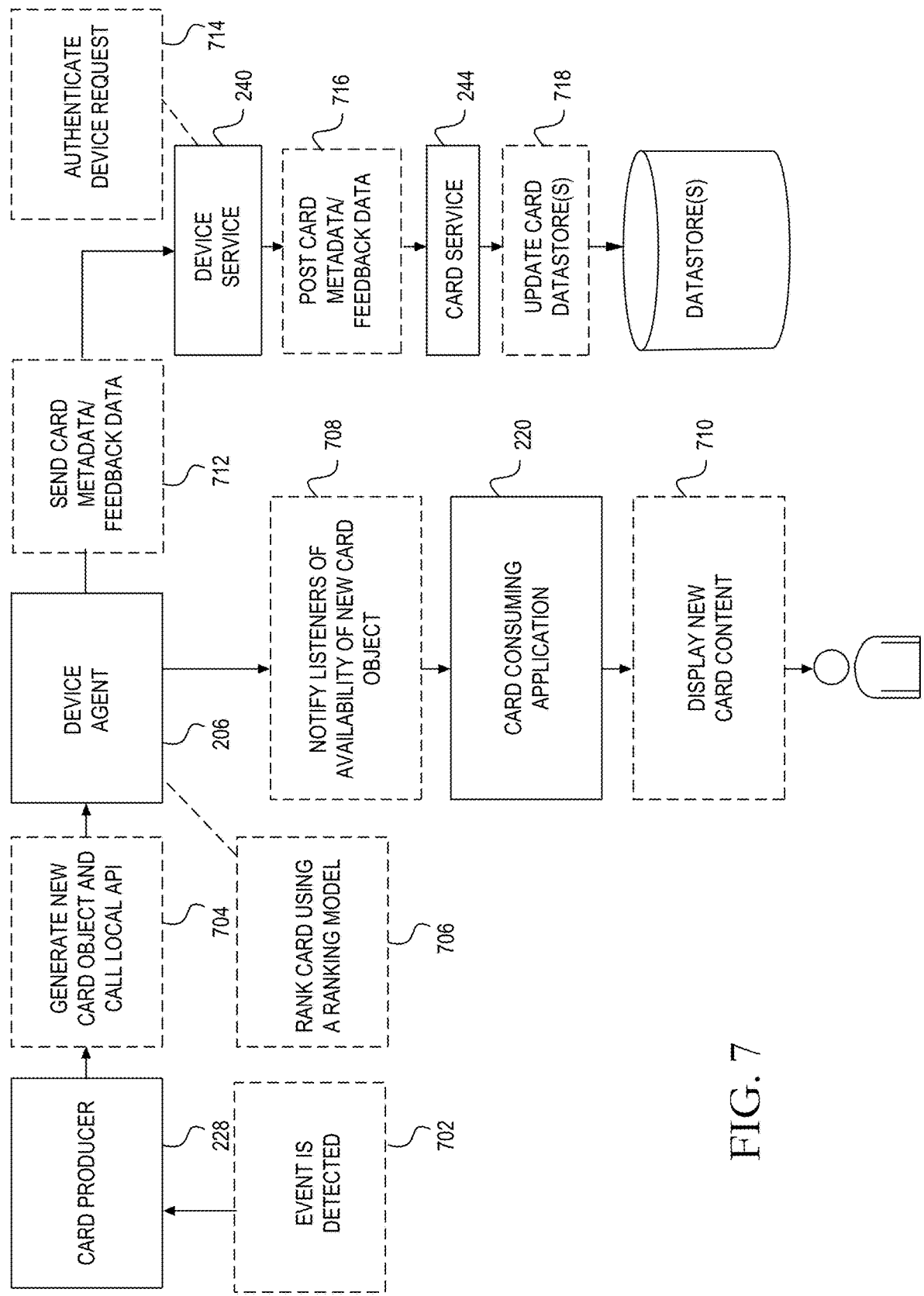
FIG. 7 is a hybrid system and process flow diagram illustrating the generation of cards by a local device card producer in accordance with one or more example embodiments of the disclosure.

FIG. 7 is a hybrid system and process flow diagram illustrating the generation of cards by a local device card producer in accordance with one or more example embodiments of the disclosure.

At operation 702, the local card producer 228 may detect an event. The event may be, for example, an event that results in a change in the use context of the device 200. Non-limiting examples include receipt of an incoming e-mail, SMS message, or instant message; receipt of an incoming call; a calendar event having a start time within a predetermined period of time from a current time, etc.

At operation 704, the local card producer 228 may generate a new card object that includes card content relevant to the detected event and may call a local API to push the new card object to the device agent 206. At operation 706, the device agent 206 may rank the card object using a ranking model. Ranking the card object may include assigning a score and/or a ranking to the card object.

At operation 708, the device agent 206 may notify listeners of the availability of the new card object. The listeners may include the card consumer 220, which may receive the new card object and display the new card content at operation 710. The new card content may be displayed as part of rendering the new card object for the first time. In other example embodiments, the new card object may include the same card identifier as an existing card such that the new card content is, in fact, updated card content for the existing card. In such an example scenario, the existing card may be modified to reflect the updated card content.

At operation 712, the device agent 206 may send metadata associated with the new card object and any feedback data received from user interaction with the new card content to the device service 240 in the form of a request to store the new card content. The device service 240 may authenticate the request at operation 714. Upon successful authentication, the device service 240 may communicate the feedback data and card metadata to the card service 244 at operation 716. The card service 244 may store the new card object at operation 718.

Figure 8:
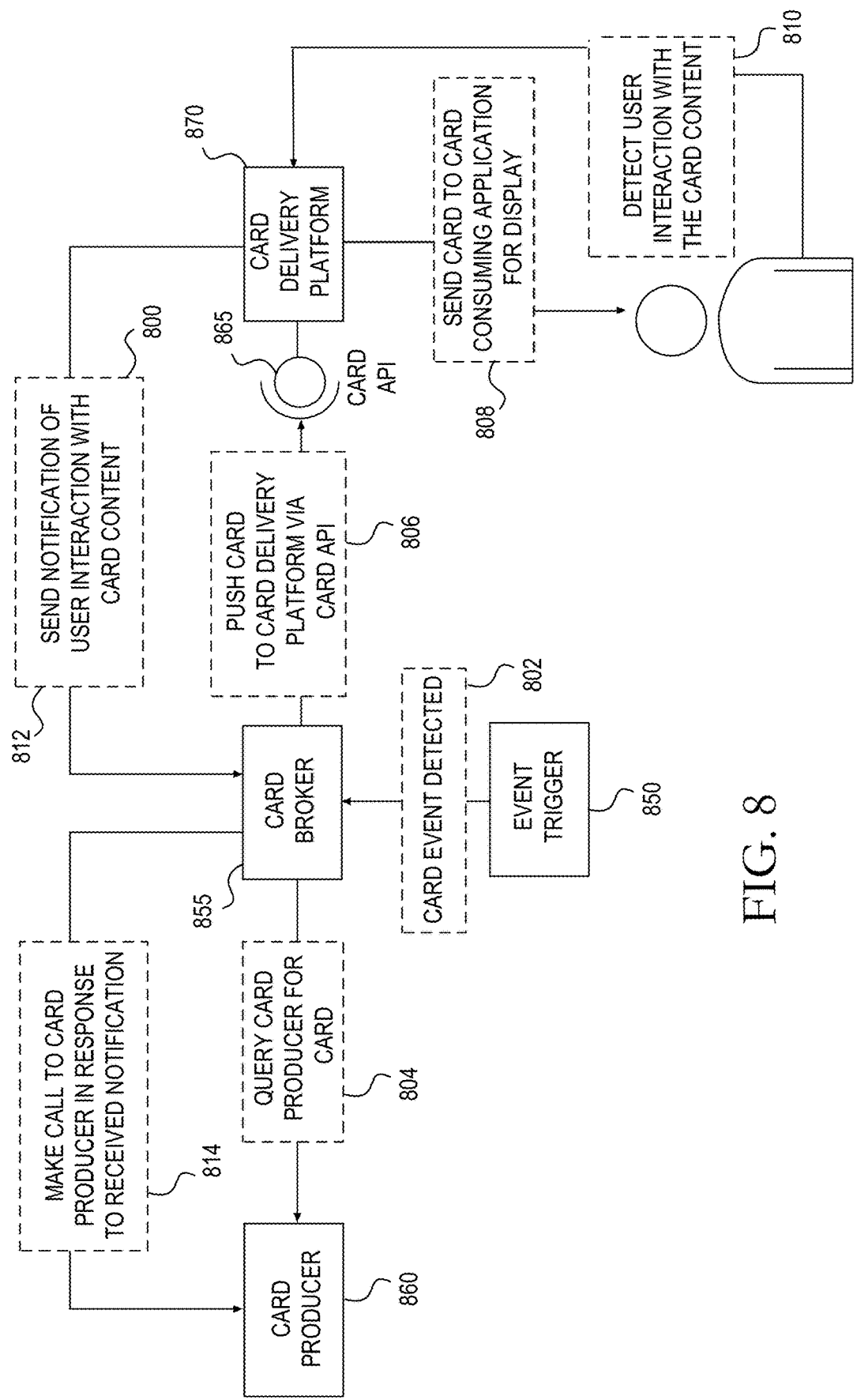
FIG. 8 is a hybrid system and process flow diagram illustrating a brokered model for card generation and delivery in accordance with one or more example embodiments of the disclosure.

FIG. 8 is a hybrid system and process flow diagram illustrating a brokered model for card generation and delivery in accordance with one or more example embodiments of the disclosure.

At operation 802, a card broker 855 may detect a card event generated as a result of an event trigger 850. The card event may be, for example, receipt of updated contextual data that indicates a change in a use context of a device.

At operation 804, the card broker may query a card producer 860 for a card that is contextually relevant to the detected card event. The card broker may query the card producer 860 for a new card type that does not correspond to an existing card type being displayed or available for display to a user or the card broker 855 may query the card producer 860 for updated card content corresponding to an existing card type.

Upon receipt of the card object from the card producer 860, the card broker 855 may push the card to a card delivery platform 870 via a corresponding card API 865. For example, referring to the example architecture of FIG. 2, the card broker 855 may make a call to the card API 865 to cause the card object to be transmitted to the card service 244. Upon receipt of the card object, the card delivery platform 870 may send the card to a card consumer which may display the card content via a user interface of the application. For example, referring once again to the example architecture of FIG. 2, the card service 244 may store the card object and transmit the card object to the device agent 206 via the device service 240. The device agent 206 may, in turn, transmit the card to the card consumer 220 (or the client card library 218) for display in a user interface of the card consumer.

At operation 810, the card delivery platform 870 may detect user interaction with the card content. For example, referring again to the example architecture of FIG. 2, the card consumer 220 may collect feedback data indicating one or more user interactions with the displayed card content. Such interactions, as previously described, may include, without limitation, selecting one or more selectable elements of the card that trigger various actions (e.g., selecting a hyperlink, tapping on the card to launch a mobile application, etc.); dismissing the card from the user interface; rating, reviewing, or providing another form of direct feedback on the card; and so forth. The feedback data may indicate that these interactions occurred and provide various metrics relating to the interactions (e.g., an amount of time that elapsed between displaying a card and dismissal of the card). The display of a card under contextually relevant conditions may be referred to herein as an "impression" and may be considered a type of user interaction.

The card consumer 220 may provide the feedback data to the device agent 206 (potentially via the client card library 218). The device agent 206 may, in turn, communicate the feedback data to the card service 244 via the device service 240. At operation 812, the card delivery platform 870 may transmit a notification to the card broker 855 that may include the feedback data or an indication that feedback data for the card is available. For example, referring again to the example architecture of FIG. 2, the card service 244 may transmit the notification to the card broker 855. At operation 814, the card broker 855 may, in turn, make a call to the card producer 860 informing the card producer 860 that feedback data for the card previously generated by the card producer 860 is available. The card broker 855 may push the feedback data to the card producer as part of making the call at operation 814. In other example embodiments, the card producer 860 may periodically query the card broker 855 for feedback data.

Figure 9:
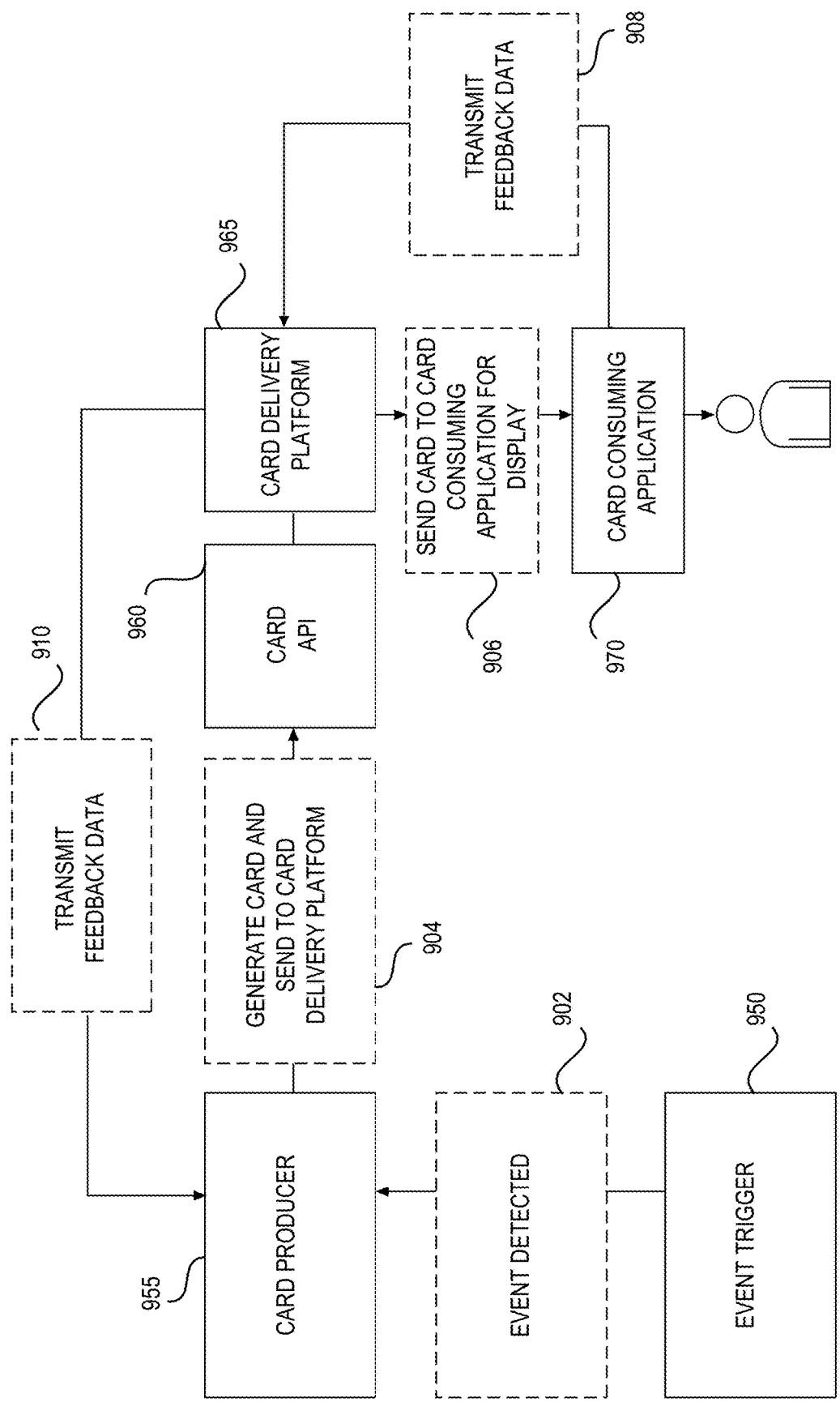
FIG. 9 is a hybrid system and process flow diagram illustrating un-brokered model for card generation and delivery in accordance with one or more example embodiments of the disclosure.

FIG. 9 is a hybrid system and process flow diagram illustrating un-brokered model for card generation and delivery in accordance with one or more example embodiments of the disclosure.

At operation 902, a card producer 955 may detect a card event generated as a result of an event trigger 950. The card event may be, for example, receipt of updated contextual data that indicates a change in a use context of a device.

At operation 904, the card producer 955 may generate a card object and push the card object to the card delivery platform 965 via a card API 960. The card object may be a new card that does not correspond to an existing card being displayed or available for display to a user or the card object may be an updated card that includes new content (e.g., updated card content) corresponding to an existing card. For example, the card object may be an updated card that includes new content but includes the same card identifier as an existing card.

Referring to the example architecture of FIG. 2, the card producer 955 may be a remote card producer 248 that generates a card and pushes the card to the card service 244 via the API 960. The card service 244 may form part of the card delivery platform 965. At operation 906, the card delivery platform 965 may send the card to a card consumer 970 for display. Referring again to the example architecture of FIG. 2, the card consumer 970 may be the card consumer 220, in which case, at operation 906, the card service 244 may transmit the card to the device agent 206 via the device service 240, and the device agent 206 may communicate the card to the card consumer 220 (potentially via the client card library 218).

At operation 908, the card consumer 970 may transmit feedback data indicative of one or more user interactions with the displayed card content to the card delivery platform 965, and at operation 910, the card delivery platform 965 may transmit the feedback data to the card producer 955. Referring again to the example architecture of FIG. 2, at operation 908, the card consumer 220 may transmit the feedback data to the device agent 206 (potentially via the client card library), and the device agent 206 may send the feedback data to the card service 244 via the device service 240. Then, at operation 910, the card service 244 may generate a notification that includes the feedback data or an indication of its availability and transmit the notification to the card producer 955 (e.g., a card producer 248).

While one or more operations depicted in FIGS. 6-9 may have been described in the context of the example architecture of FIG. 2, it should be appreciated that any of the operations depicted in FIGS. 6-9 may be implemented in accordance with the example architecture of FIG. 3. Further, any of the operations described as being performed by a particular component may be performed by any one or more other components, perhaps in a distributed manner. In addition, it should be appreciated that processing performed in response to execution of computer-executable instructions provided as part of an application, program module, or the like may be interchangeably described herein as being performed by the application or the program module itself or by a device on which the application, program module, or the like is executing.

Further, any operations described and depicted with respect to FIGS. 4-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4-9 may be performed.

Figure 10A:
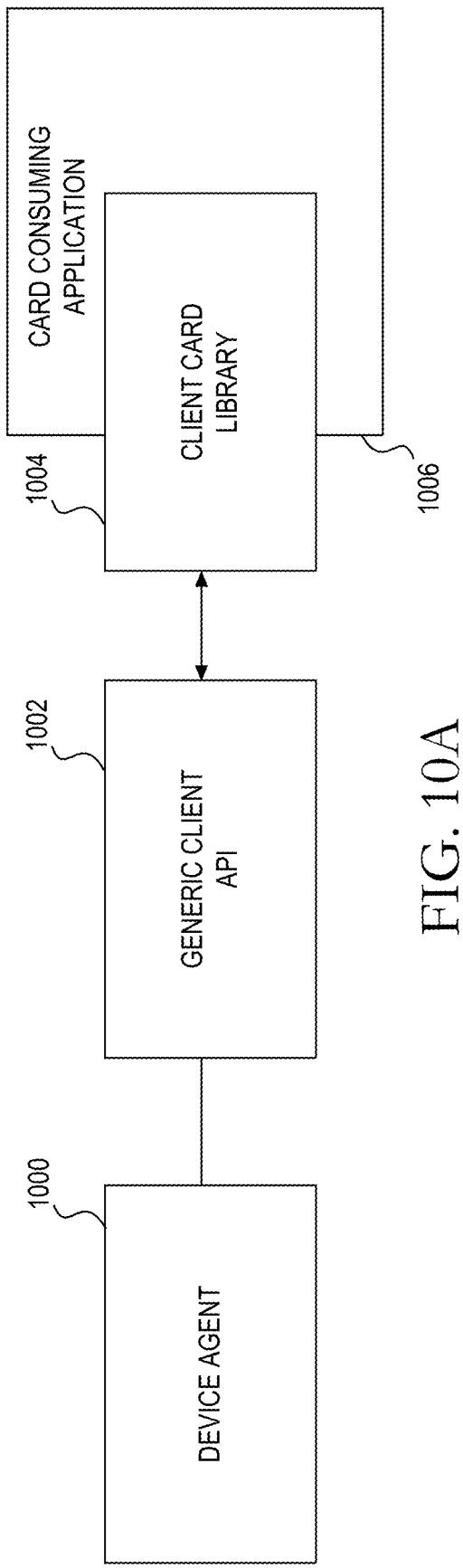
FIGS. 10A-10C are schematic block diagrams of various architectural implementations for supporting the display of card content by different types of card consumers in accordance with one or more example embodiments of the disclosure.
Figure 10B:
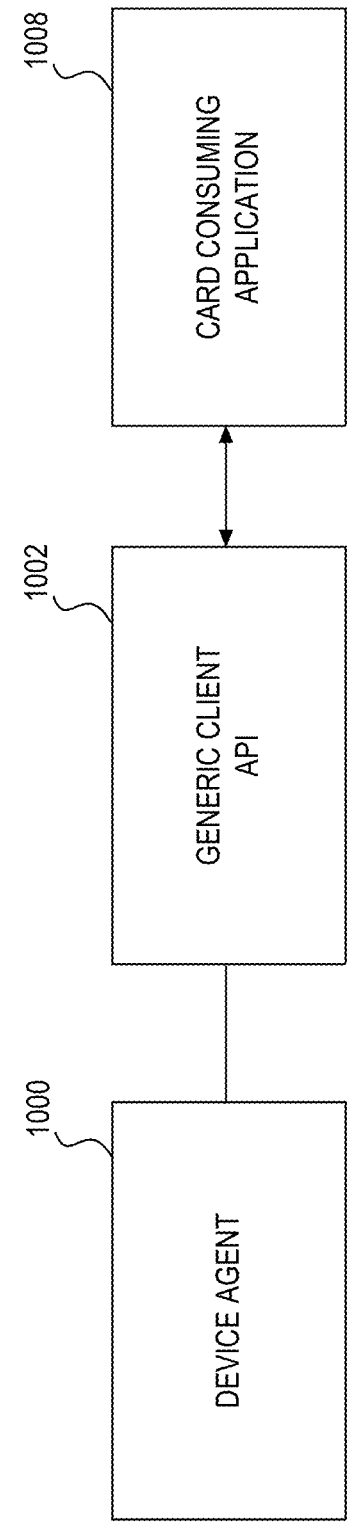
Figure 10C:
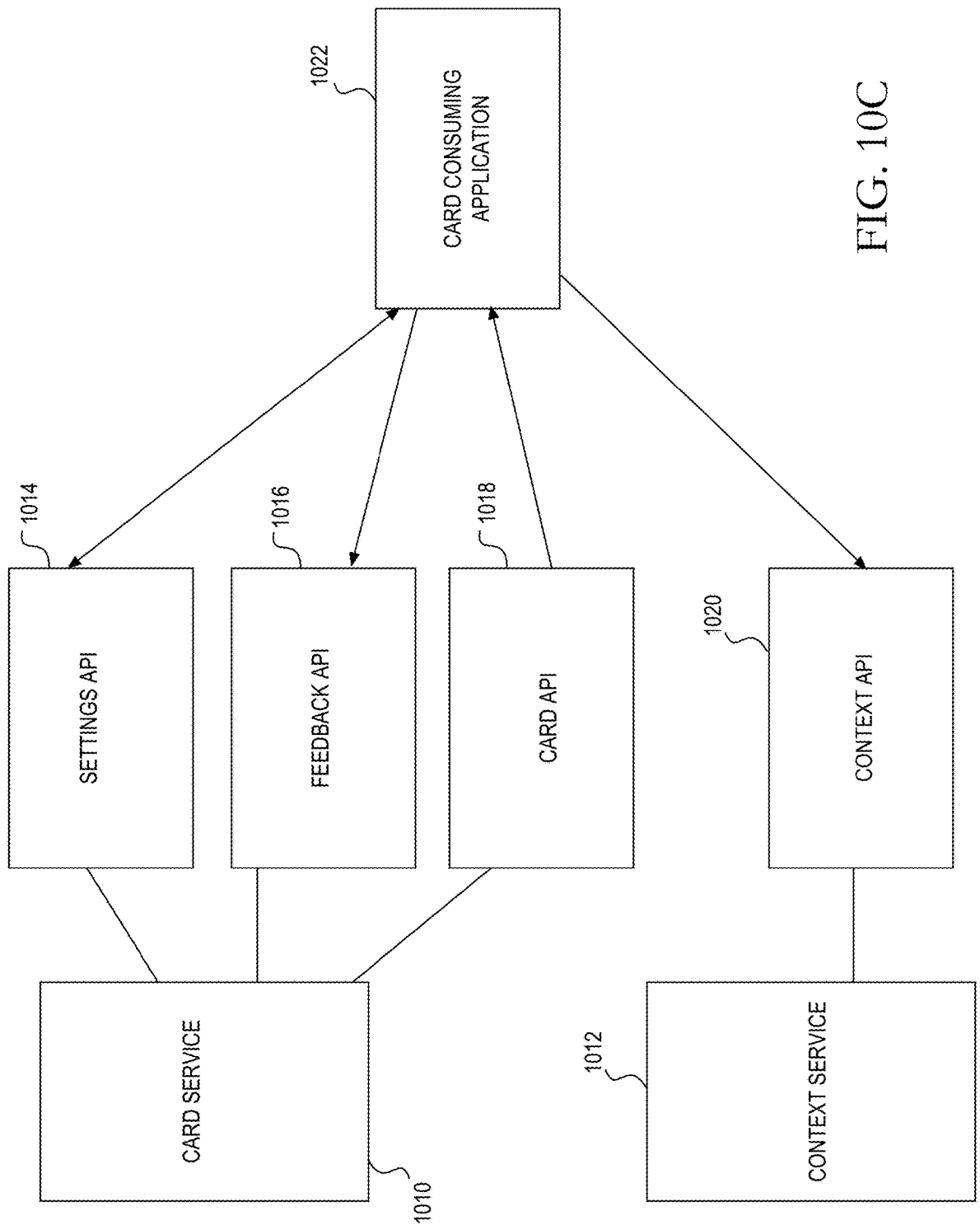

FIGS. 10A-10C are schematic block diagrams of various architectural implementations for supporting the display of card content by different types of card consumers in accordance with one or more example embodiments of the disclosure.

FIG. 10A depicts an architectural configuration in which a card consumer 1006 may include or access a client card library 1004 and may utilize the client card library to make a call to a generic client API 1002 to obtain one or more card objects from the device agent 1000. In certain example embodiments, the device agent 100 may correspond to the device agent 206 or the device agent 376, the client card library 1004 may correspond to the client card library 218 or the client card library 374, and the card consumer 1006 may corresponding to the card consumer 220 or an application of the application(s) 372.

FIG. 10B depicts an alternative architectural configuration to that depicted in FIG. 10. In FIG. 10B, a card consumer 1008 may directly receive cards from the device agent 1000 via the generic client API 1002. This may provide the card consumer 1008 with access to the actual card object which may allow the card consumer 1008 to generate a custom presentation of card content. In certain example embodiments, the custom presentation may not be limited to a template on which the card object may be based.

FIG. 10C depicts yet another alternative architectural configuration to those depicted in FIGS. 10A and 10B. The architectural configuration depicted in FIG. 10C may correspond to scenarios in which no card management delivery platform components (e.g., a device agent, a client card library, etc.) may be provided on a user device. Accordingly, a card consumer 1022 may communicate with a card service 1010 and a context service 1012 via respective APIs. More specifically, the card consumer 1022 may communicate settings data to the card service 1010 via a settings API 1014 and feedback data 1016 to the card service 1010 via a feedback API 1016. Further, the card consumer 1022 may receive cards from the card service 1010 via a card API 1018. In addition, the card consumer 1022 may communicate contextual data to the context service 1012 via a context API 1020.

Illustrative Card Objects

Figure 11:
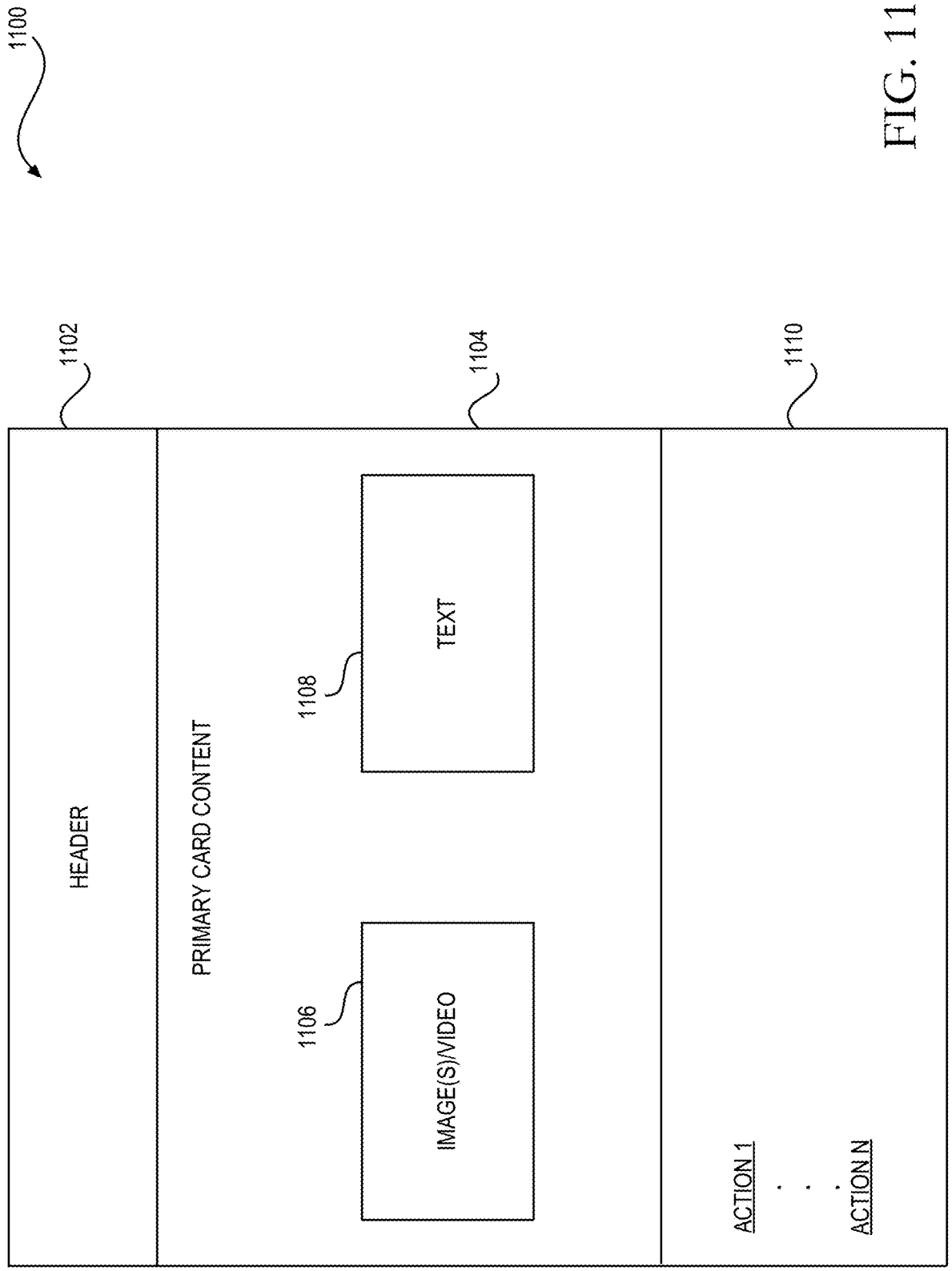
FIG. 11 is a schematic diagram of displayed card content in accordance with one or more example embodiments of the disclosure.

FIG. 11 is a schematic diagram of displayed card content in accordance with one or more example embodiments of the disclosure. The displayed content of an example card 1100 may include a header 1102 that may include prominently displayed text of the card 1100. The displayed content may further primary card content 1104 that may include images, graphics, video content, etc. 1106 and text content 1108. In addition, the displayed content may include one or more selectable widgets 1110 that when selected may trigger various actions such as, for example, launching an application, directing a browser application to a web resource, or the like. It should be appreciated that other portions of the displayed content may be selectable as well. For example, one or more images 1106 may be selectable and may cause other applications on the device to be launched responsive to selection. In addition, in certain example embodiments, any portion of the displayed card content may be selectable. For example, any portion of a weather-related card may be selectable and may cause a related weather application to be launched responsive to selection.

Figure 12:
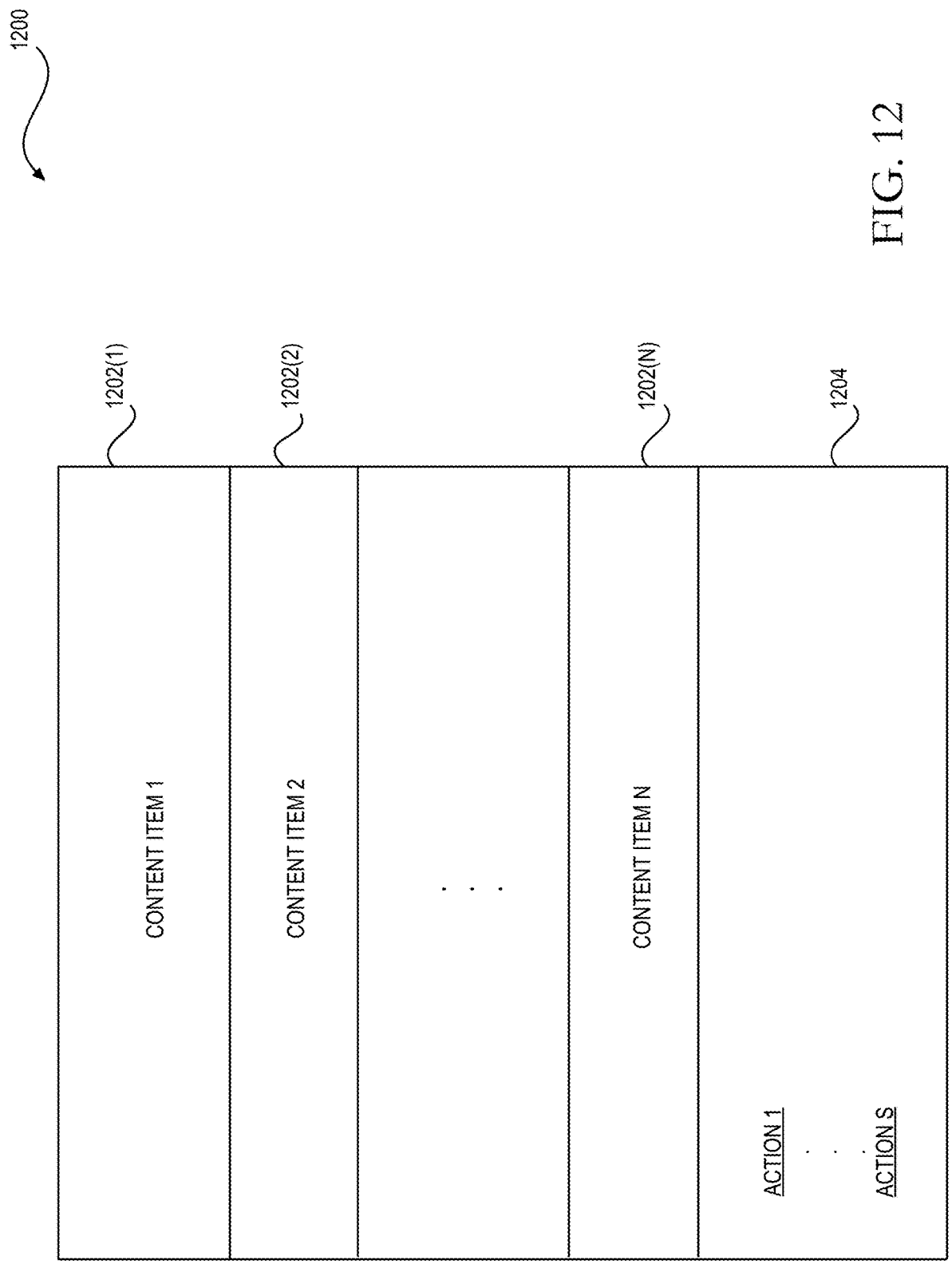
FIG. 12 is a schematic diagram of displayed card content in accordance with one or more other example embodiments of the disclosure.

FIG. 12 is a schematic diagram of displayed card content in accordance with one or more other example embodiments of the disclosure. In the example card 1200 depicted in FIG. 12, one or more content items 1202(1)-1202(N) may be presented in succession. The content items 1202(1)-1202(N) may include an indication of recently received electronic communications or voice calls (in the case of an e-mail or voice calling card, for example), an indication of news items (in the case of a news-related card), and so forth. The displayed card content may further include one or more selectable widgets 1204 similar to the example card content depicted in FIG. 11.

Figure 13:
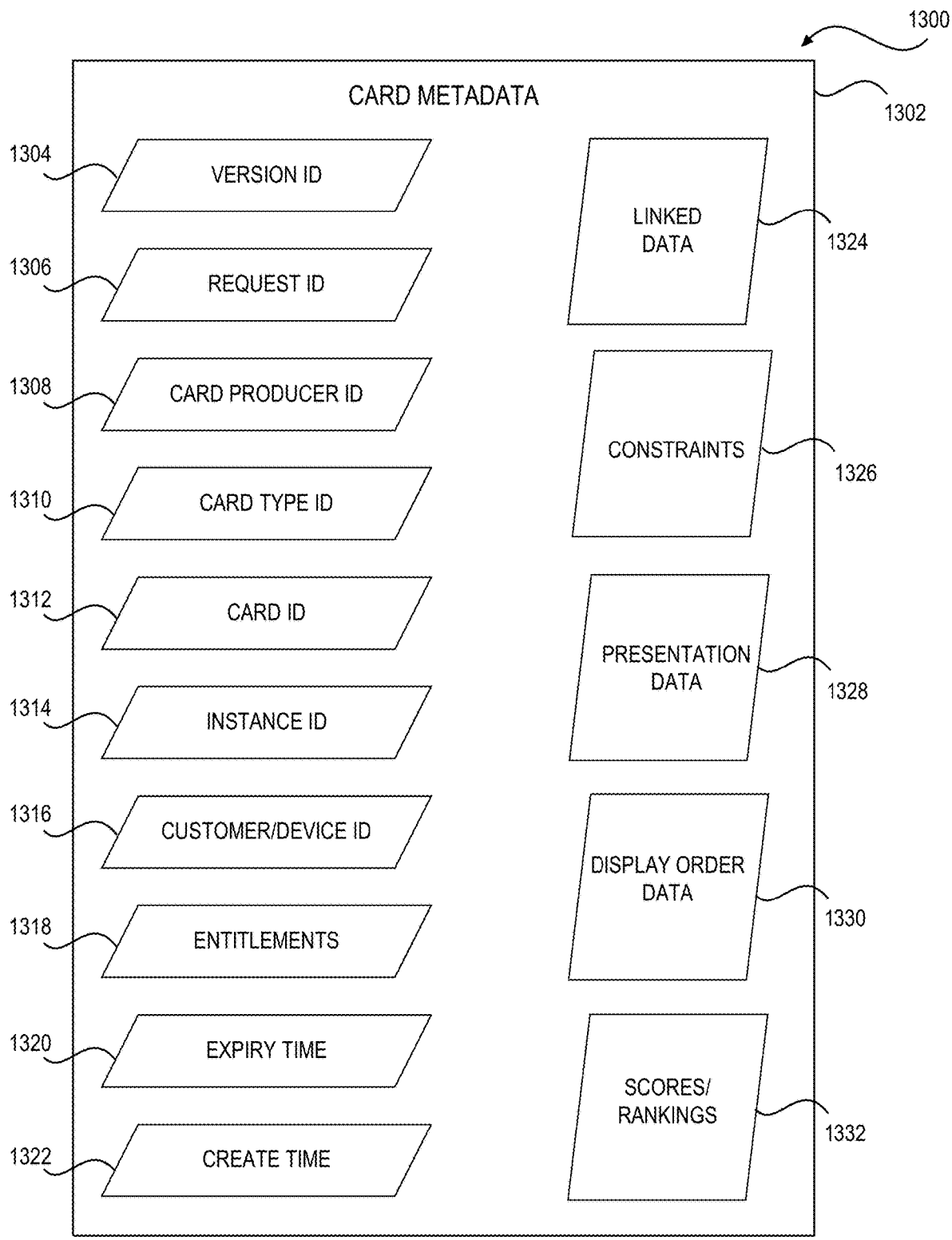
FIG. 13 is a schematic block diagram of illustrative card metadata in accordance with one or more example embodiments of the disclosure.

FIG. 13 is a schematic block diagram of illustrative card metadata 1302 for an illustrative card 1300 in accordance with one or more example embodiments of the disclosure. FIG. 13 will be described with respect to the illustrative architecture of FIG. 2.

The card metadata 1302 may include various identifiers associated with the card 1300. For example, the card metadata may include a version identifier 1304 that indicates a version of an Application Programming Interface (API) used by a card producer 248 to post the card 1300 to the card service 244 which, in turn, may transmit the card to the device agent 206 executing on the user device 200. The card metadata 1302 may further include a request identifier 1306. The request identifier 1306 may be used by the device agent 206 and the device service 240 for synchronization purposes to ensure that the same card data is being maintained both locally on the device 200 and remotely on one or more servers on which the device service 240 is executing. The request identifier 1306 may also be used to stamp feedback data (e.g., the feedback data 224) to link the feedback data to the card 1300. The card metadata 1302 may further include a producer identifier 1308 that may serve to create a namespace of card types and to identify the card producer 248 of the card 1300. The card metadata 1302 may additionally include a card type identifier 1310 that may indicate the type of card (e.g., a meal-related card, a weather-related card, etc.).

The card metadata 1302 may additionally include a card identifier 1312 that identifies a particular presentable card. The producer identifier 1308 in conjunction with the card type identifier 1312 may create a namespace of card identifiers. In certain example embodiments, a user may be able to select a setting to selectively turn on or off the presentation of cards based on the card type identifier 1312.

The card metadata 1302 may also include a card instance identifier 1314 that may identify a particular instance of the card 1300. In certain example embodiments, a card producer may produce multiple instances of a card, with each instance having a different card instance identifier 1314 but the same card identifier 1312. Different instances of the card 1300 may correspond to different versions of the card 1300 with different card content relevant to different contextual conditions. For example, the card 1300 may be a "lunchtime" card for which the card producer may have produced multiple instances that provide different restaurant recommendations in relation to different geo-coordinates. The different contextual conditions to which different instances of the card 1300 may be relevant may be embodied as constraints 1326 within the card metadata 1302.

The card metadata 1302 may further include a customer identifier 1316 that may indicate a particular user for whom the card 1300 is intended and/or a device identifier 1316 that may indicate a particular device on which the card 1300 is to be presented. If no device identifier is specified, the card may be presented on any device associated with the customer identifier 1316.

The card metadata 1302 may further include a time/datestamp 1320 that indicates a point in time at which the card expires and is no longer available for presentation and a time/datestamp 1322 indicating a point in time at which the card producer generated the card (which may differ from a point in time at which the card is pushed to the card service via a call to a corresponding API). The card metadata may further include entitlements data 1318 that may indicate various types of data that a user may be permitted to opt out of sharing. For example, the card 1300 may require data that a user must be provided with an option of not sharing. The entitlements data 1318 may indicate any such data.

The card metadata may further include linked data 1324 that includes structured machine-readable data indicating various attributes of card content of the card 1300, constraints 1326 that specify desired contextual conditions or contextual conditions that must be present before the card content is presented, presentation data 1328 that may specify the format and organization for how the card content should be presented, display order data 1330 which may be a Boolean value that specifies whether the card 1300 should be displayed more prominently when the card content is updated, and scores/ranking data 1332 that may specify a producer-generated and/or platform-generated score for the card 1300 indicative of a degree to which the card is personalized and/or contextually relevant for a user, a ranking indicative of a presentation priority of the card content in relation to one or more other cards, and so forth. It should be appreciated that the card metadata 1302 depicted in FIG. 13 is merely illustrative and not exhaustive.

Illustrative User Interface (UI)/User Experience (UX)

Figure 14:
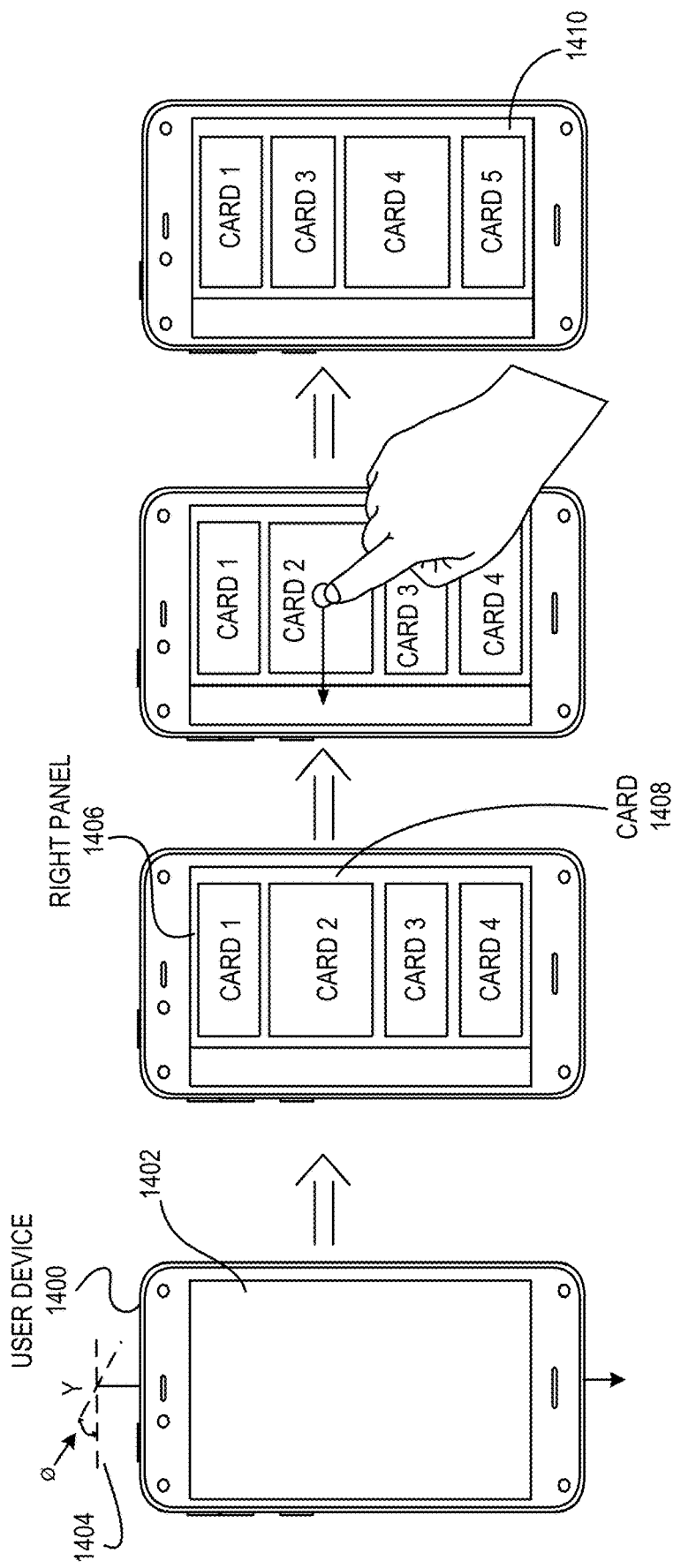
FIG. 14 is a schematic diagram of a series of illustrative user actions for initiating a presentation of a card via a user interface of a card consumer and dismissing a card from the user interface in accordance with one or more example embodiments of the disclosure.

FIG. 14 is a schematic diagram of a series of illustrative user actions for initiating a presentation of a card via a user interface of a card consumer and dismissing a card from the user interface in accordance with one or more example embodiments of the disclosure.

A user device 1400 may be provided on which a user interface 1402 may be displayed. The user interface 1402 may be a home screen of the user device 1400 or an interface associated with any other application executable on the device (e.g., a downloaded mobile application, a messaging application, an e-mail client application, etc.). A user may perform a gesture 1404 (e.g., a tilt gesture) which may cause a right panel 1406 to appear as an overlay over the user interface 1402. A portion of the user interface 1402 may remain un-obscured by the right panel 1406. It should be appreciated that any suitable gesture may be performed to cause the right panel 1406 to be displayed.

The right panel 1406 may be a card consumer. The right panel may present card content associated with various cards (e.g., cards 1-4). The user may interact with the cards in various ways. For example, the user may perform a gesture (e.g., a swipe) to remove or "dismiss" a card 1408 (e.g., card 2) from the right panel 1406. If the user dismisses a card currently being displayed, the presentation of the cards may be modified to accommodate an additional card 1410 (e.g., card 5). It should be appreciated that the right panel 1406 is merely an example type of card consumer and that cards may be presented by numerous other types of card consumers such as browser application, dedicated mobile applications, or the like. Further, the gestures, location of the right panel 1406, and so forth are merely illustrative and not exhaustive. For example, in another example embodiment, a card may be dismissed by performing a double tap gesture, the right panel 1406 may be caused to be appear by a swivel gesture, and so forth. As another example, the card consumer may be a left panel that appears from the left side of a display screen in response to a gesture, a top panel that appears from a top side of the display screen, and so forth.

Figure 15:
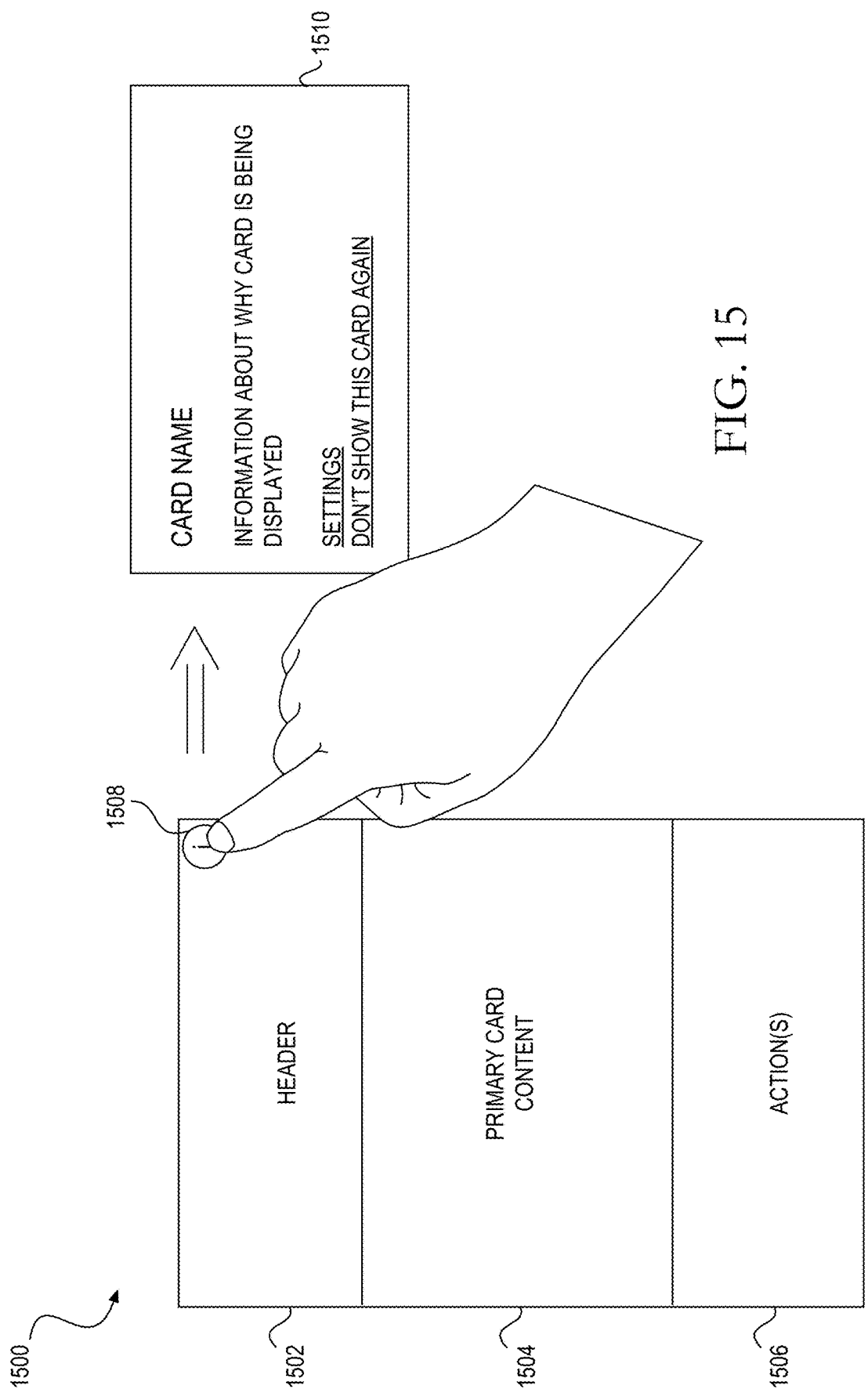
FIG. 15 is a schematic diagram of an illustrative user action for initiating a display of information relating to a card in accordance with one or more example embodiments of the disclosure.

FIG. 15 is a schematic diagram of an illustrative user action for initiating a display of information relating to a card in accordance with one or more example embodiments of the disclosure. Presented card content of an example card 1500 may include header content 1502, primary card content 1504, and one or more selectable widgets for triggering one or more actions 1506. In addition, a selectable widget 1508 may be presented that, when selected, presents information identifying the card and why the card is being presented. In this manner, a user may gain greater insight into the contextual relevance and/or personalization of the card content.

Figure 16:
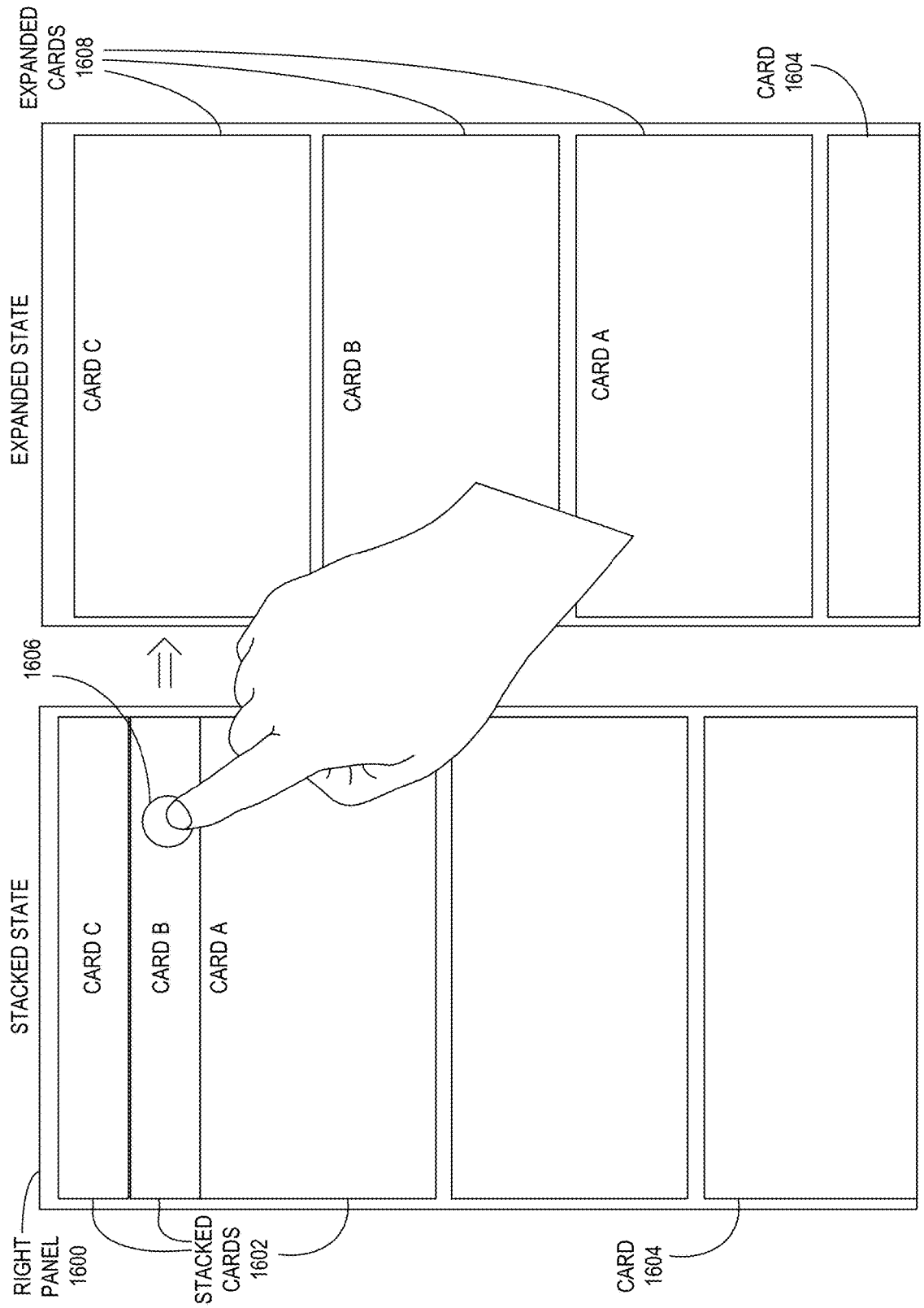
FIG. 16 is a schematic diagram of an illustrative user action for expanding a set of stacked cards in accordance with one or more example embodiments of the disclosure.

FIG. 16 is a schematic diagram of an illustrative user action for expanding a set of stacked cards in accordance with one or more example embodiments of the disclosure. A right panel 1600 is shown as an example card consumer. Various cards (e.g., Cards A-C) are depicted as being presented in a stacked state 1602. A user gesture performed with respect to any card among the stacked set of cards 1602 (e.g., a tap) may cause the cards to transition from the stacked state 1602 to the expanded state 1608. Expansion of the cards may cause a particular card 1604 that was previously displayed in full when the cards were in the stacked state 1602 to become partially displayed. In certain example embodiments, only cards of the same card type may be stackable. For example, a set of weather-related cards may be stackable. In other example embodiments, cards of different types may be stackable as well.

FIGS. 17A-17D are schematic diagrams of a series of illustrative user actions for scrolling through a list of cards presented via a user interface of a card consumer in accordance with one or more example embodiments of the disclosure.

A right panel 1700 is again shown as an example card consumer. In a first stage of the series of user actions, a user may perform a gesture 1702 such as, for example, a swipe to scroll through the set of cards displayed in the right panel 1700. In response to the gesture 1702, the set of cards displayed in the right panel 1700 may shift upwards causing certain cards to no longer be displayed in the right panel 1700 (e.g., card 1) and causing other cards to become displayed (e.g., card 5). Certain cards may be partially displayed in the right panel 1700 (e.g., card 2, card 6). In certain example embodiments, the cards may be rendered dynamically as they enter the right panel 1700 or may have been pre-rendered prior to being displayed in the right panel 1700.

The user may perform an additional gesture 1704 (e.g., a swipe) to continue to scroll through the cards. This may cause additional cards (e.g., card 2 and card 3) to leave the display view of the right panel 1700. Once a set of stackable cards are outside of the view of the display panel 1700, the cards may transition to a stacked state 1708. If the stacked cards are again brought into the view of the right panel 1700, the cards may remain in the stacked state 1708 until expanded by a user gesture (e.g., a double tap) or may be automatically expanded.

Figure 18:
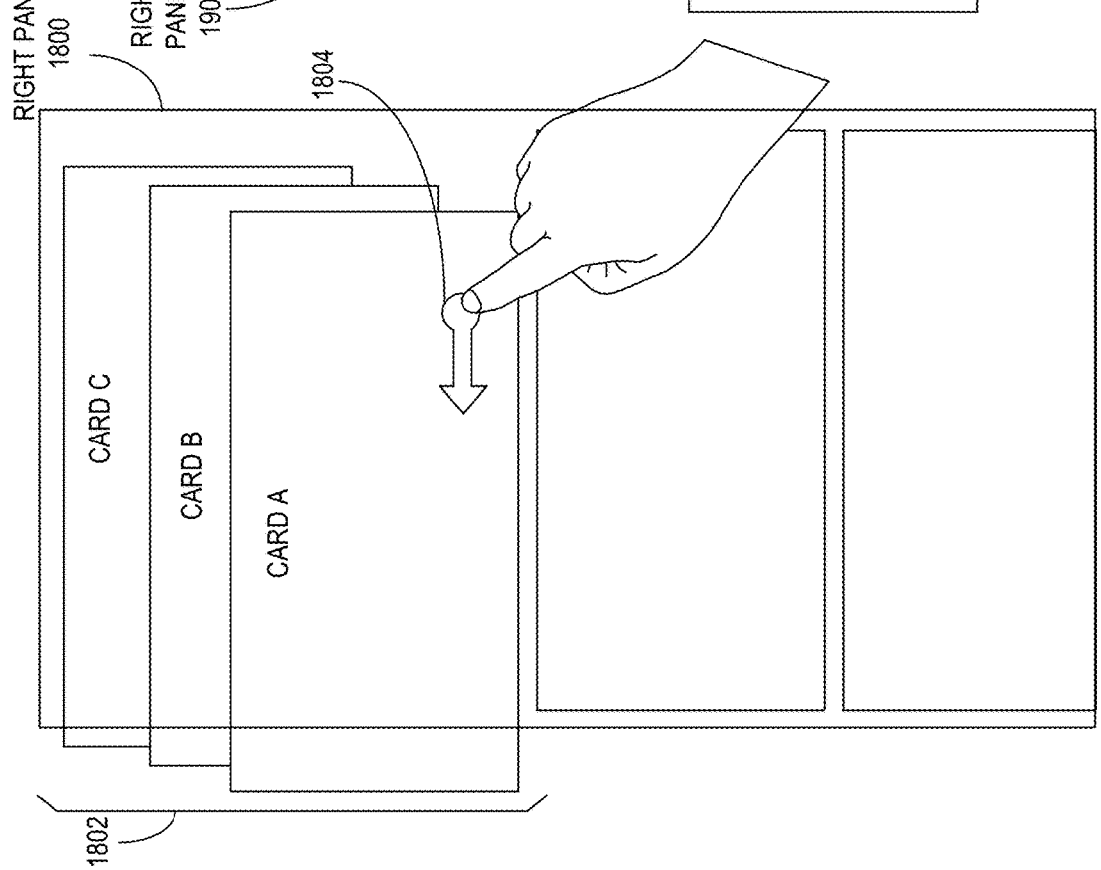
FIG. 18 is a schematic diagram of an illustrative user action for dismissing a stacked set of cards in accordance with one or more example embodiments of the disclosure.

FIG. 18 is a schematic diagram of an illustrative user action for dismissing a stacked set of cards in accordance with one or more example embodiments of the disclosure. A right panel 1800 is again depicted as an example card consumer. A user may dismiss (remove) a set of cards in a stacked state 1802 from the right panel 1800 by performing a gesture 1804 (e.g., a swipe) with respect to the displayed card content of any of the cards in the stacked state 1802. Performing the gesture with respect to any given card in the stacked set of cards may cause the entire stacked set of cards to be dismissed.

Figure 19:
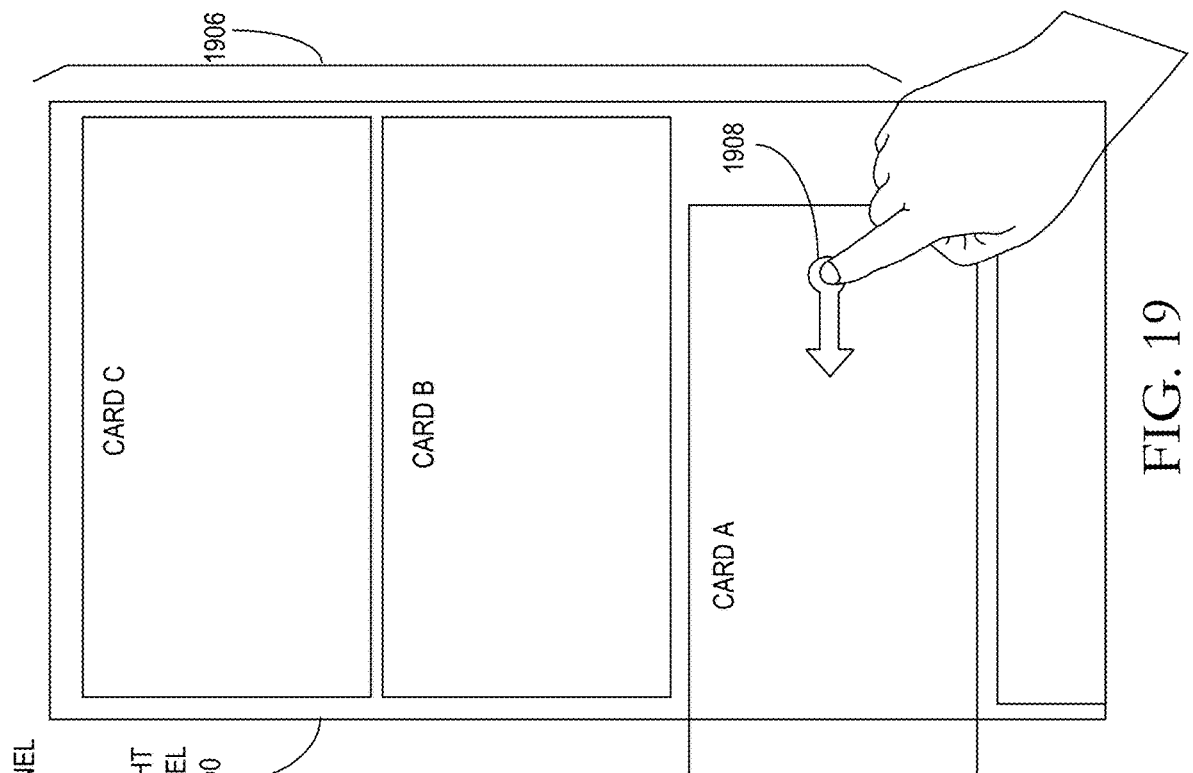
FIG. 19 is a schematic diagram of an illustrative user action for dismissing an individual card of an expanded set of cards in accordance with one or more example embodiments of the disclosure.

FIG. 19 is a schematic diagram of an illustrative user action for dismissing an individual card of an expanded set of cards in accordance with one or more example embodiments of the disclosure. A right panel 1900 is again depicted as an example card consumer. The right panel 1900 is depicted as displaying the stacked set of cards from FIG. 18 in an expanded state. When in an expanded state, a user may dismiss individual cards of the stackable set of cards by performing a gesture 1908 with respect to the card the user wishes to dismiss.

Figure 20B:
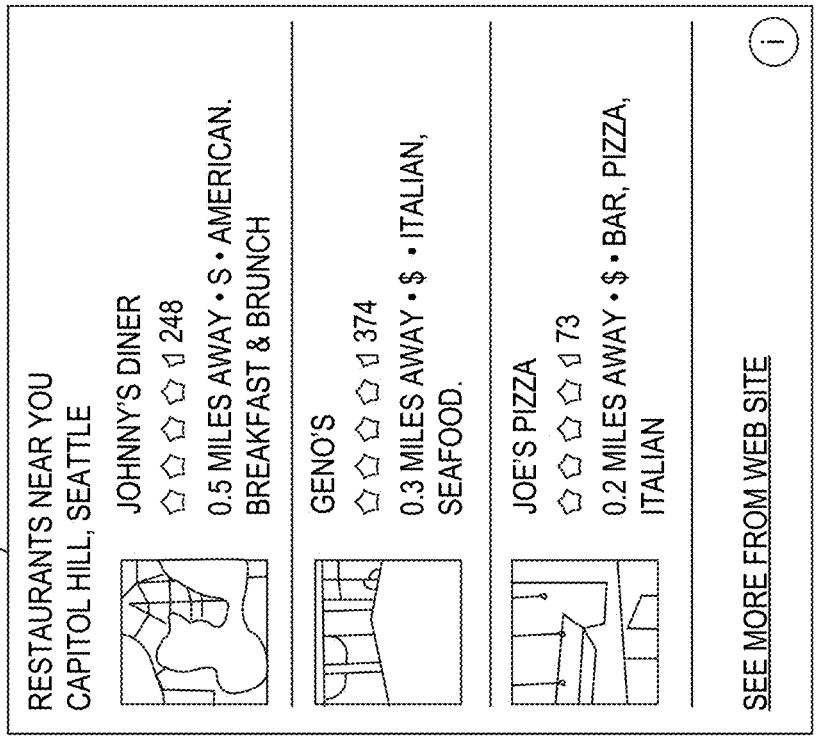
FIGS. 20A-20B are schematic diagrams of an example template and corresponding card type in accordance with one or more example embodiments of the disclosure.
Figure 20A:
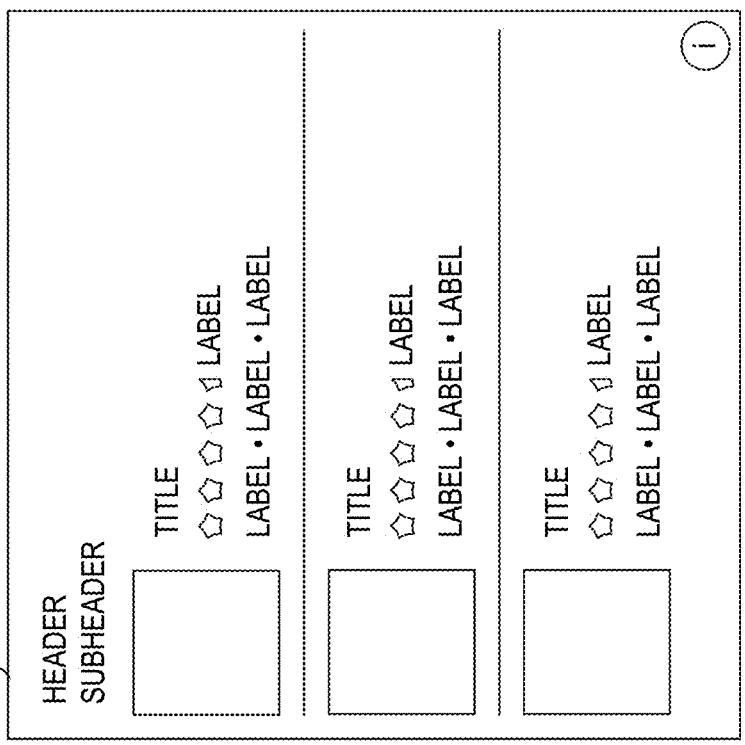

FIGS. 20A-20B are schematic diagrams of an example template and corresponding card type in accordance with one or more example embodiments of the disclosure. FIG. 20B depicts an example restaurant recommendations card 2002 that may be generated based on the example template 2000 in FIG. 20A. It should be appreciated that the example template and corresponding card depicted in FIGS. 20A-20B are merely illustrative and not exhaustive.

Illustrative Device Configurations and Gestures

Figure 21:
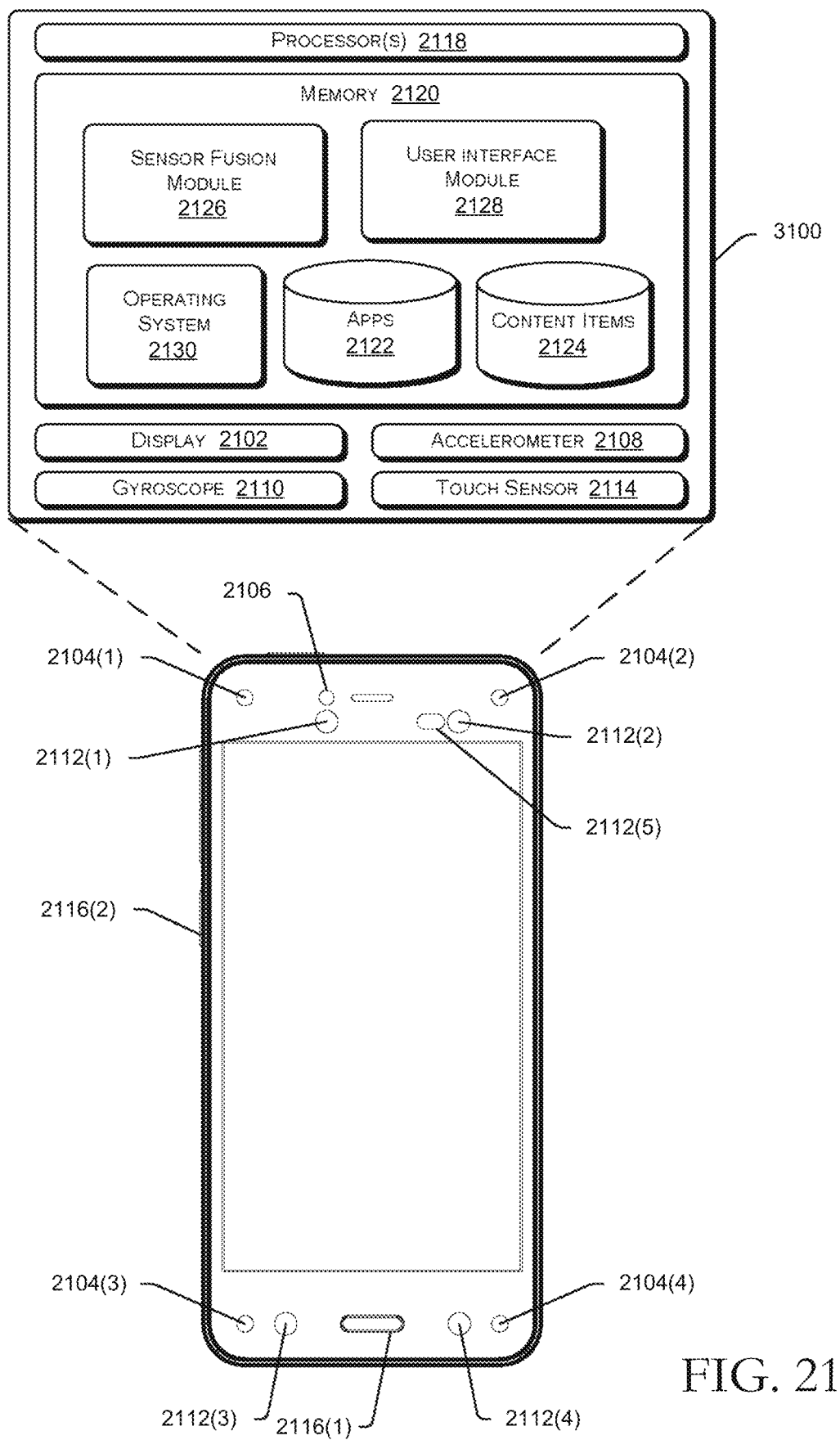
FIG. 21 is a schematic block diagram of an illustrative configuration of a user device capable of detecting one or more gestures and rendering one or more user interfaces in accordance with one or more example embodiments of the disclosure.

FIG. 21 illustrates an example user device 2100 (e.g., handheld or mobile electronic device) that may enable/implement the gestures and user interfaces described herein. In certain example embodiments, the device 2100 may correspond to the device 200 and/or the device 306. As illustrated, the device 2100 may include a display 2102 for presenting applications and content items, along with other output devices such as one or more speakers, a haptic device, and the like. The device 2100 may include multiple different sensors, including multiple cameras 2104(1), 2104(2), 2104(3), 2104(4), and 2104(5) which, in some instances may reside on the front face of the device 2100 and near the corners of the device 2100 as defined by a housing of the device. While FIG. 21 illustrates four corner cameras 2104(1)-(4), in other instances the device 2100 may implement any other number of cameras, such as two corner cameras, one centered camera on top and two cameras on the bottom, two cameras on the bottom, or the like.

In addition to the cameras 2104(1)-(4), the device 2100 may include a front-facing camera 2106, which may be used for capturing images and/or video. The device 2100 may also include various other sensors, such as one or more accelerometers 2108, one or more gyroscopes 2110, one or more infrared cameras 2112(1), 2112(2), 2112(3), 2112(4), and 2112(5), a touch sensor 2114, a rear-facing camera, and the like. In some instances, the touch sensor 2114 may be integrated with the display 2102 to form a touch-sensitive display, while in other instances the touch sensor 2114 may be located apart from the display 2102. As described in detail below, the collection of sensors may be used individually or in combination with one another for detecting in-air gestures made by a user holding the device 2100.

FIG. 21 further illustrates that the device 2100 may include physical buttons 2116(1) and 2116(2), potentially along with multiple other physical hardware buttons (e.g., a power button, volume controls, etc.). The physical button 2116(1) may be selectable to cause the device to turn on the display 2102, to transition from an application to a home screen of the device, and the like, as discussed in detail below. The physical button 2116(2), meanwhile, may be selectable to capture images and/or audio for object recognition, as described in further detail below.

The device 2100 may also include one or more processors 2118 and memory 2120. Individual ones of the processors 2116 may be implemented as hardware processing units (e.g., a microprocessor chip) and/or software processing units (e.g., a virtual machine). The processor(s) 2118 may include any of the example types of processors discussed with respect to FIG. 3. The memory 2120, meanwhile, may be implemented in hardware or firmware, and may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processor including any of the example types of memory discussed with respect to FIG. 3. The memory 2120 encompasses non-transitory computer-readable media. Non-transitory computer-readable media includes all types of computer-readable media other than transitory signals.

As illustrated, the memory 2120 may store one or more applications 2122 for execution on the device 2100, one or more content items 2124 for presentation on the display 2102 or output on the speakers, a sensor-fusion module 2126, a user-interface module 2128, and an operating system 2130. The sensor-fusion module 2124 may function to receive information captured from the different sensors of the device 2100, integrate this information, and use the integrated information to identify inputs provided by a user of the device. For instance, the sensor-fusion module 2126 may integrate information provided by the gyroscope 2110 and the corner cameras 2104(1)-(4) to determine when a user of the device 2100 performs a "peek gesture."

The user-interface module 2128, meanwhile, may present user interfaces (UIs) on the display 2102 according to inputs received from the user. For instance, the user-interface module 2128 may present any of the screens described and illustrated below in response to the user performing gestures on the device, such as in-air gestures, touch gestures received via the touch sensor 2114, or the like. The operating system module 2130, meanwhile, functions to manage interactions between and requests from different components of the device 2100.

Figure 22:
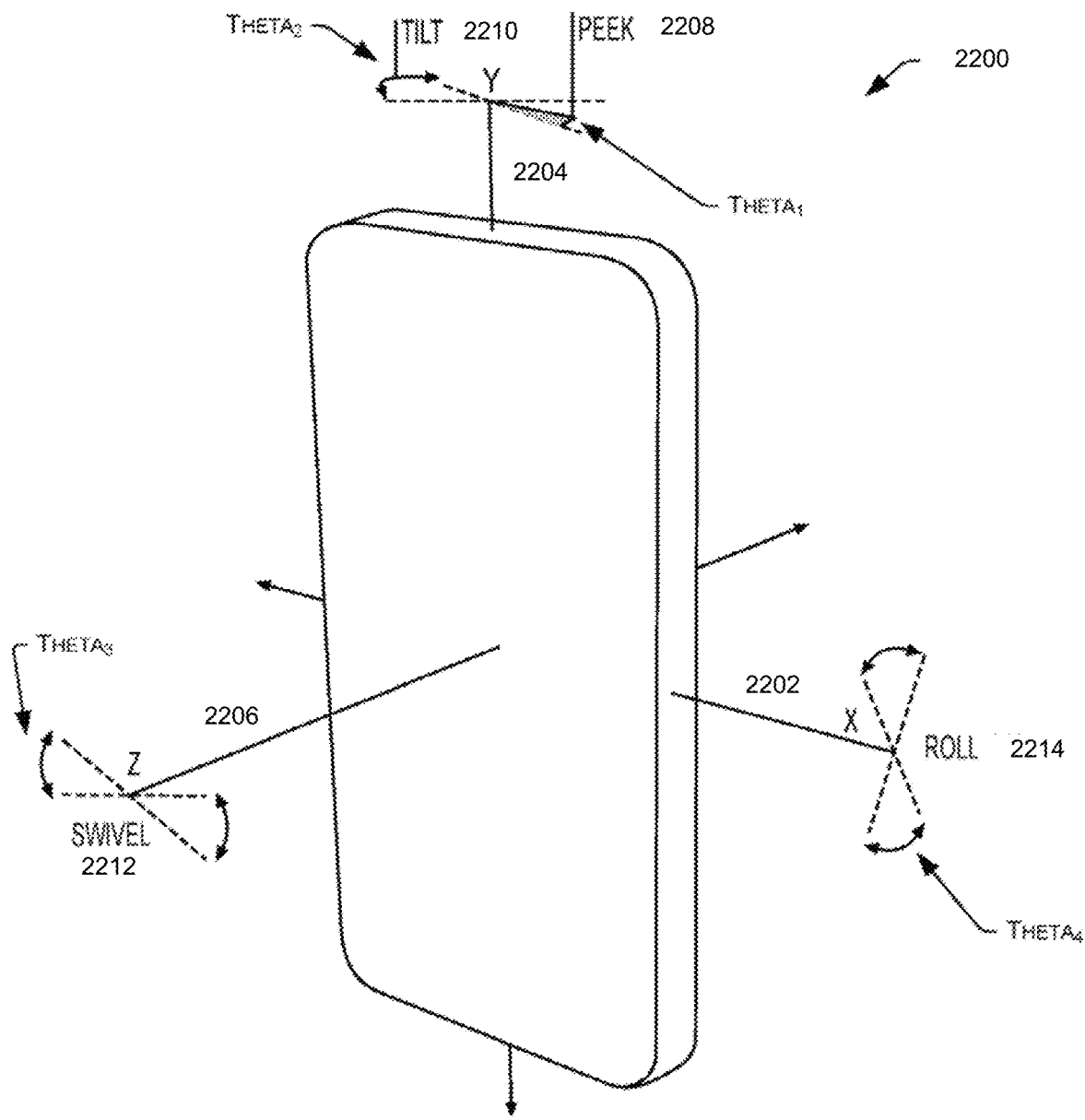
FIG. 22 illustrates example gestures that may be performed in accordance with one or more example embodiments of the disclosure.

FIG. 22 illustrates example gestures that a user may perform using the device 2100. As illustrated, FIG. 22 defines an x-axis 2202, a y-axis 2204, and a z-axis 2206. The x-axis is within a plane defined by the major plane of the device 2100 and runs along the length of the device 2100 and in the middle of the device. The y-axis 2204, meanwhile, is also in the plane but runs along the height of the device 2100 and in the middle of the device. Finally, the z-axis 2206 runs perpendicular to the major plane of the device (and perpendicular to the display of the device) and through a middle of the device 2100.

As illustrated, a user may perform a peek gesture 2208 and a tilt gesture 2210 by rotating the device 2100 about the y-axis 2202. In some instances, a peek gesture 2208 is determined by the user-interface module when the position of the user changes relative to the device, as determined from information captured by the corner cameras 2104(1)-(4). Therefore, a user may perform a peek gesture 2208 by rotating the device slightly about the y-axis (thereby changing the relative position of the user's face to the device from the perspective of the cameras 2104(1)-(4)) and/or by moving the user's face to the right or left when looking at the display 2102 of the device 2100 (again, changing the user's position relative to the cameras 2104(1)-(4)). In some instances, the peek gesture 2208 is defined with reference solely from information from the cameras 2104(1)-(4), while in other instances other information may be utilized (e.g., information from the gyroscope, etc.). Furthermore, in some instances a peek gesture 2208 requires that a user's position relative to the device 2100 change by at least a threshold angle, $\theta_1$.

Next, a user may perform a tilt gesture 2210 by rotating the device 2100 about the y-axis 2202 by a threshold amount, $\theta_2$, and then rotating the device 2100 back the opposite direction by a second threshold amount. In some instances, $\theta_2$ is greater than $\theta_1$, although in other instances the opposite is true or the angles are substantially equal. For instance, in one example $\theta_1$ may be between about 0.1° and about 5°, while $\theta_2$ may be between about 5° and about 30°.

In some implementations, the user-interface module 2128 detects a tilt gesture based on data from the gyroscope indicating that the user has rotated the device 2100 about the y-axis in a first direction and has started rotating the device 2100 back in a second, opposite direction (i.e., back towards the initial position). In some instances, the user-interface module 2128 detects the tilt gesture 2210 based on the rotation forwards and backwards, as well as based on one of the cameras on the front of the device 2100 recognizing the presence of a face or head of a user, thus better ensuring that the a user is in fact looking at the display 2102 and, hence, is providing an intentional input to the device 2100.

In some instances, the peek gesture 2208 may be used to display additional details regarding icons presented on the display 2102. The tilt gesture 2210, meanwhile, may be used to navigate between center, left, and right panels. For instance, a tilt gesture to the right (i.e., rotating the device 2104 about the y-axis in a clockwise direction followed by a counterclockwise direction when viewing the device from above) may cause the device to navigate from the center panel to the right panel, or from the left panel to the center panel. A tilt gesture to the left (i.e., rotating the device 2104 about the y-axis in a counterclockwise direction followed by a clockwise direction when viewing the device from above), meanwhile, may cause the device to navigate from the center panel to the left panel, or from the right panel to the center panel.

In addition to the peek gesture 2208 and the tilt gesture 2210, a user may rotate the device 2100 about the z-axis to perform the swivel gesture 2212. The swivel gesture 2212 may comprise rotating the device more than a threshold angle ($\theta_3$), while in other instances the swivel gesture 2212 may comprise rotating the device more than the threshold angle, $\theta_3$, and then beginning to rotate the device back towards its initial position (i.e., in the opposite direction about the z-axis 2206), potentially by more than a threshold amount. Again, the user-interface module may determine that a swivel gesture 2212 has occurred based on information from the gyroscope, from another orientation sensor, and/or from one or more other sensors. For example, the user-interface module may also ensure that a face or head of the user is present (based on information from one or more front-facing cameras) prior to determining that the swivel gesture 2212 has occurred. As described above, the swivel gesture 2212 may result in any sort of operation on the device 2100, such as surfacing one or more icons.

Finally, FIG. 22 illustrates that a user of the device 2100 may perform a roll gesture 2214 by rotating the device 2100 about the x-axis 2202. The user-interface module 2128 may identify the roll gesture similar to the identification of the tilt and swivel gestures. That is, the module 2128 may identify that the user has rolled the device about the x-axis 2202 by more than a threshold angle ($\theta_4$), or may identify that that the user has rolled the device past the threshold angle, $\theta_4$, and then has begun rolling it back the other direction. Again, the user-interface module 2128 may make this determination using information provided by an orientation sensor, such as the gyroscope, and/or along with information from other sensors (e.g., information from one or more front-facing cameras, used to ensure that a face or head of the user is present). Alternatively, the roll gesture 2214 may be detected entirely and exclusively using the optical sensors (e.g., front facing cameras). While the roll gesture 2214 may be used by the device to perform various operations in response, in one example the roll gesture 2214 may cause the device to surface one or more icons, such as settings icons or the like.

In one example a user may be able to scroll content (e.g., text on documents, photos, etc.) via use of the roll gesture 2214. For instance, a user may roll the device forward (i.e., so that a top half of the device is nearer to the user) in order to scroll downwards, and may roll the device backward (so that a top half of the device is further from the user) in order to scroll upwards (or vice versa). Furthermore, in some instances the speed of the scrolling may be based on the degree of the roll. That is, a user may be able to scroll faster by increasing a degree of the roll and vice versa. Additionally or alternatively, the device may detect a speed or acceleration at which the user performs the roll gesture, which may be used to determine the speed of the scrolling. For instance, a user may perform a very fast roll gesture to scroll quickly, and a very slow, more gentle roll gesture to scroll more slowly.

While a few example gestures have been described, it is to be appreciated that the user-interface module 2128 may identify, in combination with the sensor-fusion module 2126, multiple other gestures based on information captured by sensors of the device 2100. Furthermore, while a few example operations performed by the device 2100 have been described, the device may perform any other similar or different operations in response to these gestures.

FIGS. 23A-23E illustrate an example scenario 2300A-2300E where a user performs, on the mobile electronic device 2100, a peek gesture to the left, a peek gesture to the right, a tilt gesture to the left, and a tilt gesture to the right. As illustrated, each of these gestures causes the mobile electronic device to perform a different operation.

Figure 23:
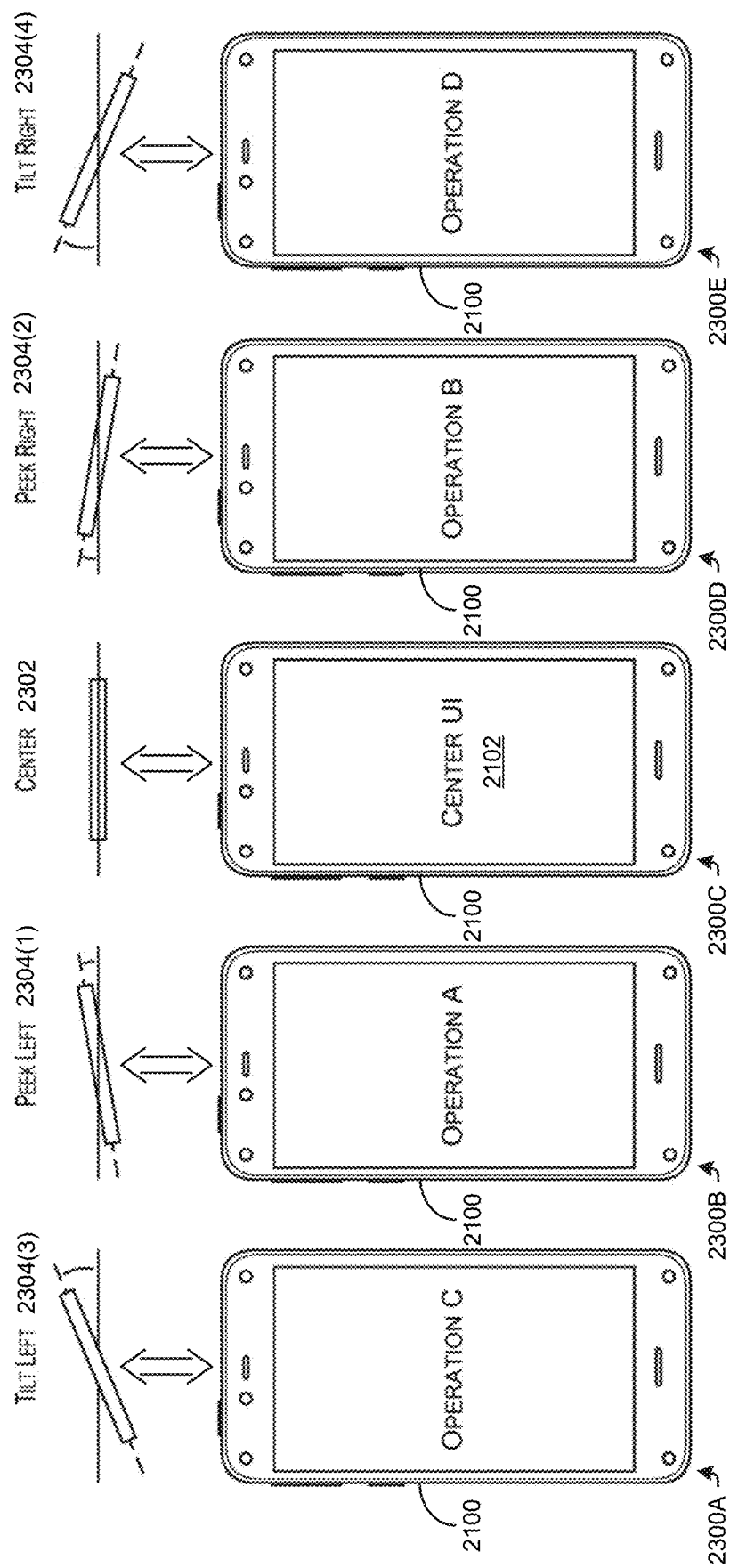
FIGS. 23A-23E illustrate example gestures and corresponding operations that may be performed in accordance with one or more example embodiments of the disclosure.

To begin, with general reference to FIGS. 23C and 23B the electronic device 2100 presents a "center UI" 2302 on the display 2102. Thereafter, a user performs a peek gesture to the left 2304(1) by either rotating the device 2100 in a counterclockwise manner when viewed from the top of the device and/or by moving a head of the user in corresponding or opposing manner. That is, because the device 2100 identifies the peek gesture using the four corner cameras 2104(1)-(4) in some instances, the device identifies the gesture 2304(1) by determining that the face or head of the user has changed relative to the position of the device and, thus, the user may either rotate the device and/or move his or her head to the left in this example. In either case, identifying the change in the position of the user relative to the device causes the device to perform an "operation A". This operation may include surfacing new or additional content, moving or altering objects or images displayed in the UI, surfacing a new UI, performing a function, or any other type of operation.

Conversely, FIG. 23D also illustrates a user performing a peek gesture to the right 2304(2) while the device 2100 presents the center UI 2302. As shown, in response the device 2100 performs a different operation, operation B.

In still another example illustrated in FIG. 23A, a user of the device 2100 may perform a tilt gesture to the left 2304(3) when the device 2100 presents the center UI (before or after performance of operation A). As described above, the device 2100 may recognize the tilt gesture 2304(3) based on data collected by an inertial sensor, such as a gyroscope, accelerometer, or the like. For instance, the device 2100 may determine that the tilt gesture has been performed in response to determining that the user has rotated the device in the counterclockwise direction (when viewed from above) passed a threshold angle and then has begun rotating the device 2100 back in the clockwise direction. In response to determining that the tilt gesture has occurred, the device 3100 may perform a predefined operation associated with that gesture (here, "Operation C").

Finally, FIG. 23E illustrates a user of the device 2100 performing a tilt gesture to the right 2304(4), which the device 2100 may identify in a manner similar to how the device identified the tilt gesture 2304(3). Here, however, the user rotates the device clockwise past a threshold angle and then back in a counterclockwise direction. As illustrated, the device 2100 performs an operation D on the device 2100.

Figure 24:
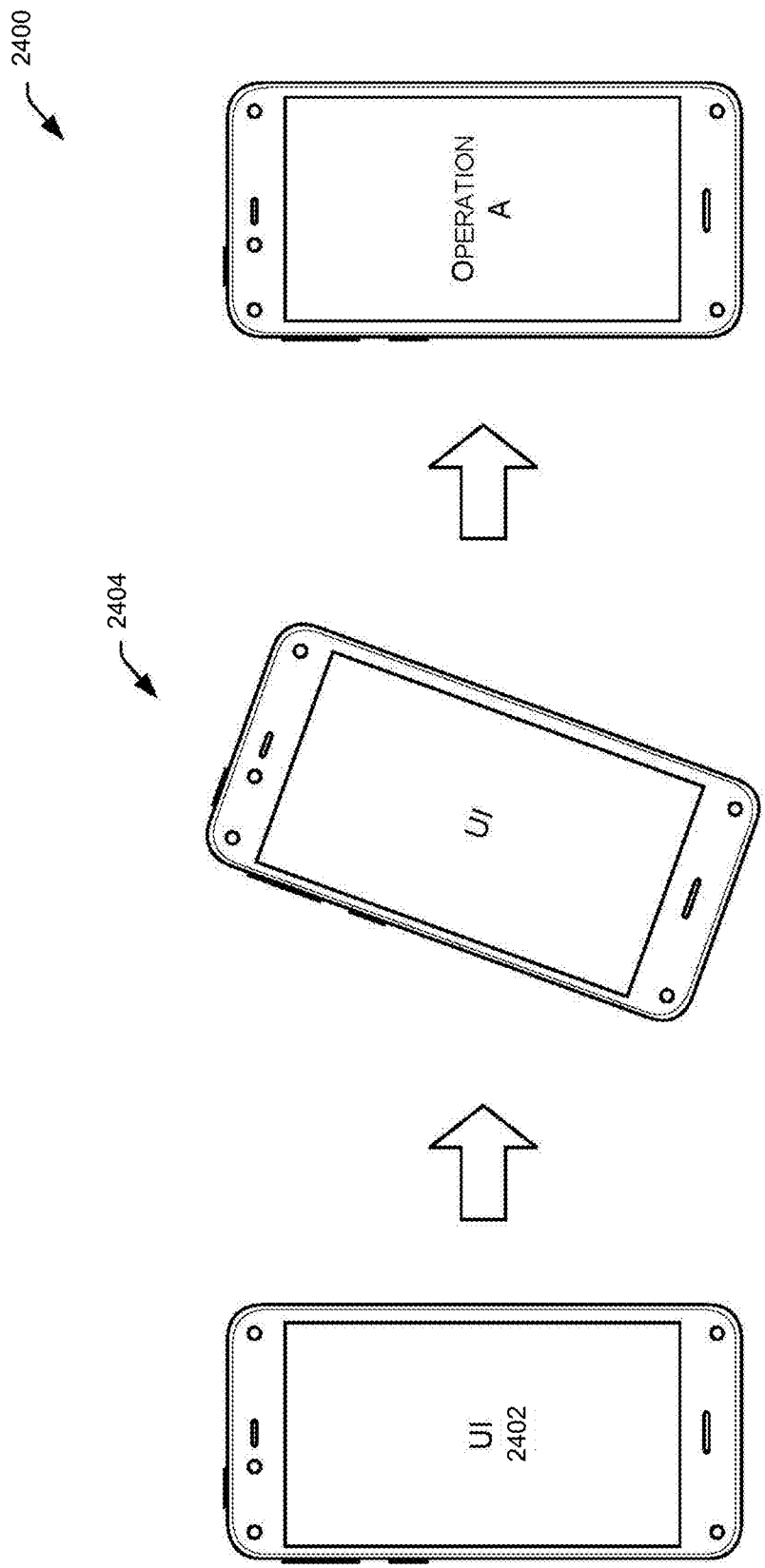
FIG. 24 illustrates an example swivel gesture and performance of an operation in response to the swivel gesture in accordance with one or more example embodiments of the disclosure.

FIG. 24 illustrates an example scenario 2400 where a user performs a swivel gesture on the device 2100 and, in response, the device performs a predefined operation. As illustrated, the device 2100 initially displays a UI 2402. At 2404, the user begins to perform a swivel gesture by rotating the device 2100 in either direction about the z-axis that is perpendicular to the display 2102 of the device. As noted above, an inertial sensor may sense this rotation. After 2404, the user rotates the device 2100 about the z-axis in the opposite direction (counterclockwise in this example) and, in response, the device 2100 identifies the gesture as a swivel gesture. In response to identifying the swivel gesture, the device performs an operation A, which, as discussed above, may comprise any sort of operation, including displaying or otherwise outputting certain content. While this example displays a swivel gesture to the right (given the initial clockwise rotation), in other instances the user may perform a swivel gesture to the left, which may result in the same or a different operation.

In some instances, the swivel gesture may require that a user rotate the device by more than a first threshold amount (e.g., 10 degrees), and then back by more than a second threshold amount (e.g., 5 degrees). In other instances, the device may detect a swivel gesture in response to the user rotating the device by more than a threshold amount then back the other direction by any amount.

Figure 25:
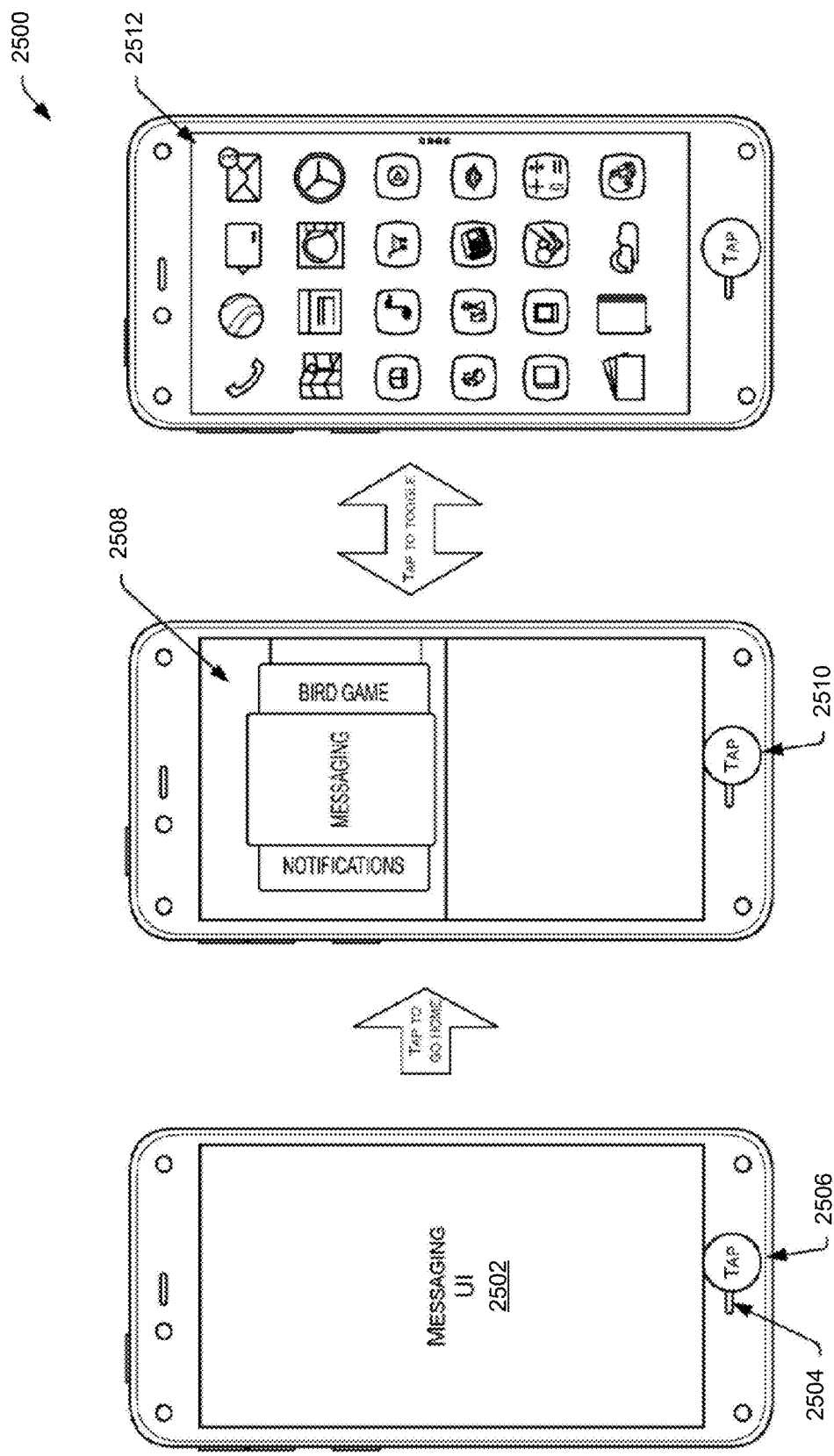
FIG. 25 illustrates different user interfaces that may be presented responsive to a user gesture in accordance with one or more example embodiments of the disclosure.

FIG. 25 illustrates an example scenario 2500 of the user interface (UI) of the device changing in response to a user selecting a physical home button on the device. In this example, the device 2100 begins by displaying a UI 2502 from an example application. While the device 2100 presents the UI 2502, the user selects (e.g., depresses) a physical button 2504 on the device 2100. This button 2504 may comprise a "home button" that, when selected causes the device 2100 to present a home screen associated with the device 2100. In this example, at 2506 the user taps or otherwise selects the button 2504. In response, the device 2100 navigates to the home screen 2508, which comprises a carousel of icons corresponding to applications and/or content items (collectively, "items").

The list displayed on the home screen 2508 may comprise an interactive list that is scrollable by the user of the device, such as by touch gestures on the display 2102. For instance, the user may swipe horizontally to view different icons in the list, and a single icon in the middle of the list and in front of the other icons may have user-interface focus at any one time. In some instances, the list comprises a carousel that "loops", such that a user is able to continuously spin the carousel in a circle, while in other examples the list has two ends and may be scrolled leftwards and rightwards.

In response to the user again selecting, at 2510, the home button 2504, the device displays a UI comprising a grid of applications 2512 available to the device (e.g., stored locally on the device, remotely in the cloud, or both). In some instances the grid 2512 is scrollable horizontally or vertically to display as many pages as necessary to present an icon associated with each application available to the device 2100. As illustrated, as the user selects the home button 2504, the device 2100 toggles between displaying the home screen (e.g., with the carousel) and the application grid 2512. Application icons may appear in the home carousel 2508, the application grid 2512, or both.

FIGS. 26A-26B illustrate example swipe gestures initiated at a bezel of the device and terminating at a display of the device. FIG. 26A depicts an upwards swipe gesture 2604 that begins at a bottom portion of a bezel 2602(1) of the device 2100 and ends on the display 2102. FIG. 26B illustrates a downwards swipe gesture 2606 that begins at an upper portion of the bezel 2602(2) and ends on the display 2102.

These respective gestures may be associated with the same or different operations. For instance, the gesture 2604 may cause the device 2100 to navigate backwards to whatever task the device 2100 was performing prior to the current task the device is performing at the time of the gesture 2604. This may include navigating backwards in a browser application, switching from a first application to a second application that the user was previously consuming, or the like. Similarly, the gesture 2604 may cause the device 2100 to perform any sort of predefined operations.

FIGS. 27A-H illustrate various example swipe gestures that a user may perform on the mobile electronic device 2100. These respective gestures may be associated with any type of predefined operations, which may be specific to whatever application a device is currently executing or which may be used consistently across all applications on the device.

FIG. 27A illustrates a basic tap on a touch-sensitive display, such as the display 2102. This may cause the device open a content item or otherwise perform a selection operation. FIG. 27B illustrates a double tap, which comprises a user striking the touch-sensitive display (or other touch sensor) with an implement (e.g., a finger, stylus, pen, etc.) two times within a threshold duration of one another and within a threshold distance of another. This may allow a user to zoom in on a content item (e.g., map, picture, etc.), to toggle a video aspect ratio of the display, to enter an immersive text view, or the like.

FIG. 27C, meanwhile, illustrates a tap-and-hold gesture. Here, the user taps the display and keeps his or her finger on the display for a threshold amount of time. After the touch-sensor recognizes the user's finger or other element on the display for the threshold amount of time, the device 2100 may recognize the tap-and-hold gesture and may perform a corresponding operation. For instance, pressing-and-holding may cause the device to launch a voice-recognition application to allow a user of the device 2100 to provide a voice command to the device. This gesture may also cause the device to present a camera button, may launch the camera directly, may cause the device 2100 to present a context menu of icons, or the like.

FIG. 27D illustrates a pinch-and-spread gesture, where a user places two fingers on the touch-sensitive display in close proximity to one another then spreads his or her fingers out. This may cause the device 2100 to zoom in on certain items, such as maps, photos, a browser, etc.

FIG. 27E, meanwhile, illustrates a horizontal swipe by a user, while FIG. 27F illustrates a vertical swipe. A horizontal swipe may allow a user to navigate an interactive list horizontally, to pan a map horizontally, to move from one song to another song in a music application to fast forward or rewind in a video application, or the like. The vertical swipe of FIG. 27F, meanwhile, may allow a user to scroll a list or the application grid vertically, pan a map vertically, unlock the device 2100, answer a phone call, change a volume of the device, and the like.

FIG. 27G illustrates a drag-and-drop gesture, which may cause the device 2100 to give the appearance of the user grabbing an icon on the display 2102 and moving the icon where the user's finger or other implement travels on the display. To do so, a user may tap-and-hold on the device and, after a threshold amount of time, may drag his or her finger or other implement across the display in the desired direction without lifting his or her finger or implement off of the display. When the user lifts the finger or implement off of the display, the device 2100 may consider the gesture complete and may determine an operation to perform (e.g., where to display the icon) based on where the user removed his or her finger from the display 2102.

Finally, FIG. 27H illustrates a multi-finger swipe gesture, where a user places two fingers onto the touch-sensitive display or other touch sensor and slides his or her fingers across the display 2102 or touch sensor. In some instances, this gesture acts similar to one or more of the in-air gestures (e.g., swivel, peek, tilt, roll) in order to provide a better experience to users that are unable to perform the in-air gestures comfortably. For instance, the multi-finger swipe gesture to the right may navigate an application (or the home screen) from a center panel to a right panel, while such a gesture to the left may cause display of a corresponding left panel. This gesture may also adjust a brightness of the display 2102 or may be associated with any other predefined operation.

Figure 28:
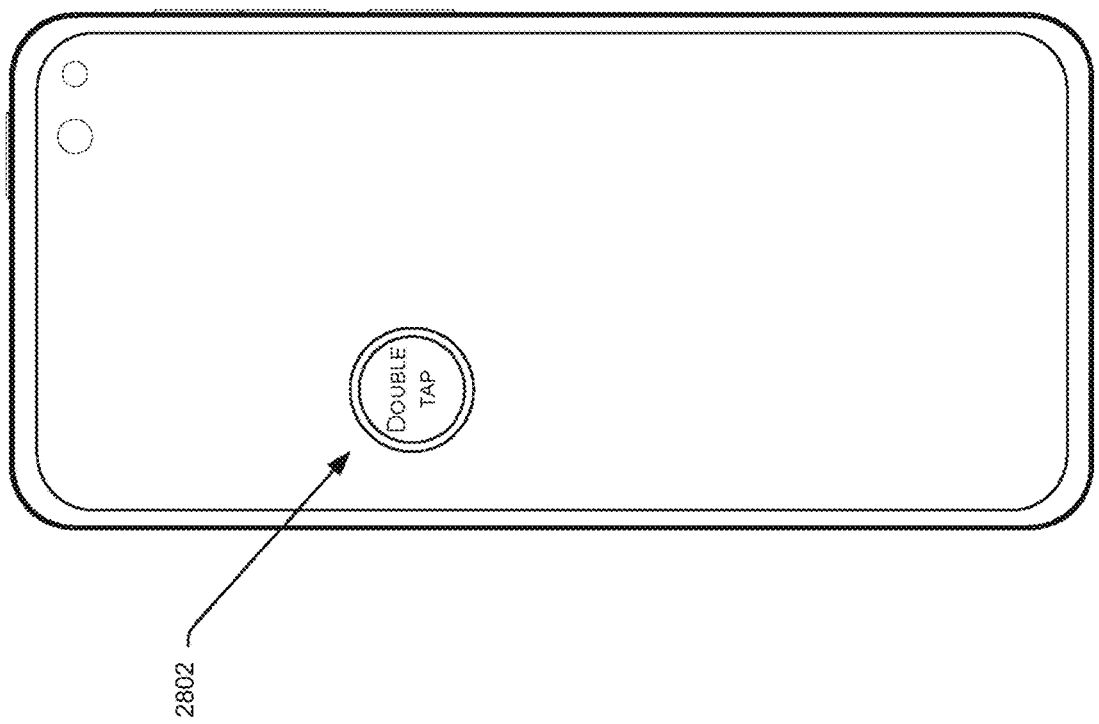
FIG. 28 illustrates an example double-tap gesture that may be performed on a back surface of a user device in accordance with one or more example embodiments of the disclosure.

FIG. 28 illustrates an example double-tap gesture 2802 that a user may perform on a back of the mobile electronic device 2100. Here, a user may perform this gesture 2802 by tapping the device (e.g., with a finger) on the back of the device, with the taps occurring within a threshold amount of time of each other and within a threshold distance of one another. In some instances, an inertial sensor, such as an accelerometer, a gyroscope, or both may detect both tap events and may determine: (1) whether they occurred within a threshold amount of time of one another, and (2) whether they occurred within a threshold distance of one another. If so, then the device 3100 may determine that a double-tap gesture 2802 occurred and may perform a corresponding operation. It is noted that while FIG. 28 illustrates a double-tap gesture, in other instances the device 2100 utilizes gestures having any other predetermined number of taps. Furthermore, while an accelerometer or gyroscope may be used to identify the gesture 2802, in other instances other sensors may be used to determine this gesture, such as a touch screen or touch sensor on the back of the device 2100.

Figure 29:
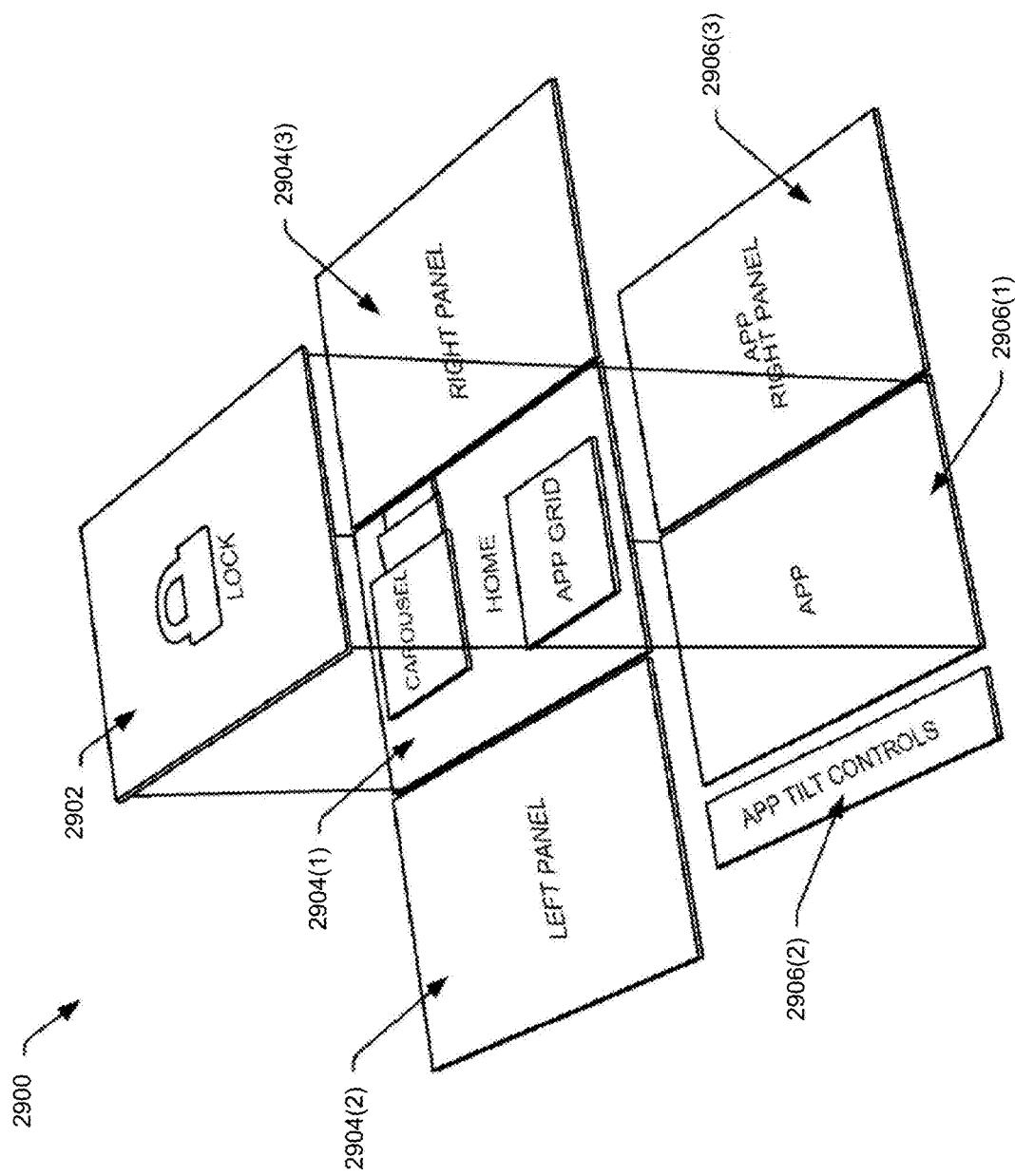
FIG. 29 illustrates an example sequence of user interfaces that may be rendered by a user device in accordance with one or more example embodiments of the disclosure.

FIG. 29 illustrates an example sequence of UIs 2900 that the device 2100 may implement. The UI of the device may initially comprise a lock screen 2902. Upon a user unlocking the device (e.g., via a password, a swipe gesture, biometric authentication, etc.), the UI may comprise a "home screen"

2904(1), which may include an interactive list as described above (e.g., the carousel), along with a grid of applications, which a user may navigate via vertical swipe gestures. As described above, the home screen 2904(1) may comprise a center panel of a three (or more) panel layer of screens. From the home screen 2904(1), the user may navigate to a left panel 2904(2) or to a right panel 2904(3). For instance, a user may perform a tilt gesture to the left to navigate to the left panel 2904(2) or may perform a tilt gesture to the right to navigate to the right panel 2904(3). Conversely, the user may perform a multi-finger swipe right or left or may perform another predefined gesture to navigate to these panels.

Additionally from the layer of screens 2904, a user may navigate to a particular application comprising a center panel 2906(1), a left panel 2906(2), and a right panel 2906(3). The center panel 2906(1) may be the default screen for an application executable on the device and, as such, this panel may display the "primary content". For instance, in a book-reading application, the center panel 2906(1) may comprise the content of the electronic book. In a document processing application, the center panel 2906(1) may comprise the content of the document, and the like. Again, the user may navigate to the right and left panels via the respective tilt gestures in some instances.

In some examples, a left panel 2906(2) of an application may comprise user-interface controls, which may include application-specific controls, device-generic controls (e.g., wireless settings, display brightness, etc.), or both. The right panel 2906(3), meanwhile, may comprise content that is supplementary to or related to the primary content displayed on the center panel 2906(1). In certain example embodiments, the left panel 2906(2) and/or the right panel 2906(3) may include card content that is personalized, contextually relevant, and/or pertinent to content that may be currently rendered in the center panel 2906(1). While a few specific examples are discussed and illustrated below, it is to be appreciated that these are merely examples and many other possibilities exist.

Additional Illustrative UI/UX and Additional Illustrative Processes

Figure 30:
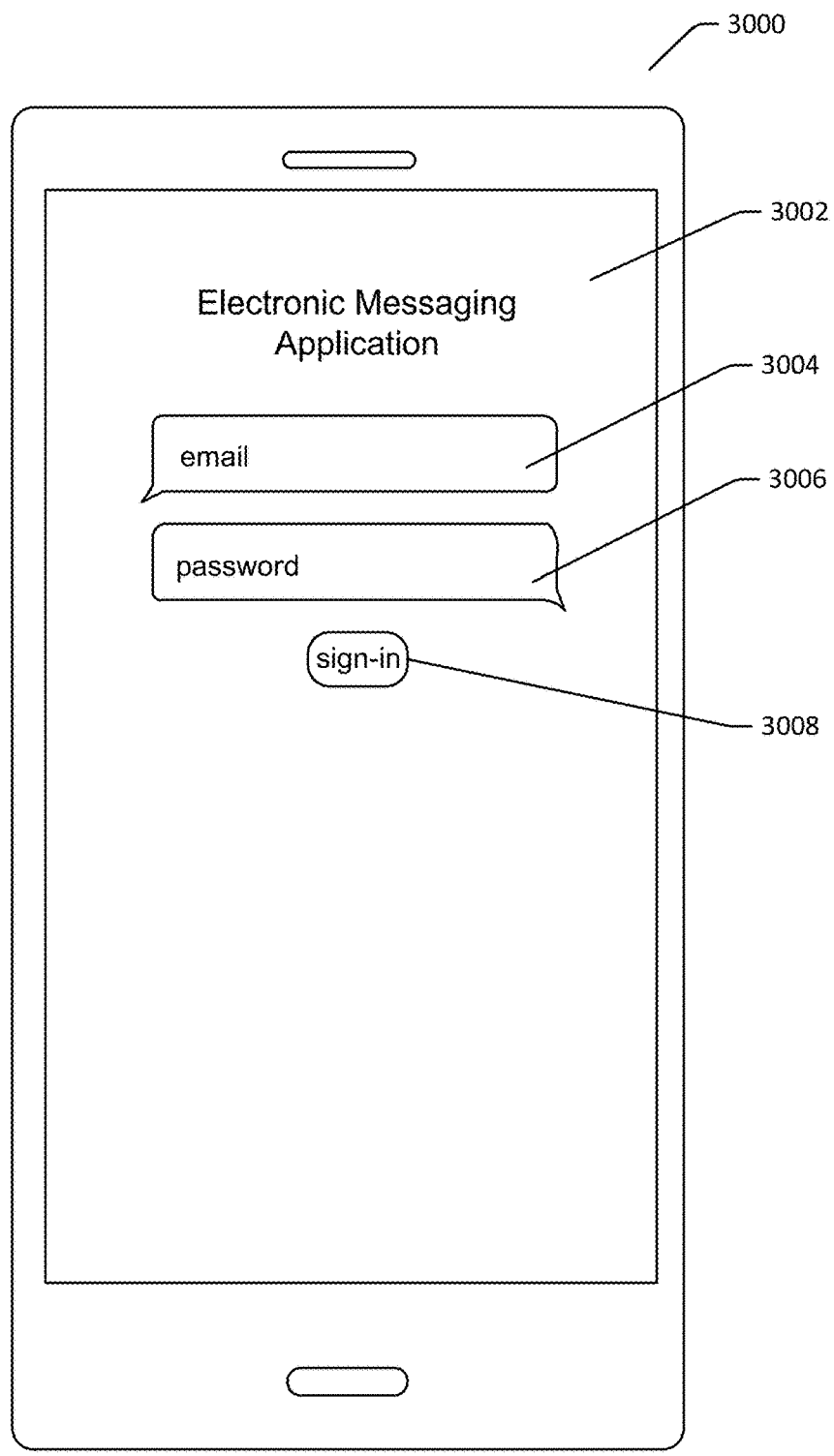
FIG. 30 depicts an illustrative user interface for receiving user authentication credentials for logging into a user profile associated with an electronic messaging application in accordance with one or more example embodiments of the disclosure.
Figure 31:
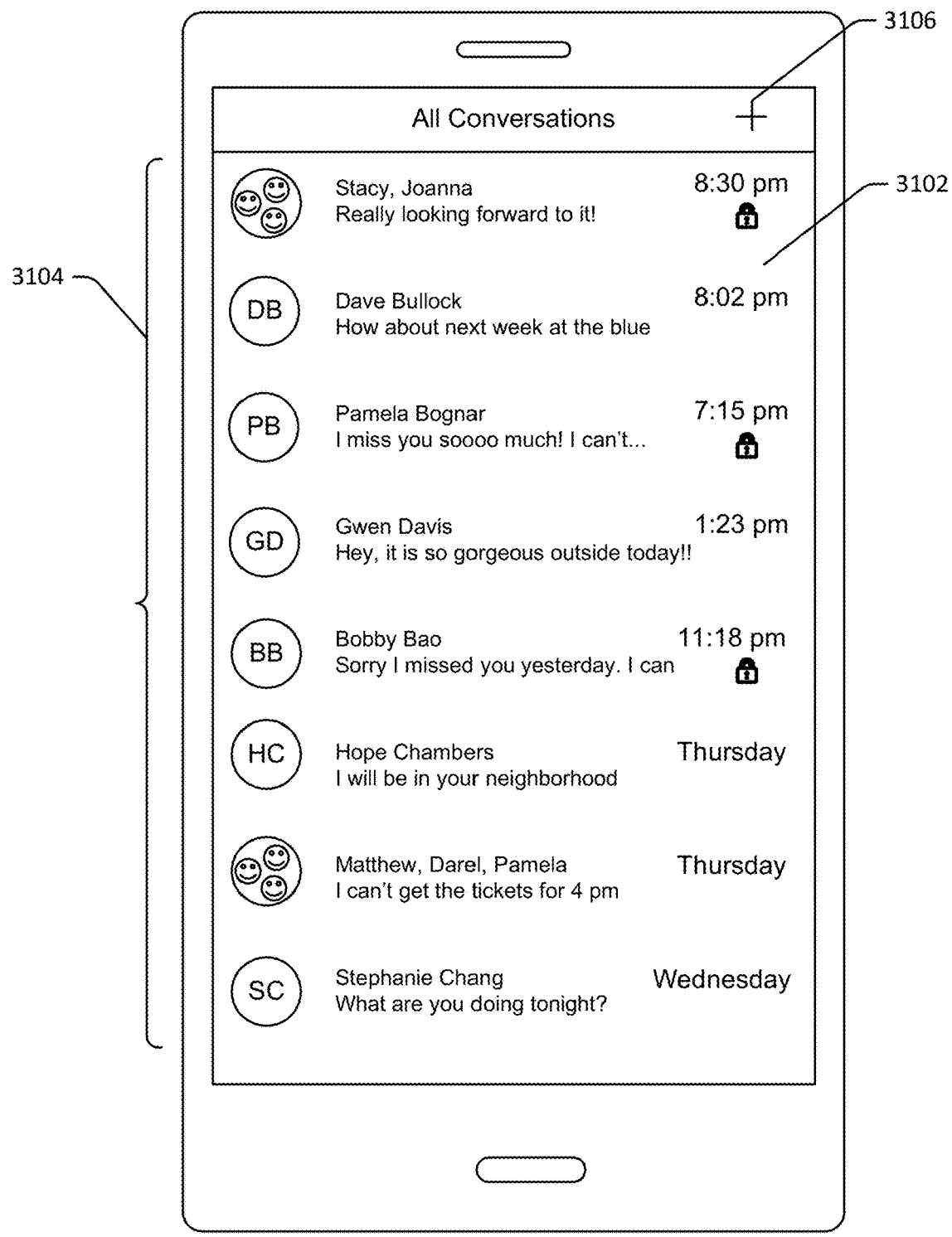
FIG. 31 depicts an illustrative user interface from which existing messaging conversations associated with groups of user profiles can be accessed and new messaging conversations can be initiated in accordance with one or more example embodiments of the disclosure.

FIG. 30 depicts an illustrative user interface for receiving user authentication credentials for logging into a user profile associated with an electronic messaging application in accordance with one or more example embodiments of the disclosure. FIG. 31 depicts an illustrative user interface from which existing messaging conversations associated with groups of user profiles can be accessed and new messaging conversations can be initiated in accordance with one or more example embodiments of the disclosure.

Referring first to FIG. 30, a user device 3000 is depicted. A user interface 3002 associated with an electronic messaging application may be displayed on the user device 3000. The user interface 3002 may include various fields for receiving user input associated with a user profile. For example, a first field 3004 may be provided for receiving user input corresponding to a user profile identifier such as an e-mail address, a username, or the like. In addition, a second field 3006 may be provided for receiving an authentication credential such as a password. In certain example embodiments, the combination of the user profile identifier and the authentication credential (e.g., password) may constitute a set of authentication credentials.

A selectable widget (e.g. button) 3008 may also be provided as part of the user interface 3002. User selection of the selectable widget 3008 may cause input data entered into the fields 3004, 3006 to be sent from the user device 3000 to a server for authentication of the input data as being associated with a user profile of the electronic messaging application. More specifically, a client-side component of the electronic messaging application may send the data inputted to the fields 3004, 3006 to a server-side component of the electronic messaging application for authentication. If the authentication credentials inputted via the user interface 3002 are successfully authenticated, the user device 3000 may be logged into the corresponding user profile and a user interface 3102 associated with the user profile may be displayed on the user device, as shown in FIG. 31.

The user interface 3102 shown in FIG. 31 may include a listing 3104 of all existing electronic messaging conversations associated with the user profile. Each electronic messaging conversation may include a set of electronic messages exchanged among a group of user profiles including the user profile logged into the user device 3000 and one or more additional user profiles associated with the electronic messaging application. For each electronic messaging conversation, an indication of each of the one or more additional user profiles participating in the electronic messaging conversation may be displayed. In addition, the user interface 3102 may also include a selectable widget 3106 for initiating a new electronic messaging conversation. Although not depicted in FIG. 31, responsive to user selection of the selectable widget 3106, a user interface may be displayed for selecting user profile(s) to associate with the new electronic messaging conversation.

FIGS. 32-39 depict a series of illustrative user interfaces associated with the processing of electronic message text to determine contextual information, the populating of an application template instance with application input data determined using the contextual information and/or user input, and the execution of application functionality that corresponds to the application template instance upon determining that the application template instance is fully populated in accordance with one or more example embodiments of the disclosure. FIG. 40 is a process flow diagram depicting an illustrative method for 4000 determining location information and time information based at least in part on contextual information included in electronic messages exchanged as part of a contextual message thread, automatically generating a calendar invite based at least in part on the location information, the time information, and information identifying users participating in a messaging conversation that includes the contextual message thread, and displaying the calendar invite in a user interface of the messaging conversation in accordance with one or more example embodiments of the disclosure. FIG. 40 will be described in conjunction with the example user interfaces depicted in FIGS. 32-39.

The operations of the method 4000 are described as being performed by a back-end server 302 and/or a client-side component of an electronic messaging application. Although one or more operations may be described herein as being performed by a back-end server 302, it should be appreciated that such operations may be performed in response to execution of computer-executable instructions of one or more program modules, engines, applications, or the like executing on one or more back-end server(s) 302 and/or one or more user devices 306. For example, in certain example embodiments, at least a subset of the operations of the method 4000 may be performed in a distributed manner between one or more back-end servers 302 and one or more user devices 306.

At block 4002, the back-end server 302 may determine one or more candidate application templates. Each candidate application template may be associated with a respective application executable, at least in part, on a user device 306. Each application template may specify one or more categories of inputs that are required in order to perform a corresponding application function. For example, a particular template may be associated with a calendar application. The template may specify that a time, a location, and a list of invitees are required to generate a calendar invite, which may be the corresponding application function for that template. As another example, another template may be associated with a dinner reservation application. That template may specify that a time, a location that corresponds to a physical address associated with a restaurant, and a number of attendees are required to make an online dinner reservation, which may be the corresponding application function for that template. As yet another example, another template may be associated with a car service application. That template may specify that a destination location is required to initiate a request for a car service, which may be the corresponding application function for that template. As yet another example, another template may be associated with an alarm application. That template may specify that a time is required to generate an alarm, which may be the corresponding application function for that template. It should be appreciated that the above examples of application templates are merely illustrative and not exhaustive.

As will be described in more detail later in this disclosure, electronic messages exchanged during an electronic messaging conversation may be semantically processed to determine contextual information that corresponds to one or more of the application templates. For example, the message text in an electronic message may be processed to determine if a keyword is present in the text that is associated with an input category in an application template. For example, if the message text includes the keyword "dinner," this keyword may correspond to one or more application templates that require a location input. Application template instances corresponding to these application templates may then be generated and populated with location data corresponding to the location input category. For example, a first application template instance may be generated for a calendar application template and a second application template instance may be generated for a dinner reservation application. The location data to populate an application template instance with may be determined directly from the message text or by prompting for user input. For example, an electronic message may directly specify a particular location, in which case, location data corresponding to that particular location may be populated in corresponding application template instances. As another example, a geographic region may be specified in the message text and a set of location options may be presented to the participants in the messaging conversation. Location data to populate the corresponding application template instances with may then be determined from a user selection of a particular location option.

In this manner, as contextual information is gleaned from electronic messages and determined to correspond to categories of inputs specified by various application templates, application input data may be determined for the categories of inputs and application template instances corresponding to the application templates may be populated with the application input data. When an application template instance has been populated with application input data corresponding to all categories of inputs specified by the corresponding application template, an application function associated with the application template may be automatically executed using the data populated in the application template instance without requiring user input to trigger the application function. For example, if an application template instance of a calendar application template has been populated with a time, a location, and a list of invitees, a calendar invite may be automatically generated without requiring specific user input to initiate generation of the calendar invite. In addition, application template instances that correspond to application templates that are determined to not be relevant to a contextual message thread may be discarded. In certain example embodiments, an application template instance may be fully populated but further contextual information may be needed to determine whether a corresponding application function should be executed. For example, a car service application template instance may be populated with a destination address, but further contextual information may be needed that indicates that a user requires a car service before the car service application is automatically launched.

Figure 32:
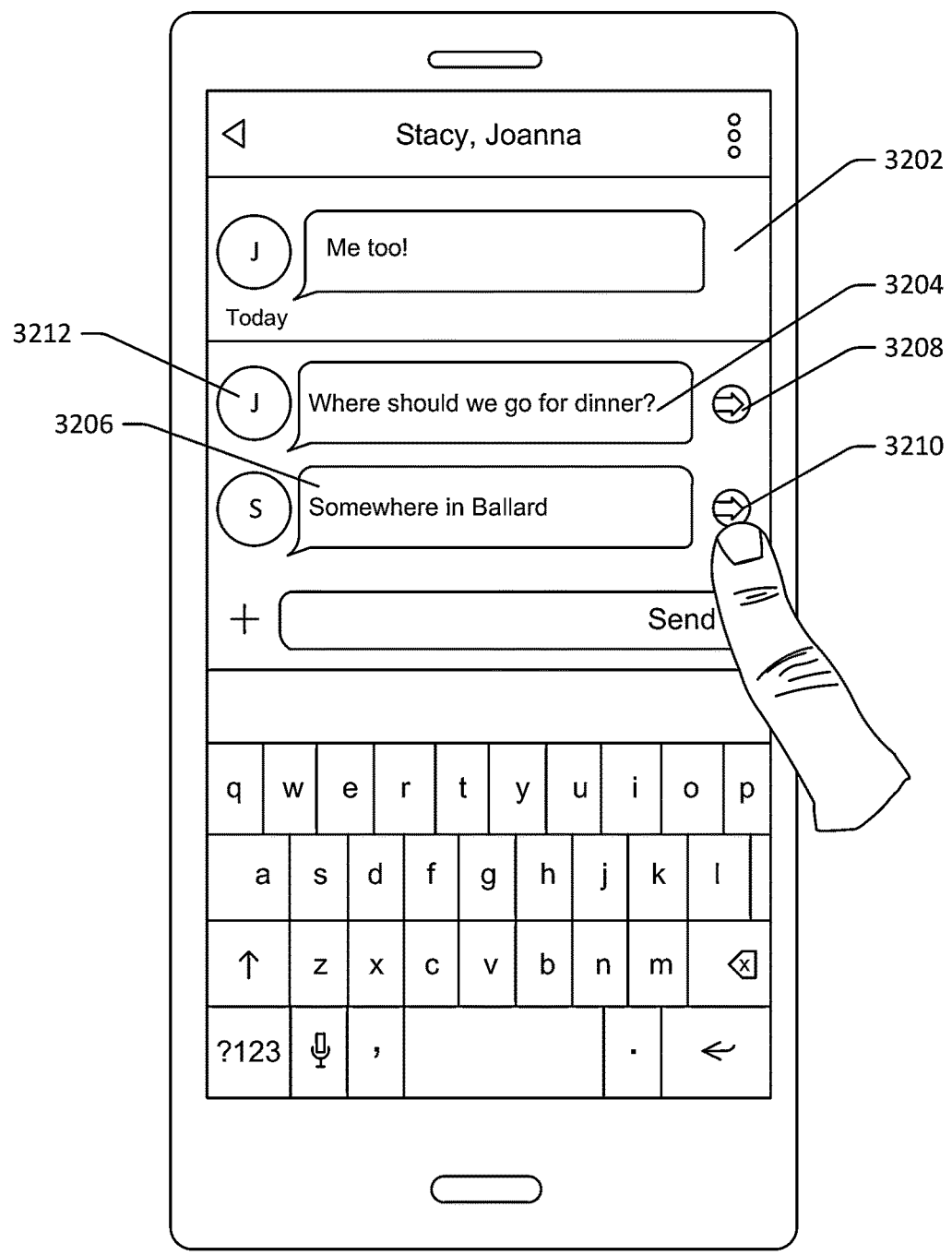
FIGS. 32-39 depict a series of illustrative user interfaces associated with the processing of electronic message text to determine contextual information, the populating of an application template instance with application input data determined using the contextual information and/or user input, and the execution of application functionality that corresponds to the application template instance upon determining that the application template instance is fully populated in accordance with one or more example embodiments of the disclosure.

Referring again to FIG. 40 in conjunction with FIG. 32, at block 4004, the back-end server 302 may determine first contextual information in a first electronic message 3204 generated during an electronic messaging conversation involving a group of user profiles. More specifically, a server-side component of an electronic messaging application may execute on the back-end server 302. In addition, a respective client-side component of the electronic messaging application may execute on each of multiple user devices 306. As previously described, in certain example embodiments, a first user may input authentication credentials to the client-side component of the electronic messaging application executing on a first user device 306 utilized by the first user to gain access to a first user profile. Once logged into the first user profile, the first user may interact with the server-side component of the electronic messaging application, and thus, with other user profiles as well, using the client-side component of the electronic messaging application executing on the first user device 306. In other example embodiments, a user profile may be automatically accessed upon device boot-up using stored authentication credentials without requiring a user to input the authentication credentials.

The first user may interact with the client-side component of the electronic messaging application to initiate an electronic messaging conversation (or resume an existing electronic messaging conversation) between the first user profile and one or more other user profiles. For example, the first user may select user profile(s) to associate with the electronic messaging conversation among user profiles having a pre-existing association with the first user profile or among user profiles that are registered with the electronic messaging application but which may not be associated with the first user profile.

After the electronic messaging conversation has been initiated, electronic messages may be exchanged between the various user profiles participating in the conversation. For example, text input by the first user via a user interface 3202 of the client-side component of the electronic messaging application executing on the first user device 306 may be routed to a second user device 306 through the server-side component of the electronic messaging application. The text may then be rendered on a second user device 306 in a corresponding user interface of the client-side component of the electronic messaging application executing on the second user device 306. The second user may similarly utilize the second user device 306 to log into a second user profile to participate in the electronic messaging conversation. The second user may enter text into the corresponding user interface rendered on the second user device 306 which may be routed to the first user device 306 through the server-side component of the electronic messaging application and displayed in the user interface 3202 rendered on the user device. An electronic message generated by a user other than the user operating the user device 3000 on which the user interface 3202 is rendered may be displayed in association with an icon that indicates the user profile with which the electronic message is associated. On the other hand, no such icon may be rendered in association with electronic messages associated with the user profile logged into the user device 3000 on which the user interface 3202 is rendered. For example, the icon 3212 indicates that the first electronic message was generated in connection with the "Joanna" user profile. It should be appreciated that any number of user profiles may be associated with the electronic messaging conversation.

In certain example embodiments, the electronic messaging conversation may include a contextual message thread. The contextual message thread may include a series of electronic messages exchanged during the messaging conversation that are contextually relevant to one another. As will be described in more detail below, contextual relevance may be determined by performing semantic language processing on the text of the electronic messages to determine that the messages are topically related. Multiple messages may also be determined to form part of the same contextual message thread if respective text in the messages is within a predetermined number of characters of one another and/or if the messages are generated within a predetermined period of time from one another.

In certain example embodiments, an electronic messaging conversation may remain active as long as a predetermined period of time does not elapse without text being received from at least one user profile. Further, in certain example embodiments, even if the electronic messaging conversation becomes inactive, the electronic messaging conversation may be accessed via a participant user profile after a period of inactivity and resumed via generation of an electronic message within the conversation. In certain example embodiments, a user interface of the client-side component of the electronic messaging application that is associated with the resumed electronic messaging conversation may render at least a portion of the text generated prior to the conversation having become inactive in addition to any text generated during the resumed conversation. A contextual message thread may span a period of time over which an electronic messaging conversation becomes inactive and is resumed. For example, if a period of time elapses during which no messages are exchanged, and thus, an electronic messaging conversation becomes inactive, the conversation may be resumed with an electronic message that is topically related to one or more messages exchanged prior to the conversation becoming inactive, thus forming part of a same contextual message thread. In other example embodiments, an electronic message that resumes an inactive conversation may not be contextually relevant to prior message(s), and thus, may form part of a new contextual message thread.

Referring again to block 4004 of FIG. 92, the first contextual information may include one or more words in the first electronic message 3204. The one or more words may be indicative of a type of user activity. For example, referring now to FIG. 32, the first electronic message 3204 may include the phrase "where should we go for dinner?" The first contextual information may include this entire phrase or certain keywords within the phrase that indicate a type of user activity. For example, the keyword "dinner" may indicate the type of activity that the participants in the electronic messaging conversation intend to engage in. In certain example embodiments, a combination of keywords (e.g., the words "where" and "dinner") may together constitute at least a portion of the first contextual information. The combination of keywords may indicate one or more characteristics of the user activity that may not be discernible from any individual keyword. For example, the keywords "where" and "dinner" may together indicate that the participants to the electronic messaging conversation are attempting to determine a location for engaging in the user activity (e.g., a restaurant at which to have dinner). One or more of the candidate application template(s) that require a location input may then be determined to be relevant to the first contextual information.

In certain example embodiments, the back-end server 302 may perform any of a variety of types of semantic language processing on the electronic message text to determine contextual information such as the first contextual information. For example, the back-end server 302 may execute semantic language processing on the phrase "where should we go for dinner" included in the first electronic message 3204 to determine semantic relationships between words in the phrase. These semantic relationships may be used to determine the first contextual information. For example, a semantic relationship between the word "should" and the word "dinner" may be identified and used to determine first contextual information that indicates that the user activity indicated by the word "dinner" is an activity that the participants in the electronic messaging conversation intend to engage in rather than a past activity that the participants have already engaged in.

Thus, the first contextual information may be determined as a result of execution of semantic language processing on the electronic message text of the first electronic message 3204 (and potentially one or more additional electronic messages) and/or from the presence of one or more keywords in the text. If the first contextual information indicates that the participants to the electronic messaging conversation are attempting to determine a location for engaging in a user activity, the back-end server 302 may identify one or more options relating to the user activity. Using the example shown in FIG. 32, if the first contextual information indicates that the participants are attempting to determine a location for having dinner, the back-end server 302 may determine a set of restaurant options. In certain example embodiments, a location of each participant to the electronic messaging conversation may be determined from, for example, GPS coordinates received from a GPS receiver of each user device 306, and restaurant options located within some distance of each location may be determined. As will be described in more detail later in this disclosure, content cards representative of the restaurant options may be presented to the participants and may be selectable for insertion into a user interface (e.g., the user interface 3202) associated with the electronic messaging conversation. In this manner, different card content may be presented to different participants in the electronic messaging conversation based on, for example, different locations (or other attributes) of the participants. In certain example embodiments, even though different card content may be presented to different user profiles, the card content may nonetheless be sharable among participants in the electronic messaging conversation. In certain other example embodiments, the same card content may be presented to each participant in an electronic messaging conversation.

In certain example embodiments, the set of options may be filtered based on additional contextual information determined to be present in one or more electronic messages. For example, referring again to FIG. 40 in conjunction with FIG. 32, at block 4006, the back-end server 302 may determine second contextual information in a second electronic message 3206 generated during the electronic messaging conversation. Similar to the first contextual information, the second contextual information may include one or more words of the second electronic message 3206 generated during the electronic messaging conversation. In certain example embodiments, the second contextual information may be indicative of a geographic region. For example, referring to FIG. 32, the second contextual information may include at least a portion of the phrase "somewhere in Ballard" included in the second electronic message 3206. As such, the second contextual information may be indicative of the geographic region/location referred to as "Ballard."

In other example embodiments, the second electronic message 3206 may not indicate a specific geographic region/location. For example, the second electronic message 3206 may instead include the phrase "how about somewhere close to me." In such example embodiments, additional information relating to a user profile associated with the electronic messaging conversation or a user device 306 used to log into such a user profile may be accessed to determine a specific geographic region/location. For example, a registered address associated with the user profile that generated the second electronic message 3206 that includes the phrase "how about somewhere close to me" may be determined, and the registered address may indicate the geographic location/region. As another example, location coordinates (e.g., Global Positioning System (GPS) coordinates) associated with the user device used to log into the user profile may be determined, and the location coordinates may indicate the geographic region/location. In such example embodiments, the portion of the second electronic message that indicates the location-related context and the additional information used to identify a specific geographic region/location may together constitute the second contextual information.

At block 4008, the back-end server 302 may determine that the first contextual information and the second contextual information form part of the same contextual message thread. The back-end server 302 may determine that the first contextual information and the second contextual information form part of the same contextual message thread by performing semantic processing on the first electronic message 3204, the second electronic message 3206, and potentially one or more additional electronic messages generated during the electronic messaging conversation to determine that they are topically related. In certain example embodiments, the back-end server 302 may additionally or alternatively determine that the first contextual information and the second contextual information form part of the same contextual message thread (e.g., are contextually related) if, for example, one or more words of the portion of the first electronic message 3206 that corresponds to the first contextual information are within a threshold number of characters from one or more words of the portion of the second electronic message 3206 that corresponds to the second contextual information. In other example embodiments, the back-end server 302 may determine that the first contextual information and the second contextual information are contextually related if, for example, the portion of the first electronic message 3204 that corresponds to the first contextual information was generated within a threshold period of time of when the portion of the second electronic message 3206 that corresponds to the second contextual information was generated. As such, a spatial and/or temporal relationship between the first contextual information and the second contextual information within the electronic messaging conversation may be used to determine whether the first contextual information and the second contextual information are contextually related. If the portion of the first electronic message 3204 corresponding to the first contextual information was located more than a threshold number of characters from the portion of the second electronic message 3206 corresponding to the second contextual information, or the two portions were generated more than a threshold amount of time apart from one another, this may indicate that the first and second contextual information are related to different contextual message threads. Referring to the example shown in FIG. 32, if the second electronic message 3206 mentioning the geographic region "Ballard" was generated much earlier in the conversation than the first electronic message 3204 including the phrase "where should we go for dinner" and/or a large number of intervening messages were generated, this may indicate that "Ballard" was not mentioned as part of the same contextual message thread as the phrase "where should we go for dinner," and thus, using the geographic region "Ballard" to filter a set of restaurant options may not be warranted.

At block 4010, the back-end server 302 may determine a group of physical locations/events based at least in part on the first contextual information and the second contextual information. Referring again to FIG. 32 as an example, generation of the text "somewhere in Ballard" immediately after generation of the text "where should we go for dinner?" may indicate that the first contextual information that indicates the type of activity (dinner) that the participants wish to engage in is contextually related to the second contextual information that indicates a specific geographic region/location. Based on this contextual relationship, a set of options corresponding to the first contextual information may be filtered to include only those options that correspond to the second contextual information. Referring to the example illustrated in FIG. 32, a group of restaurants that are options for dinner may be filtered to include only those restaurants that are within the geographic region indicated by the second contextual data. This filtered set of restaurant options may be the group of physical locations determined at block 9210.

Figure 33:
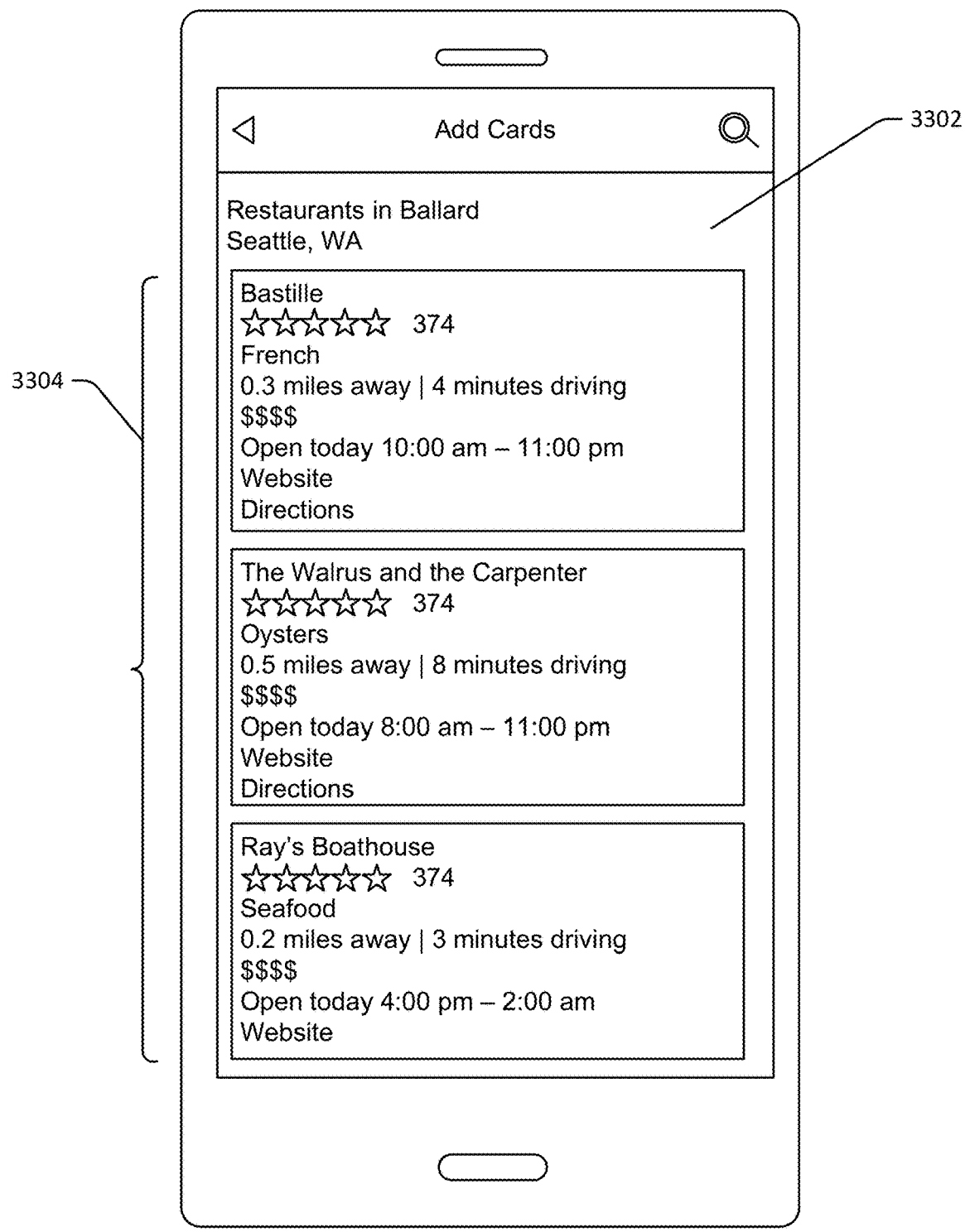

The back-end server 302 may then determine a respective content card for each option in the filtered group of options. As shown in FIG. 33, each content card may contain identifying information for a corresponding restaurant within the geographic region "Ballard" such as a name of the restaurant, a physical address associated with the restaurant location, contact information, or the like. At block 9212, and as shown in FIG. 32, the client-side component of the electronic messaging application may render a selectable icon 3210 in association with at least a portion of the electronic message text. For example, the selectable icon 3210 may be rendered in association with the second electronic message 3206 containing the second contextual information. User selection of the selectable icon 3210, such as by a participant to the electronic messaging conversation, may cause a second user interface 3302 to be rendered on the user device 306 of the participant at block 4014, as shown in FIG. 33. The selectable icon 3210 may be rendered on each user device 306 being used to access the electronic messaging conversation. More specifically, a respective client-side component of the electronic messaging application executing on each user device 306 may render the selectable icon 3210 within a corresponding user interface associated with the electronic messaging conversation. Thus, the selectable icon 3210 may be selectable via any of the user profiles participating in the electronic messaging conversation.

Referring to FIG. 33, the second user interface 3302 may include a set of content cards 3304 corresponding to the group of filtered options. For example, the second user interface 3304 may include content cards corresponding to restaurants located within the "Ballard" geographic region. Referring again to FIG. 32, in certain example embodiments, a separate selectable icon 3208 may be rendered in association with the first electronic message 3204. Selection of that selectable icon 3208 may cause a user interface to be rendered that includes content cards corresponding to the larger, unfiltered set of options corresponding to the first contextual information. In particular, selection of the selectable icon 3208 rendered in association with the first electronic message 3204 that includes the text "where should we go for dinner" may cause a set of content cards to be displayed that correspond to restaurants, at least some of which may not be located in the "Ballard" geographic region. In certain example embodiments, selection of a selectable icon may cause the corresponding user interface associated with the selectable icon to only be rendered on the user device that the user profile associated with the selection is logged into. Other user device(s) associated with other user profiles participating in the electronic messaging conversation may continue to render a user interface that contains the electronic message text generated during the electronic messaging conversation. In other example embodiments, selection of a selectable icon may cause the corresponding user interface to be rendered on each user device being used by each participant in the electronic messaging conversation.

Figure 34:
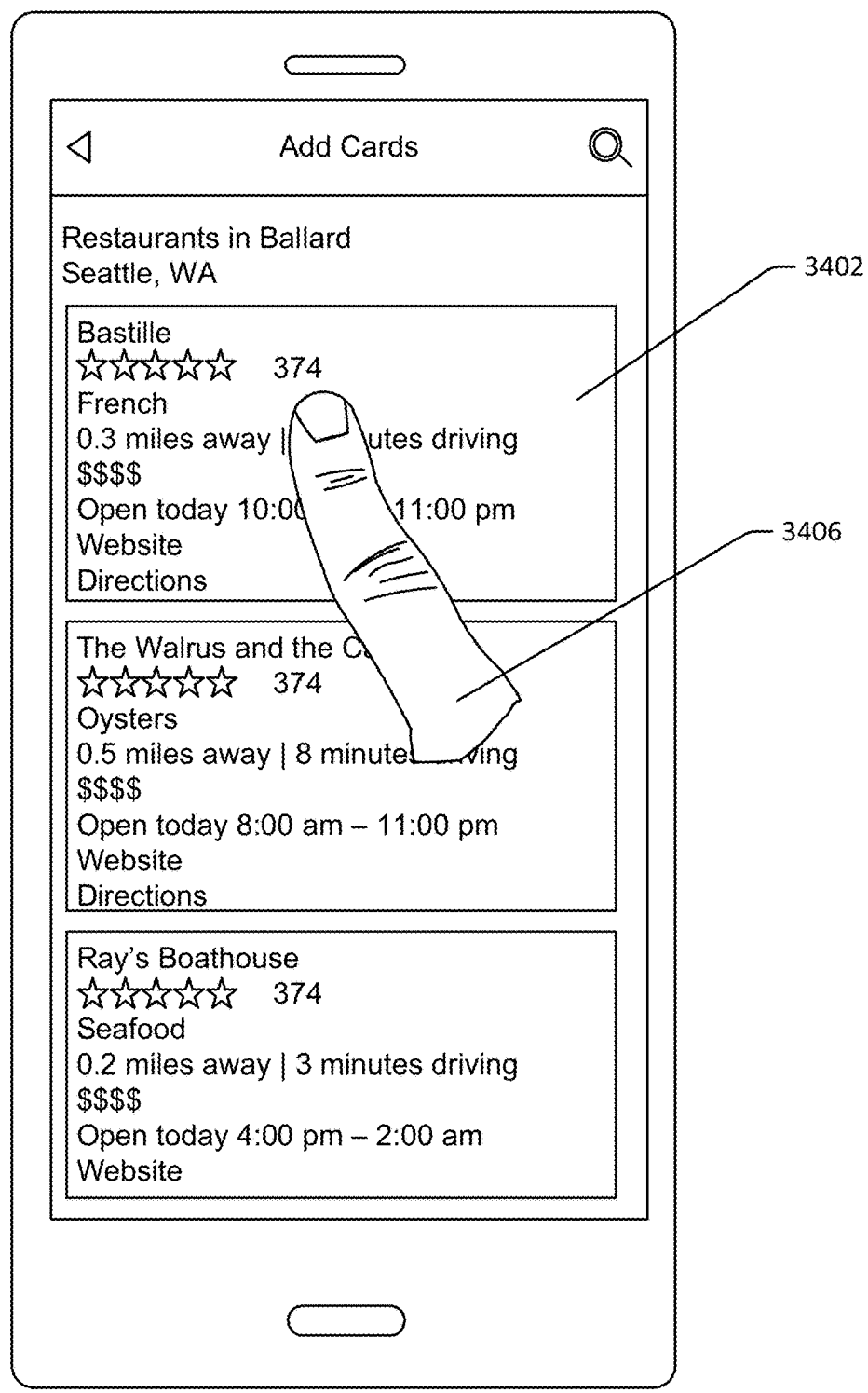
Figure 35:
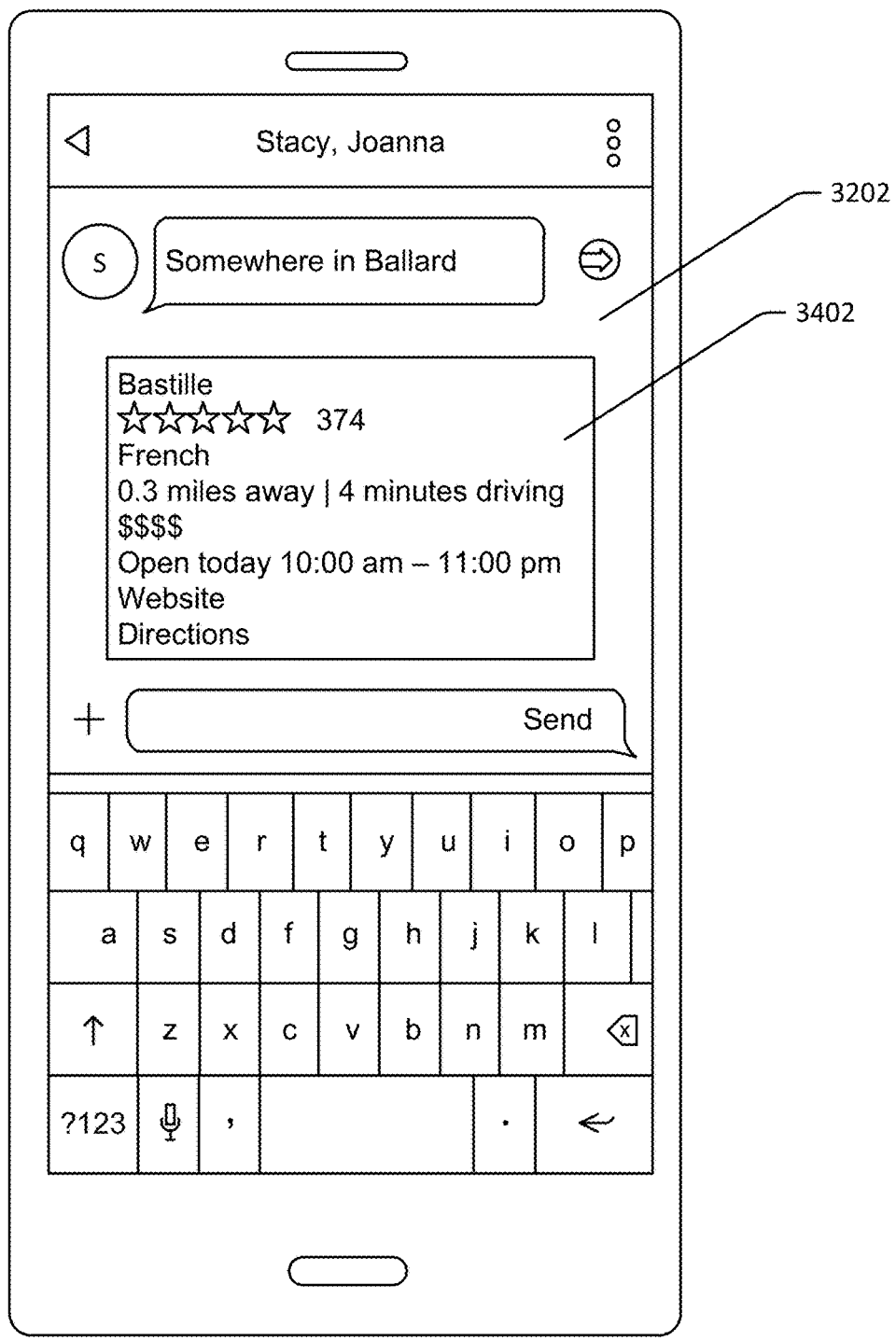

Referring again to FIG. 40, the client-side component of the electronic messaging application may receive user input at block 4016 indicative of a selection of a particular content card of the group of content cards rendered at block 4014. For example, as shown in FIG. 34, a participant in the electronic messaging conversation may select 3406 a content card 3402 corresponding to a particular restaurant option. Selection 3406 of a particular content card 3402 may cause the selected content card 3402 to be rendered in the user interface 3202 of the messaging conversation at block 4018, as shown in FIG. 35. More specifically, the selected content card 3402 may be inserted among the electronic message text displayed in the user interface 3202 associated with the electronic messaging conversation as illustratively shown in FIG. 35. Although the content card selection may be made by a particular participant in the electronic messaging conversation, the selected content card 3402 may be rendered in the respective electronic messaging conversation user interface being rendered on the respective user device that each user profile participating in the electronic messaging conversation is logged into. Thus, the selected content card 3402 may be viewable by all users participating in the electronic messaging conversation.

At block 4020, the back-end server 302 may determine that a first one or more additional electronic messages are generated during the electronic messaging conversation that indicate approval from one or more participants in the conversation of the location/event corresponding to the displayed content card. For example, as illustratively shown in FIG. 36, an electronic message 3602 that includes the words "sounds good to me" and/or an electronic message 3604 that includes the words "same here" may indicate approval of the restaurant represented by the selected content card 3402. The back-end server 302 may determine that the electronic messages 3602, 3604 indicate approval of the selected content card 3402 may performing semantic language processing on the messages 3602, 3604 to determine contextual information present in the messages 3602, 3604 and further determining that the messages 3602, 3064 form part of the same contextual message thread as the messages 3204, 3206 based at least in part on determining that the contextual information gleaned from the messages 3602, 3604 is topically related to contextual information contained in the messages 3204, 3206. In certain example embodiments, an electronic message indicating approval of the location (e.g., restaurant) represented by the selected content card may only need to be generated by one or more user profiles other than the user profile that made the selection since the user profile that made the selection may be deemed to have provided tacit approval. In other example embodiments, electronic messages indicating approval of the location/event represented by the selected content card 3402 may not be provided and may not be required.

Referring again to FIG. 40, at block 4022, the back-end server 302 may determine third contextual information present in a third electronic message generated during the messaging conversation. The third contextual information may include time-based information. In certain example embodiments, the third contextual information may include a keyword indicative of a time-based context. For example, as illustratively shown in FIG. 36, the third contextual information may include the keyword "time" present in the electronic message 3604. In certain example embodiments, the third contextual information may be determined from semantic language processing performed on the third electronic message 3604 and/or from the presence of one or more of keywords in the third electronic message 3604. Further, in certain example embodiments, the semantic language processing and/or the presence of a combination of keywords in the third additional electronic message 3604 may indicate that the participants in the electronic messaging conversation are attempting to determine a time at which to participate in the user activity. For example, as illustratively shown in FIG. 36, the combination of the keywords "what" and "time" present in the third electronic message 3604 may indicate that the participants are attempting to determine a time at which to meet for dinner.

Referring again to FIG. 40, at block 4024, the back-end server 302 may determine that the first contextual information, the second contextual information, the third contextual information, and/or other available information together correspond to all required categories of input for a calendar application template in the set of candidate application templates. For example, the calendar application template may require a location, a time, and a list of invitees. The first contextual information and the second contextual information may correspond to the required location input category, the third contextual information may correspond to the required time input category, and the list of invitees may be determined from the participants to the conversation. In certain example embodiments, additional contextual information may be determined from electronic messages exchanged during the conversation, where the additional contextual information may indicate a subset of the participants that should be included as invitees. For example, an electronic message generated during the electronic messaging conversation may include the phrase "I can't make it to dinner," in which case, the user profile that generated the message may be excluded from the list of invitees. As previously noted, an application template instance may be generated that corresponds to the calendar application template. The application template instance may be populated with application input data corresponding to the required input categories. For example, the application template instance may be populated with an address corresponding to the restaurant represented by the selected content card and with a list of invitees corresponding to at least a subset of the participants to the conversation. In certain example embodiments, additional user input may be required to generate application input data. For example, additional user input may be required to determine a time with which to populate the application template instance.

Figure 36:
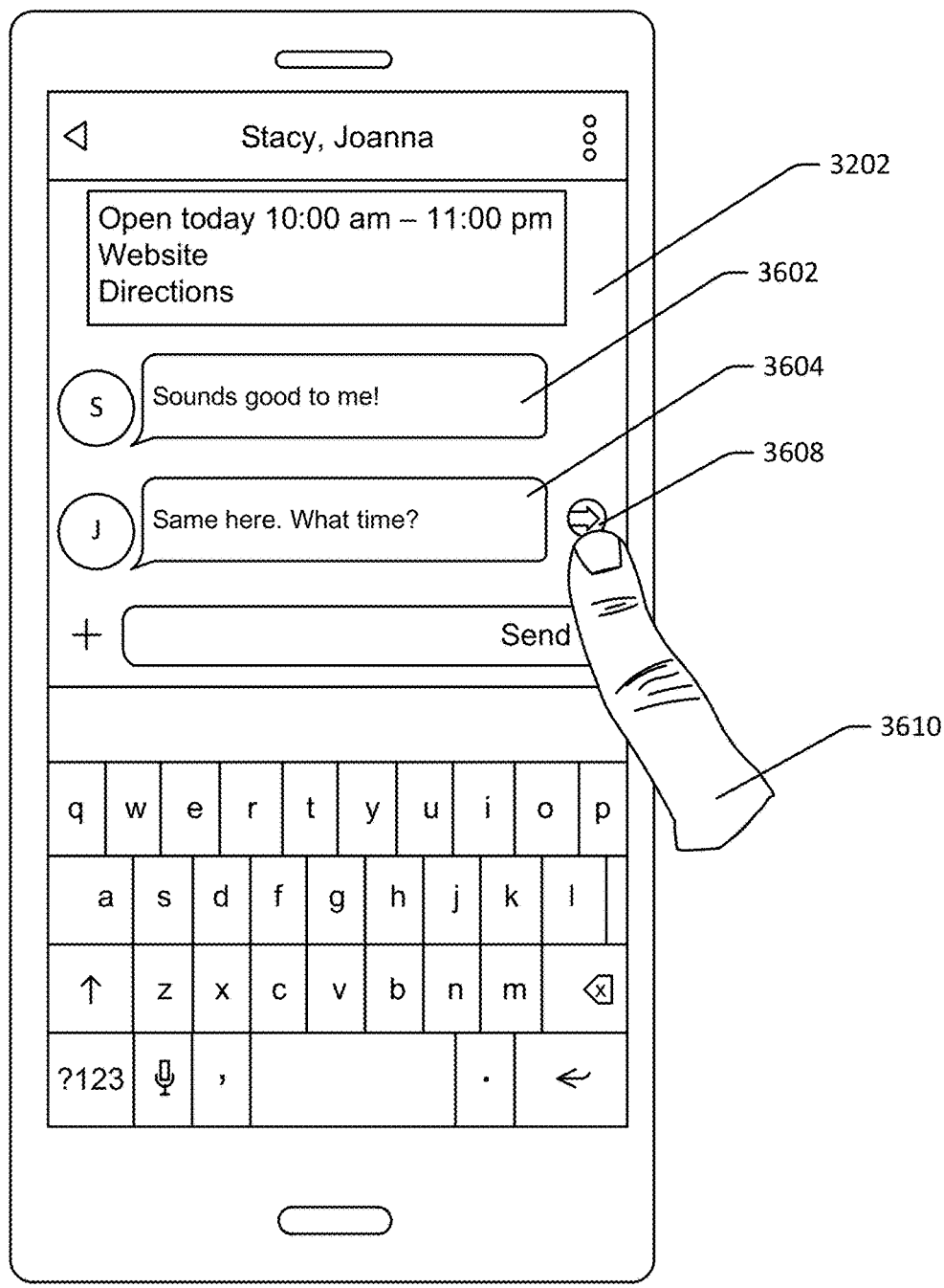
Figure 37:
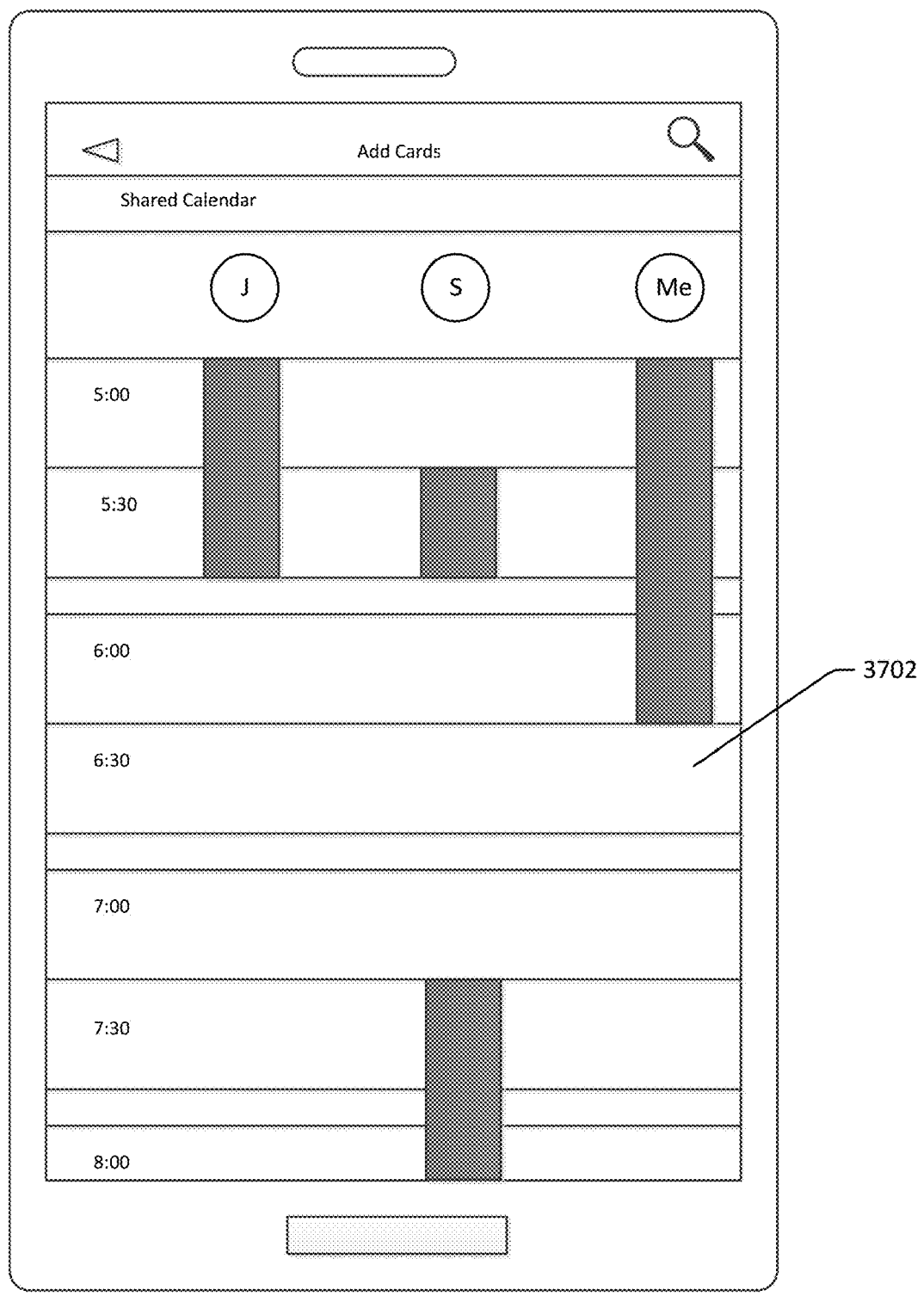
Figure 38:
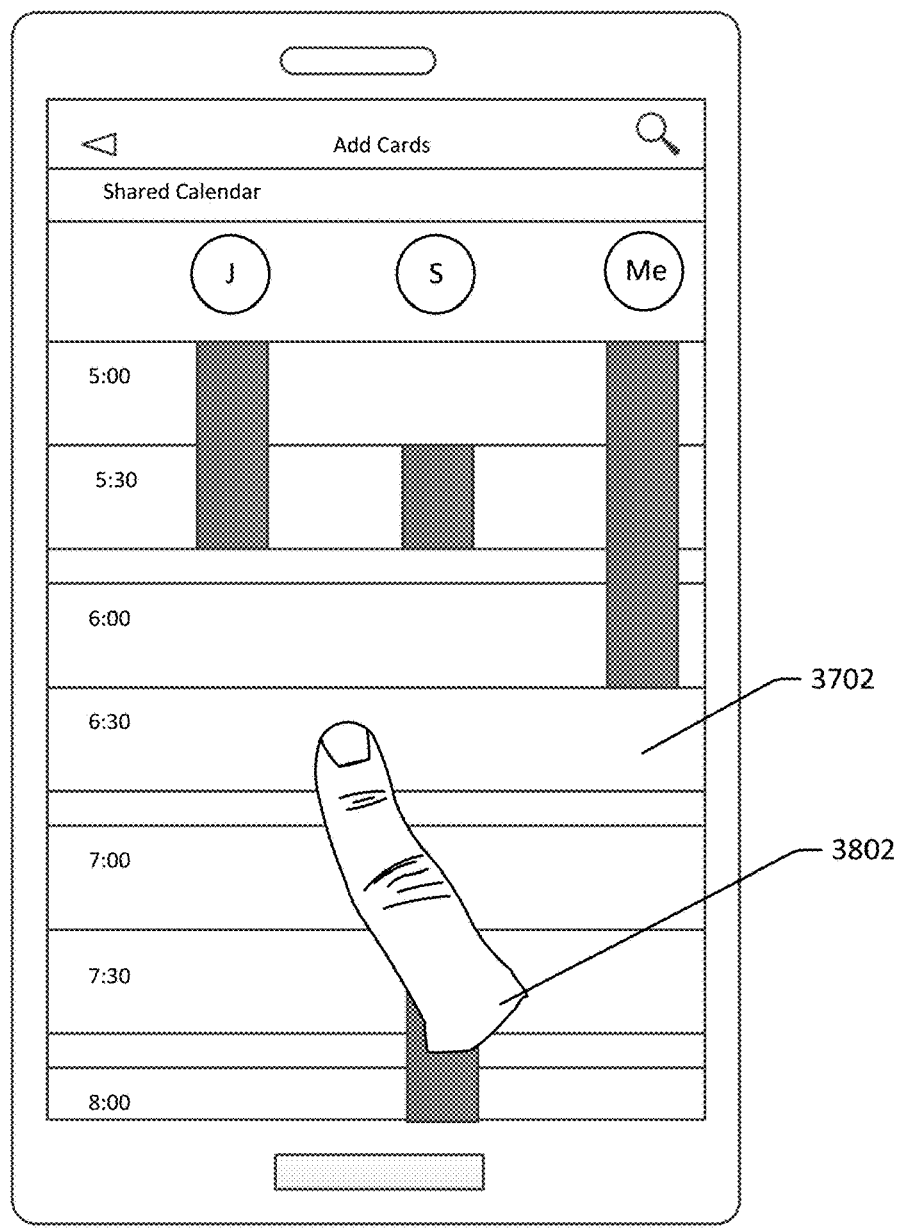

In particular, based on the identification of third contextual information that indicates that the electronic messaging conversation participants are attempting to determine a time at which to engage in their desired user activity, a selectable icon 3608 may be rendered in the user interface 3202 associated with the electronic messaging conversation, as shown in FIG. 36. In certain example embodiments, the selectable icon 3608 may be rendered in the respective electronic messaging conversation user interface rendered on each user device 306 being used to participate in the conversation and may be selectable by any participant to the conversation. Selection of the selectable icon 3608 by a particular participant may cause a shared calendar 3702 to be displayed at block 4026, as illustratively shown in FIG. 37. The shared calendar 3702 may be displayed only on the user device associated with the participant that selected the selectable icon 3608 or may be displayed on the respective user device of each participant in the electronic messaging conversation. The shared calendar 3702 may display the availability of each participant in the messaging conversation. At block 4028, the client-side component of the electronic messaging application executing on a particular user device may receive user input 3802 indicative of a selected time, as illustratively shown in FIG. 38. The selected time may be a timeslot in the shared calendar 3702 during which each participant in the conversation is available. Based on the user selection 3802, a calendar invite 3902 may be automatically generated at block 4030, as illustratively shown in FIG. 39. The calendar invite 3902 may be automatically generated because the application template instance corresponding to the calendar application template is fully populated with all required input data. The calendar invite 3902 may be generated without receiving specific user input to generate the calendar invite 3902. Rather, the back-end server 302 may determine that all required input data is known to permit the calendar invite 3902 to be generated. For example, the back-end server 302 may determine the location from the selected content card 3402 (the selection of which may have been confirmed/validated by one or more user profiles participating in the conversation), may determine the time based on the selected timeslot, and may determine the invitees from the participants in the conversation. Accordingly, the back-end server 302 may be configured to automatically generate the calendar invite 3902 based on these known application inputs without requiring specific user input to trigger the generation of the calendar invite 3902.

Figure 39:
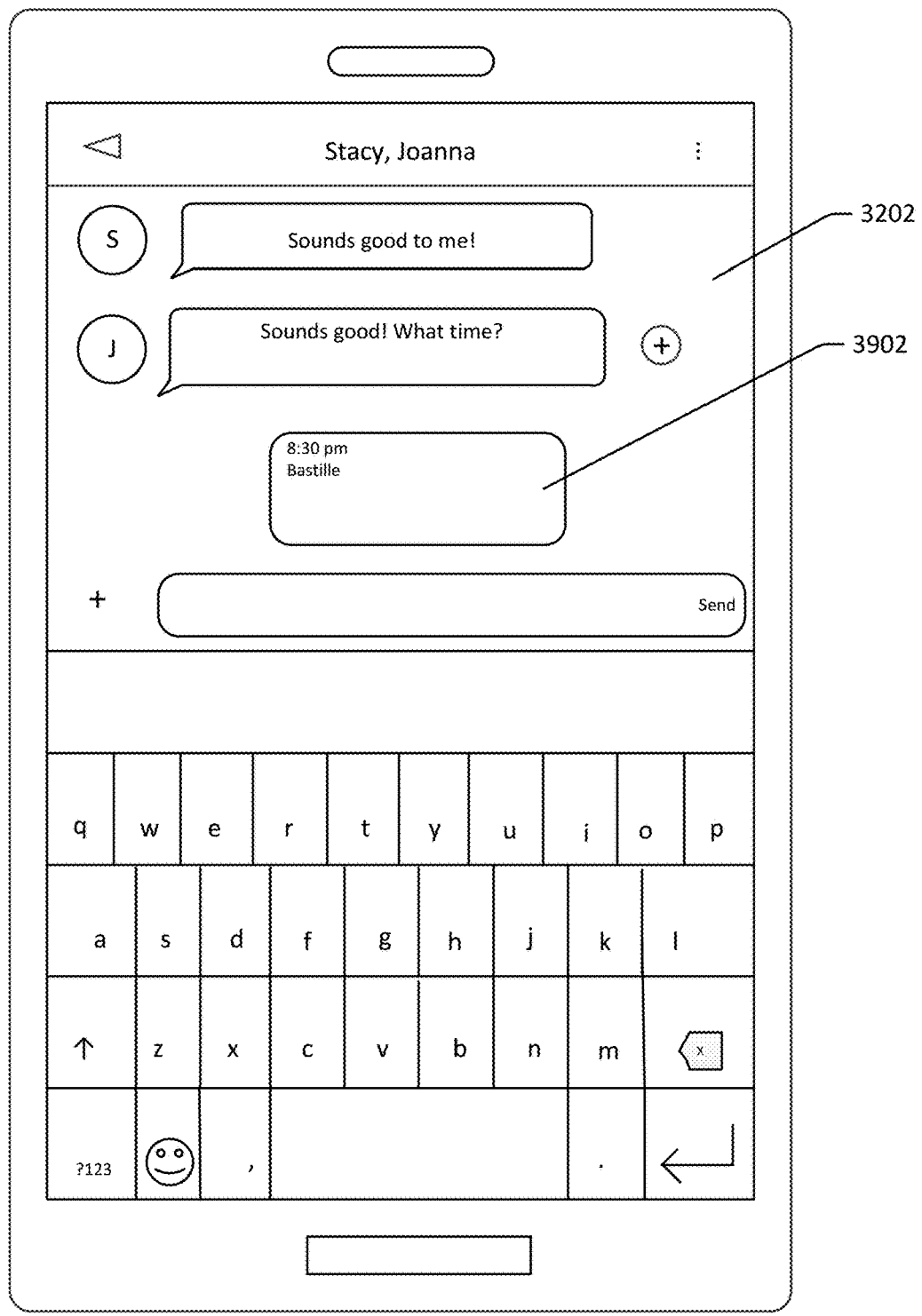
Figure 40:
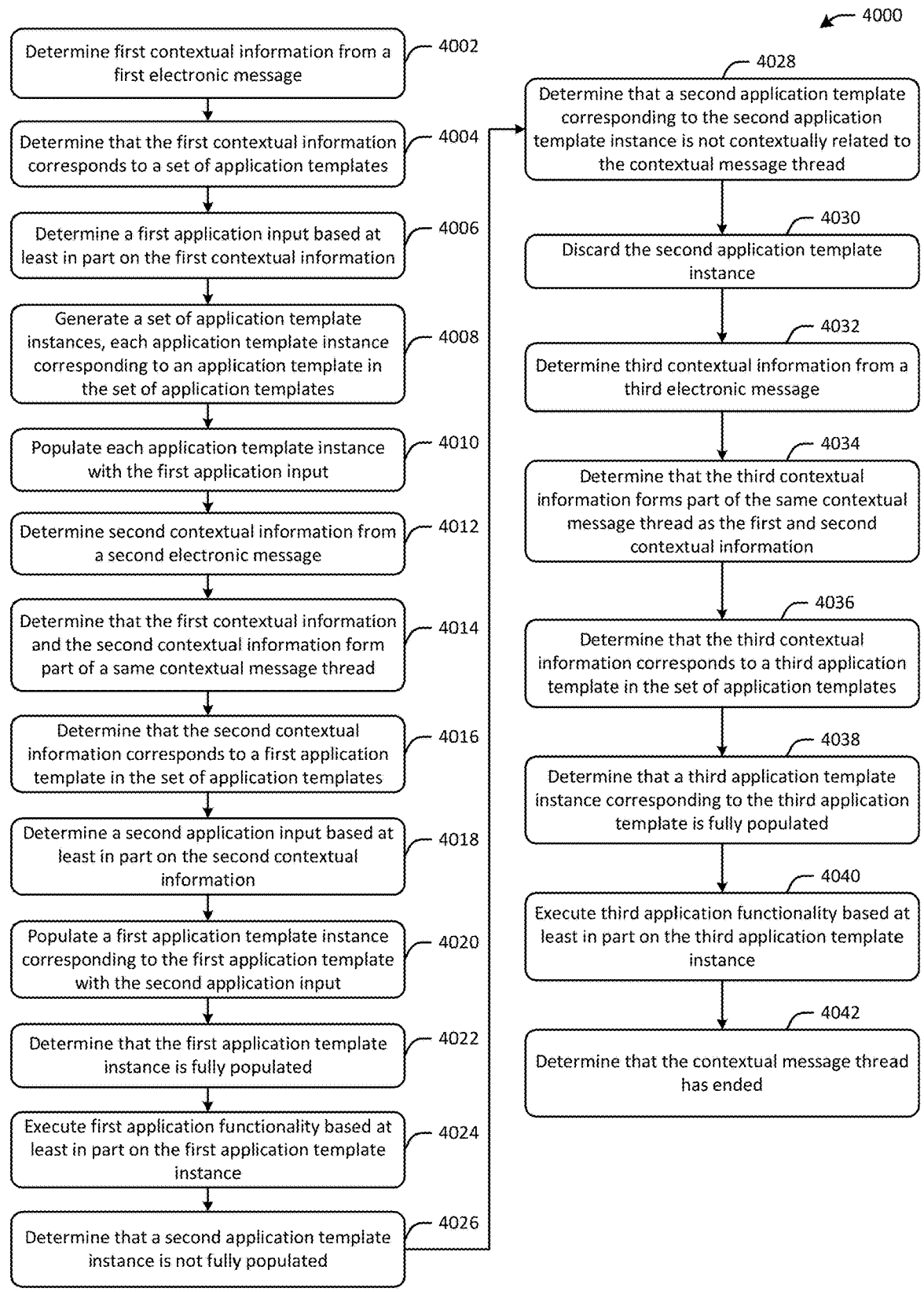
FIG. 40 is a process flow diagram depicting an illustrative method for determining location information and time information based at least in part on contextual information included in electronic messages exchanged as part of a contextual message thread, automatically generating a calendar invite based at least in part on the location information, the time information, and information identifying users participating in a messaging conversation that includes the contextual message thread, and displaying the calendar invite in a user interface of the messaging conversation in accordance with one or more example embodiments of the disclosure.

At block 4032, the calendar invite 3902 may be displayed in the user interface 3202 rendered on the user device 3000, as shown in FIG. 39. In addition, the calendar invite 3902 may be displayed in each electronic messaging conversation user interface being rendered on each other user device participating in the conversation. In particular, the calendar invite 3902 may be rendered in the respective electronic messaging conversation user interface being rendered on the respective user device that each user profile participating in the electronic messaging conversation is logged into. Thus, the calendar invite 3902 may be viewable by all users participating in the electronic messaging conversation.

Figure 41:
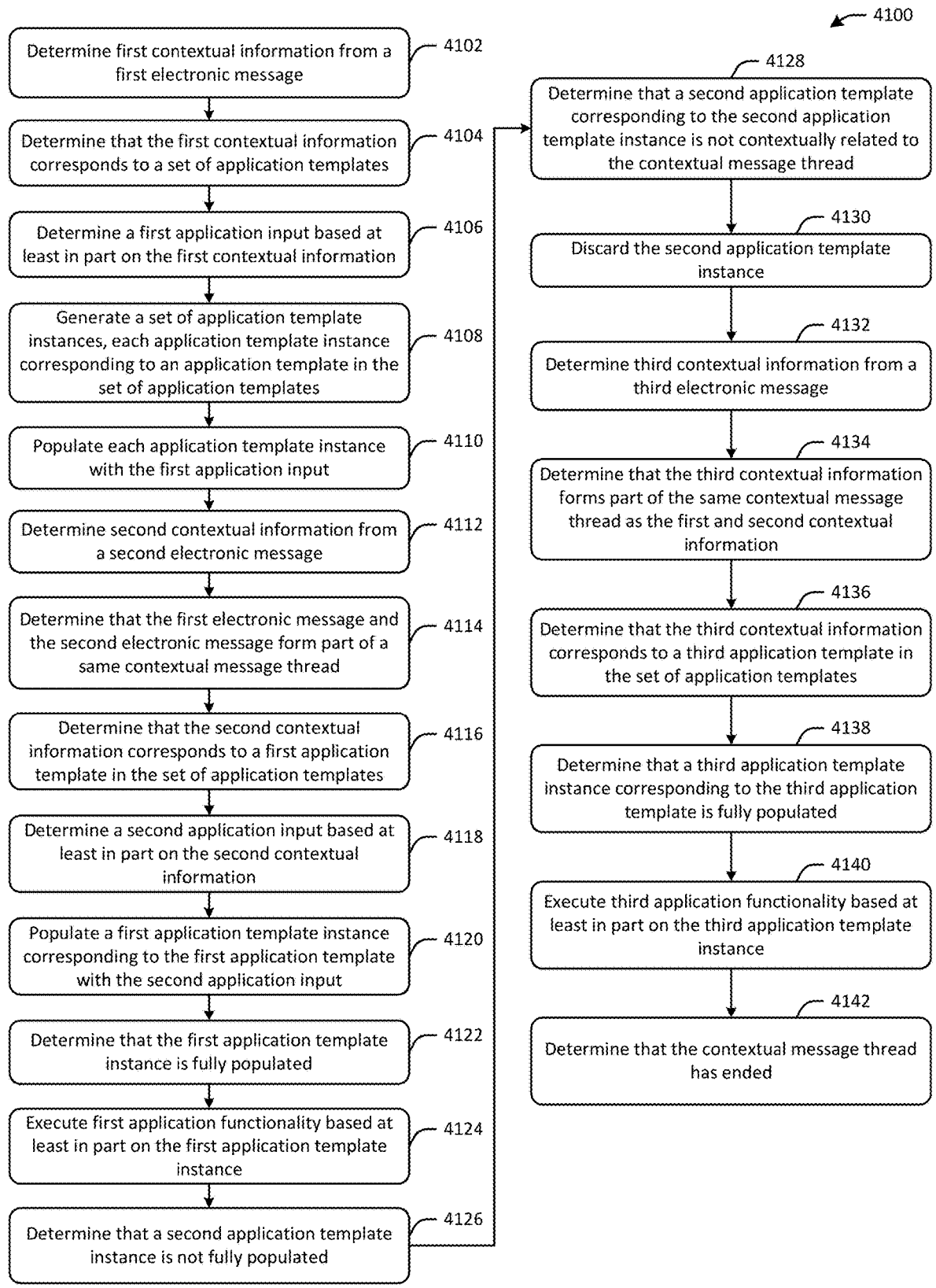
FIG. 41 is a process flow diagram depicting an illustrative method for determining contextual information included in electronic messages exchanged as part of a contextual message thread, determining a set of application templates corresponding to the contextual information, generating application inputs based at least in part on the contextual information, generating application template instances corresponding to the application templates, populating the application template instances with the application inputs, and executing application functionality corresponding to one or more fully populated application template instances in accordance with one or more example embodiments of the disclosure.

FIG. 41 is a process flow diagram depicting an illustrative method 4100 for determining contextual information included in electronic messages exchanged as part of a contextual message thread, determining a set of application templates corresponding to the contextual information, generating application inputs based at least in part on the contextual information, generating application template instances corresponding to the application templates, populating the application template instances with the application inputs, and executing application functionality corresponding to one or more fully populated application template instances in accordance with one or more example embodiments of the disclosure. The operations of the method 4100 are described as being performed by a back-end server 302. However, it should be appreciated that one or more operations may be performed in response to execution of computer-executable instructions of one or more program modules, engines, applications, or the like executing on one or more back-end server(s) 302 and/or one or more user devices 306. Further, in certain example embodiments, at least a subset of the operations of the method 4100 may be performed in a distributed manner between one or more back-end servers 302 and one or more user devices 306.

At block 4102, the back-end server 302 may determine first contextual information from a first electronic message. As previously described, the first contextual information may be determined based on semantic language processing of the first electronic message and/or based on one or more keywords being detected in the text of the first electronic message. The first electronic message may be generated during an electronic messaging conversation between a group of participants corresponding to a group of user profiles. The electronic messaging conversation may be facilitated by an electronic messaging application as described earlier. The electronic messaging application may be an online messaging application that may be accessed using a client browser application, a dedicated mobile application, a dedicated desktop/laptop application, or the like. In certain example embodiments, the electronic messaging conversation may be a series of related short message service (SMS) messages, e-mail messages, or the like. In yet other example embodiments, the electronic messaging conversation may include any of a variety of forms of electronic content such as voice data, text data, video data, image data, or the like. In certain example embodiments, electronic messaging conversation may be a voice conversation and the electronic messages forming part of the conversation may be generated by executing speech recognition processing on voice communications generated during the voice conversation.

At block 4104, the back-end server 302 may determine that the first contextual information corresponds to a set of application templates. As a non-limiting example, the set of application templates may include a calendar application template, an online dinner reservation application template, and a car service application template. Each of these application templates may specify a location input category. The first contextual information may include one or more keywords that correspond to the location input category specified by each of the set of application templates.

At block 4106, the back-end server 302, may determine a first application input based at least in part on the first contextual information. For example, if the first contextual information indicates that the messaging conversation participants wish to engage in some activity, the first application input may be identifying information of a particular type of activity. The particular type of activity may be a time-based activity that is intended to be engaged in at a particular time or over a particular time period. For example, the particular type of activity may be a social gathering, an event (e.g., a concert), or the like. In certain example embodiments, the first contextual information may directly specify the first application input. For example, if the first contextual information includes the keyword "dinner," this keyword may constitute the first application input. In other example embodiments, a set of options may be determined from the first contextual information and presented to the messaging conversation participants. A user selection of a particular option may then constitute the first application input. For example, if the first electronic message includes the phrase "let's go to a game tonight," a set of candidate sporting events may be determined and a user selection of a particular candidate sporting event may constitute the first application input.

At block 4108, a set of application template instances may be generated. Each application template instance may correspond to an application template in the set of application templates. For example, a calendar application template instance, an online dinner reservation application template instance, and a car service application template instance may be generated. At block 4110, each such application template instance may be populated with the first application input. For example, each application template instance may be populated with the identifying information of the type of activity that the messaging conversation participants wish to participate in.

At block 4112, the back-end server 302 may determine second contextual information from a second electronic message generated during the electronic messaging conversation. The second contextual information may be similarly determined based on semantic language processing of the text of the second electronic message and/or based on one or more keywords being detected in the text. In certain example embodiments, the first contextual information may indicate a type of user activity and the second contextual information may indicate one or more characteristics or attributes of the user activity. For example, the user activity may be a social gathering (e.g., a dinner, a social event, etc.) and the second contextual information may indicate a particular geographic region/location associated with the type of user activity. In such an example scenario, the second contextual information may be used to filter a set of options corresponding to the first contextual information (e.g., a set of venues for engaging in the user activity that are located in a particular geographic region). As another example, the user activity may be retail or online shopping and the second contextual information may indicate a set of products to be acquired. It should be appreciated that the above examples are merely illustrative and not exhaustive.

At block 4114, the back-end server 302 may determine that the first electronic message and the second electronic message form part of the same contextual message thread. In certain example embodiments, the back-end server 302 may determine that the first and second electronic messages form part of the same contextual message thread by performing semantic language processing on at least the first electronic message or the second electronic message to determine that the first contextual information and the second contextual information are contextually (e.g., topically) related. Additionally, or alternatively, the back-end server 302 may determine that the first contextual information and the second contextual information are contextually related if, for example, one or more words of the portion of the first electronic message that corresponds to the first contextual information are within a threshold number of characters from one or more words of the portion of the second electronic message that corresponds to the second contextual information. In other example embodiments, the back-end server 302 may determine that the first contextual information and the second contextual information are contextually related if, for example, the portion of the first electronic message that corresponds to the first contextual information was generated within a threshold period of time of when the portion of the second electronic message that corresponds to the second contextual information was generated.

At block 4116, the back-end server 302 may determine that the second contextual information corresponds to a first application template in the set of application templates. For example, the second contextual information may be indicative of a particular location (e.g., a residence of one of the participants to the electronic messaging conversation) at which the participants wish to engage in the activity (e.g., dinner) indicated by the first contextual information. The back-end server 302 may thus determine that the second contextual information corresponds to, for example, the calendar application template. At block 4118, the back-end server 302 may determine a second application input based at least in part on the second contextual information. For example, the back-end server 302 may determine a physical address directly specified in the second electronic message (or another electronic message) or may determine a physical address associated with a user profile that generated the second electronic message. At block 4120, the back-end server 302 may populate a first application instance corresponding to the first application template with the second application input. For example, the back-end server 302 may populate the calendar application template instance with a physical address determined at block 4118. The physical address may, for example, correspond to a residence of a participant to the electronic messaging conversation.

At block 4122, the back-end server 302 may determine that the first application template instance is fully populated. For example, the back-end server 302 may determine that the calendar application template instance is populated with location data, a time, and a list of invitees. The time may have been previously determined from additional contextual information determined from one or more electronic messages exchanged during the conversation and/or from a user selection from a list of candidate times presented to the participants in the messaging conversation. Similarly, the list of invitees may include all the participants to the conversation or some subset thereof determined from additional contextual information.

At block 4124, the back-end server 302 may execute first application functionality based at least in part on the first application template instance. For example, the back-end server 302 may automatically generate a calendar invite based at least in part on the location data, time, and list of invitees specified in a calendar application template instance. In certain example embodiments, a subject line of the calendar invite may be populated with additional data that is populated in the application template instance.

At block 4126, the back-end server 302 may determine that a second application template instance corresponding to a second application template is not fully populated. Further, at block 4128, the back-end server 302 may determine that the second application template is not contextually related to the contextual message thread. For example, the location data determined from the second contextual information may represent a physical address of a participant to the electronic messaging conversation. If the second application template is an online dinner reservation application, the back-end server 302 may not have populated the second application template instance with the location data since the address is not representative of a restaurant location. Further, the back-end server 302 may determine that the online dinner reservation application template is no longer contextually relevant to the current contextual message thread because the location that has been chosen by the participants to the electronic messaging conversation is not a third-party location. Accordingly, at block 4130, the back-end server 3012 may discard the second application template instance.

At block 4132, the back-end server 302 may determine third contextual information from a third electronic message. The third contextual information may indicate that a participant needs a transportation service to take him/her to the residence of one of the participants at which the participants plan to engage in the desired activity (e.g., dinner). For example, the third electronic message may include the phrase "I need a ride there." It should be appreciated that in certain example embodiments, additional contextual information may indicate that the participant no longer needs the car service. For example, a subsequent electronic message may be received that includes the phrase "I can give you a ride." The remaining discussion of FIG. 41 assumes that such additional contextual information is not received.

At block 4134, the back-end server 302 may determine that the third contextual information forms part of the same contextual message thread as the first contextual information and the second contextual information. The determination at block 4134 may be made in accordance with any of the techniques previously described. At block 4136, the back-end server 302 may determine that the third contextual information corresponds to a third application template in the set of application templates. For example, the back-end server 302 may determine that the third contextual information corresponds to a car service application template.

At block 4138, the back-end server 302 may determine that a third application template instance corresponding to the third application template is fully populated. At block 4140, the back-end server 302 may execute third application functionality based at least in part on the third application template instance. For example, a car service application may be automatically launched on a user device used to generate the third electronic message. The car service application may be pre-populated with the location data populated in the third application template instance. In certain example embodiments, the third application template instance may have been fully populated prior to receipt of the third electronic message. However, the third contextual information may nonetheless be needed to confirm that the third application template is contextually related to the current contextual message thread and that the third application functionality should be executed.

At block 4142, the back-end server 302 may determine that the contextual message thread has ended. For example, the back-end server 302 may perform semantic language processing on additional electronic messages generated during the electronic messaging conversation to determine that the additional electronic messages are not topically related to the electronic messages forming part of the contextual message thread. Additionally, or alternatively, the back-end server 302 may determine that the contextual message thread has ended if a predetermined period of time elapses from when the third electronic message is generated and when a subsequent electronic message is generated or if a threshold number of non-topically related messages are generated between the third electronic message and another electronic message that would otherwise have been determined to be part of the contextual message thread.

Figure 42:
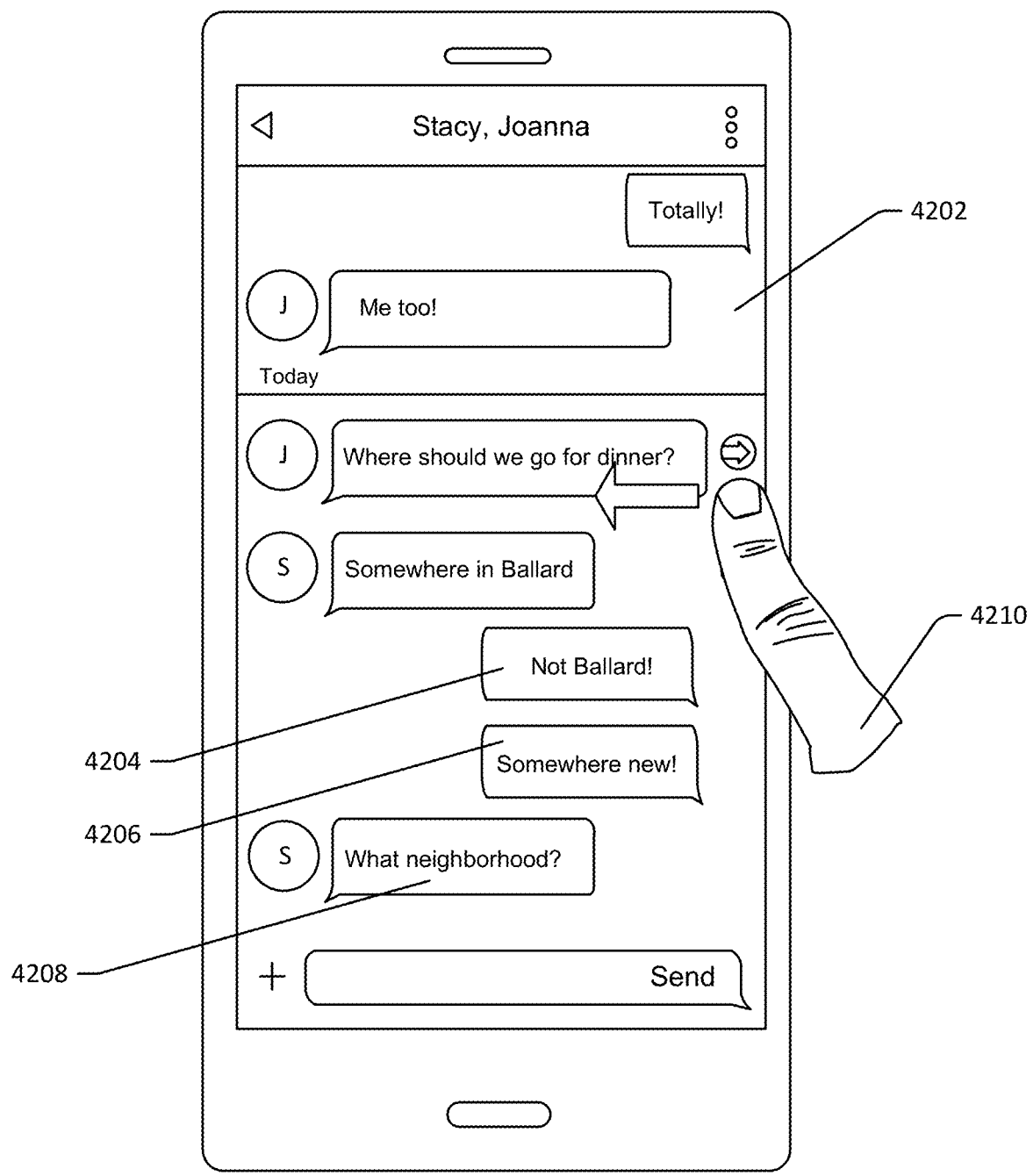
FIGS. 42-43 depict illustrative user interfaces for accessing content cards associated with candidate application templates in accordance with one or more example embodiments of the disclosure.
Figure 43:
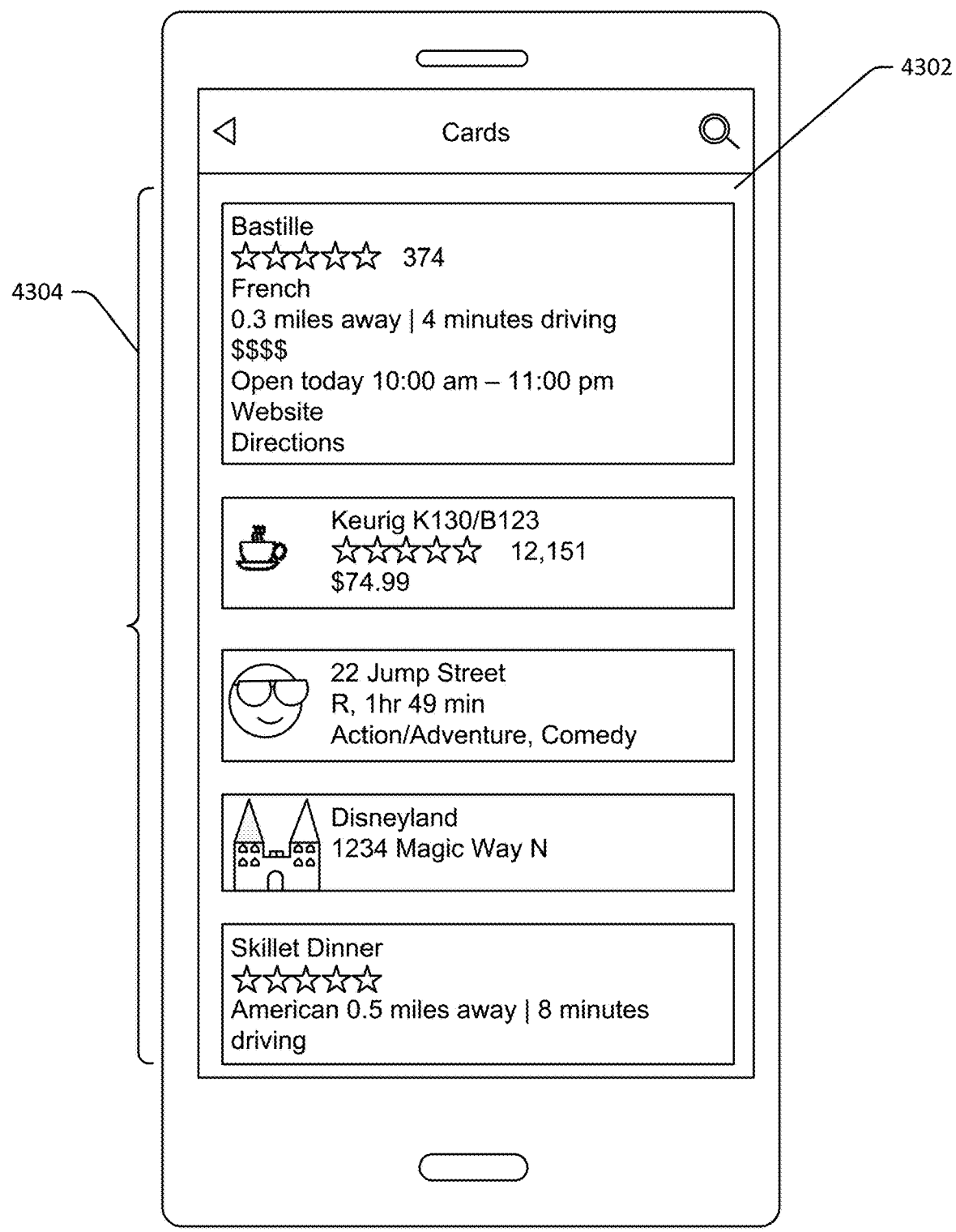

FIGS. 42-43 depict illustrative user interfaces for accessing content cards associated with candidate application templates in accordance with one or more example embodiments of the disclosure. Referring first to FIG. 42, an illustrative user interface 4202 is depicted in which message text is rendered. The message text may be associated with electronic messages exchanged during an electronic messaging conversation between a group of user profiles. For example, the user interface 4202 may correspond to a same electronic messaging conversation as the user interface 3202 first depicted in FIG. 32. Additional messages 4202, 4204, and 4206 may have been generated in the electronic messaging conversation subsequent to the message 3206 depicted in FIG. 32.

In certain example embodiments, additional context information may be determined from the additional electronic messages 4202, 4206, 4208. For example, the electronic message 4204 that includes the text "Not Ballard!" either alone or in combination with the electronic message 4206 that includes the text "Somewhere new!" may indicate that contextual information determined from a previous electronic message (e.g. message 3206) that is indicative of particular geographic region (e.g., Ballard) is no longer contextually relevant to the contextual message thread. For example, semantic language processing may be executed on the message 4204 and/or the message 4206 to determine contextual information indicating that a previously specified geographic region is no longer contextually relevant to the current contextual message thread.

In certain example embodiments, a subsequent electronic message 4208 may be semantically processed to determine that the participants to the messaging conversation are attempting to determine a geographic region in which to engage in a user activity (e.g., dinner) identified from previously determined contextual information. The contextual information determined from the messages 4204, 4206 as well as the contextual information determined from the message 4208 may be used to identify a set of location options (e.g., restaurant options). For example, the set of restaurant options may exclude any restaurants located in the Ballard geographic region based on the contextual information determined from the electronic messages 4204 and 4206. In response to a predetermined user gesture 4210, a user interface 4302 may be rendered on the user device. The user interface 4302 may include a listing of content cards 4304, at least of which may include identifying information for restaurant options. However, based on the contextual information determined from the messages 4204, 4206, none of the content cards may relate to restaurants located in the Ballard geographic region. The listing of content cards 4304 may further include content cards associated with products, movies, venues, events, or the like. Any content card in the listing of content cards 4304 may have been generated based on application input data provided to an application template instance. In certain example embodiments, one or more content cards in the listing of content cards 4304 may be associated with incomplete (e.g., not fully populated) application template instances. Further, in certain example embodiments, a content card in the listing of content cards 4304 may be selected by a participant to the messaging conversation and inserted into the electronic messaging conversation. Selection of the content card and/or additional electronic messages that indicate approval/confirmation of information embodied in the content card may be used to generate additional application input data to populate one or more application template instances. The cards may include cards that have previously been associated with the electronic messaging conversation. In certain example embodiments, the same cards may be accessible by any participant of the electronic messaging conversation.

Figure 44:
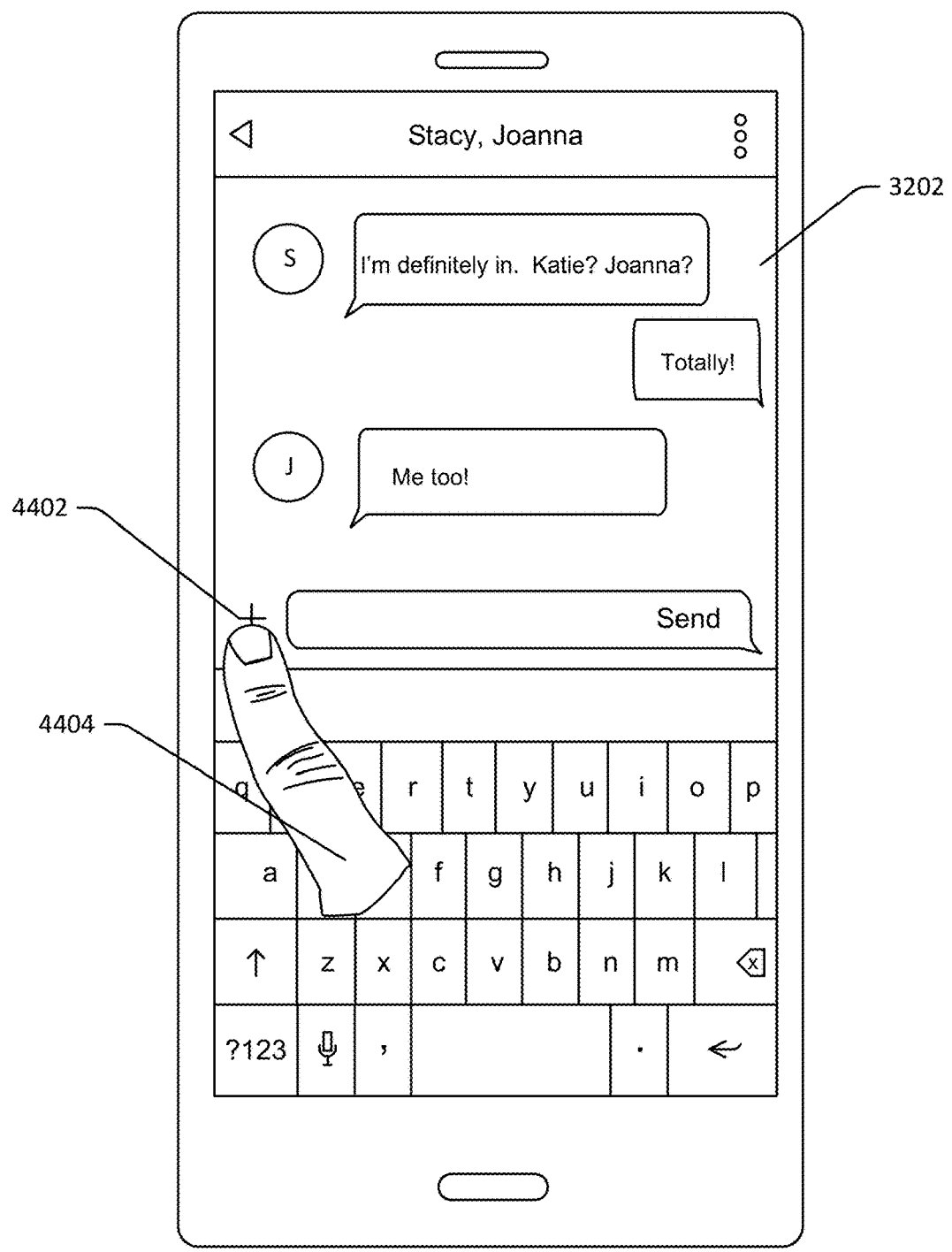
FIGS. 44-49 depict illustrative user interfaces for accessing content cards associated with different categories of application templates and inserting a selected content card associated with a particular application template category into an electronic messaging conversation in accordance with one or more example embodiments of the disclosure.
Figure 45:
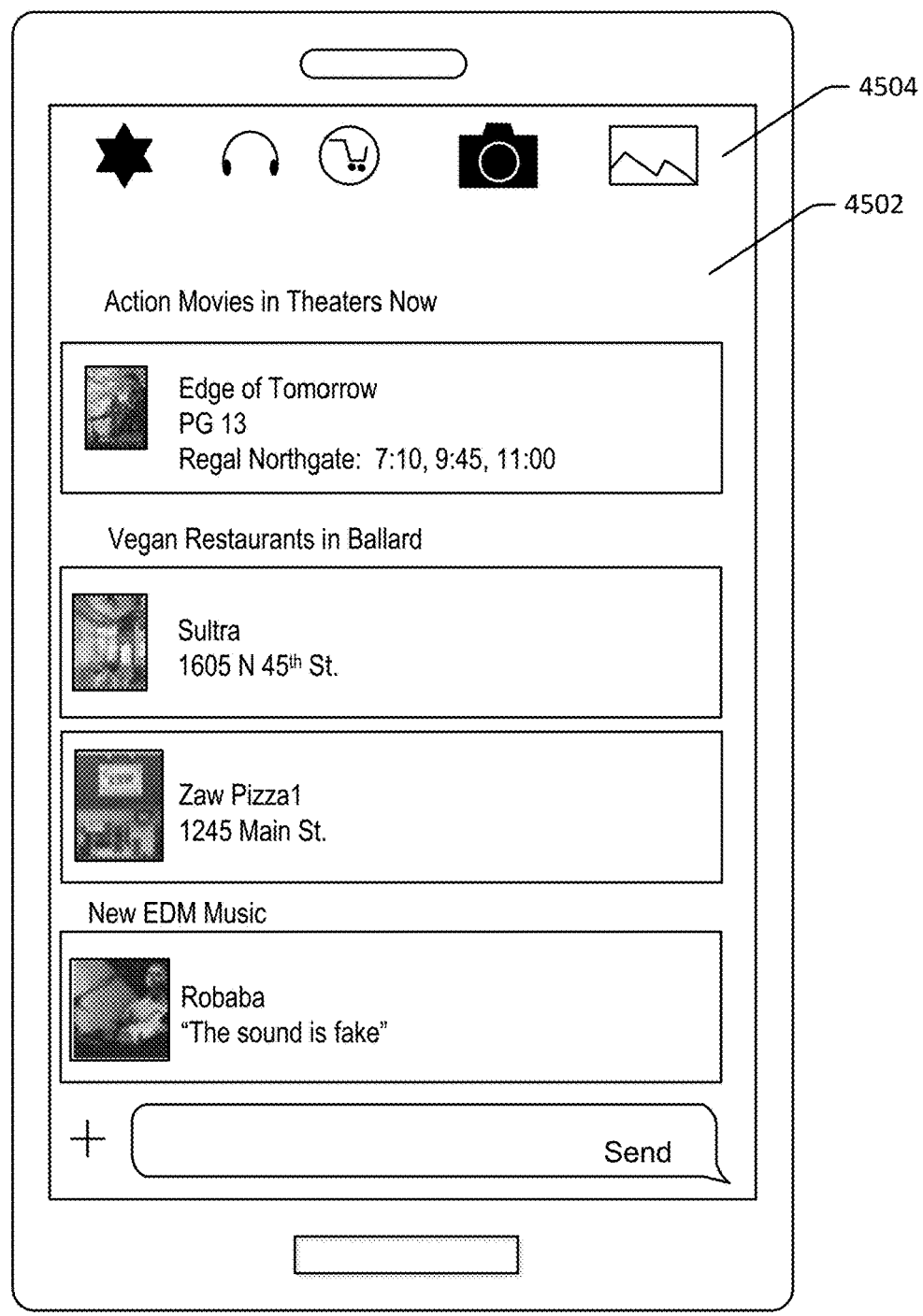

FIGS. 44-49 depict illustrative user interfaces for accessing content cards associated with different categories of application templates and inserting a selected content card associated with a particular application template category into an electronic messaging conversation in accordance with one or more example embodiments of the disclosure. Referring first to FIG. 44, the user interface 3202 (first depicted in FIG. 32) associated with the electronic messaging conversation may include a selectable widget 4402. A user selection 4404 of the selectable widget 4402 may cause a user interface 4502 to be displayed on the user device 3000, as shown in FIG. 45. The user interface 4502 may be a default user interface that displays content cards associated with different categories of content. Each such content card may include content corresponding to application input data populated in one or more application template instances. The user interface 4502 may further include a carousel 4504 that includes various selectable icons. Each selectable icon may be associated with a particular category of content cards, which in turn, may be associated with one or more application templates. For example, a set of content cards associated with restaurants may be associated with a calendar application template, a dinner reservation application template, a car service application template, and so forth. As another example, a content card containing identifying information of a showing of a particular movie may be associated with a calendar application template, a car service application template, an online movie ticket purchase application template, and so forth.

Figure 46:
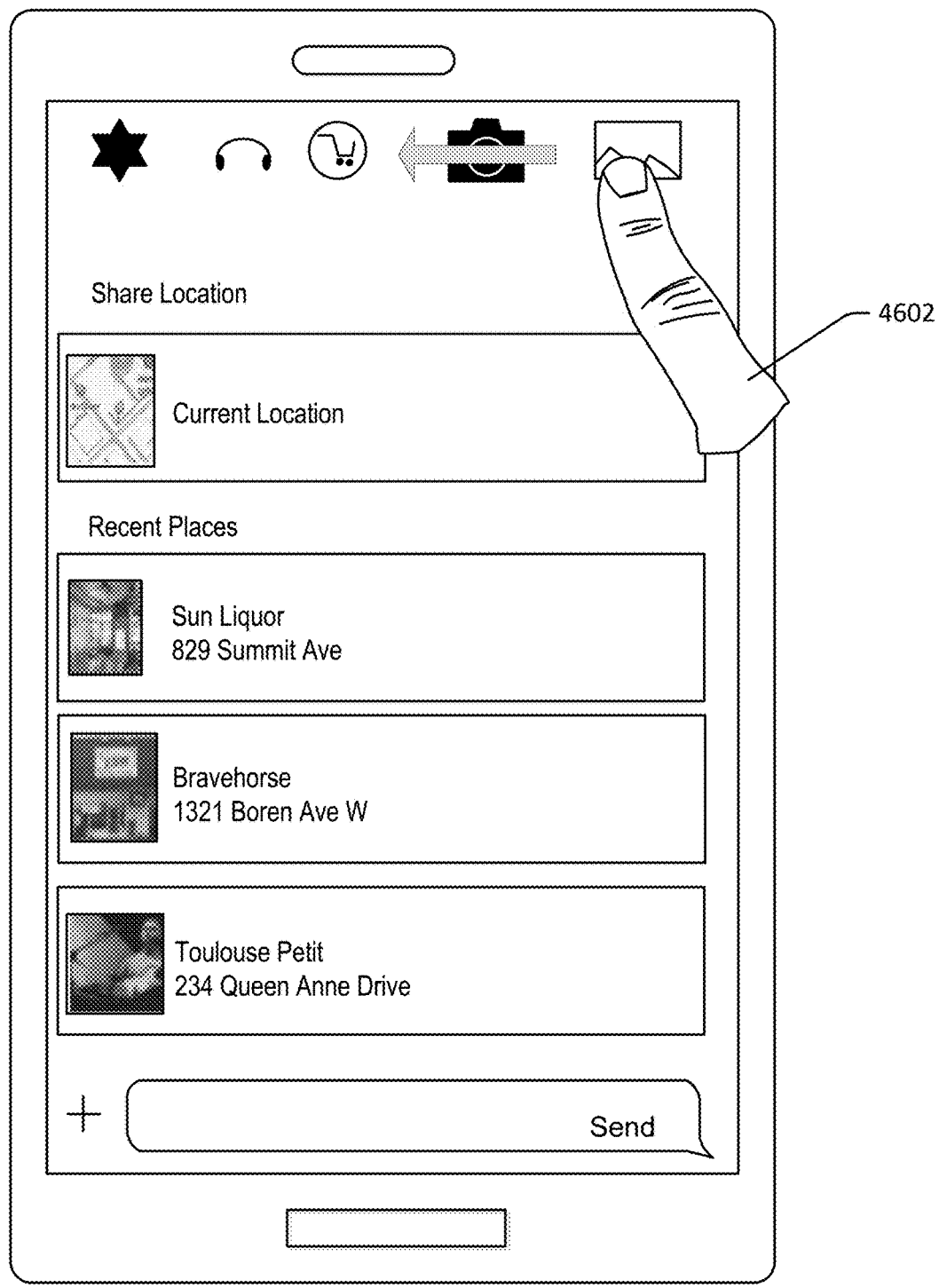
Figure 47:
Figure 48:
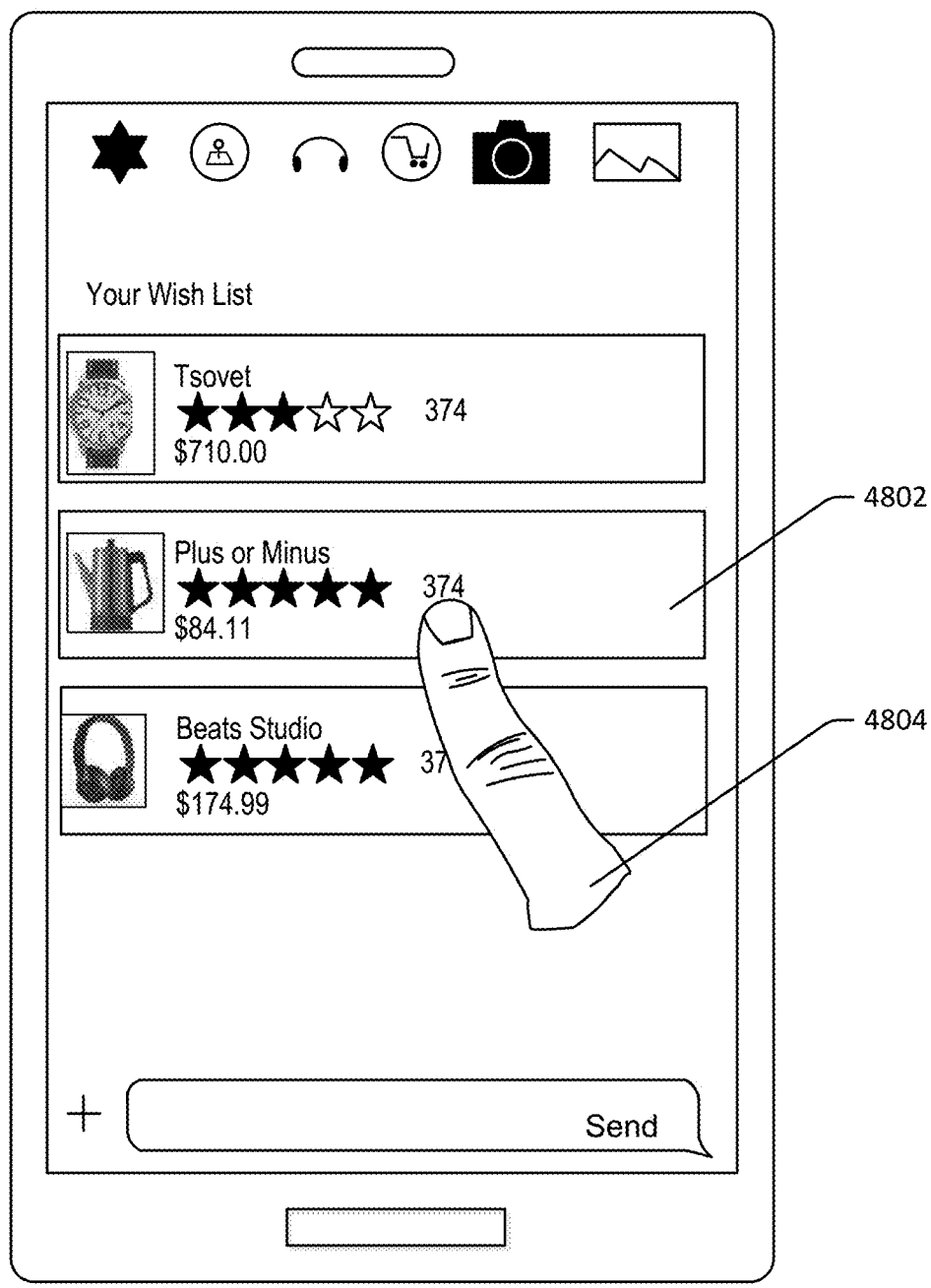
Figure 49:
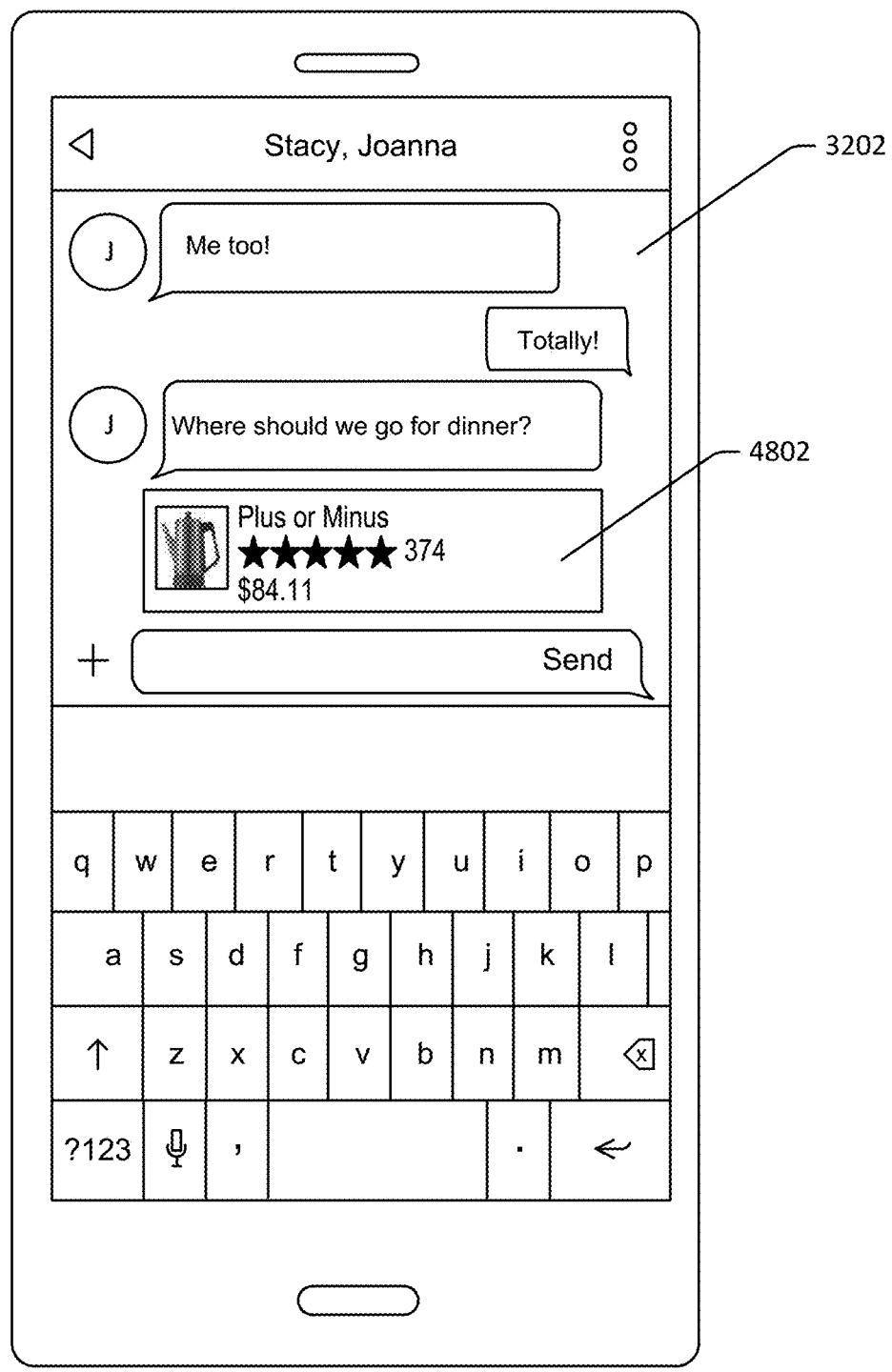

As shown in FIG. 46, a user gesture 4602 (e.g., a swipe gesture) may be applied to a touch-sensitive display of the user device 3000 to transition through the carousel 4504 and reveal additional selectable icons associated with additional categories of content cards. As shown in FIG. 47, a particular selectable icon 4702 in the carousel 4504 may be selected 4704 to cause a listing of corresponding content cards to be displayed. For example, the selectable icon 4702 may be associated with an online shopping cart or a "wishlist" and the listing of content cards may include content cards representative of products that have been added to the online shopping cart or that are included in the "wishlist." As shown in FIG. 48, a particular content card 4802 corresponding to a particular product may then be selected 4804 to cause the content card 4802 to be inserted into the electronic messaging conversation. More specifically, the selected content card 4802 may be displayed in association with the electronic message text rendered in the user interface 3202. The electronic message text may be text generated as part of electronic messages exchanged during the electronic messaging conversation. The selected content card 4802 may be rendered in a respective messaging application user interface that corresponds to the electronic messaging application and that is being displayed on each user device associated with each user profile participating in the conversation.

Figure 50:
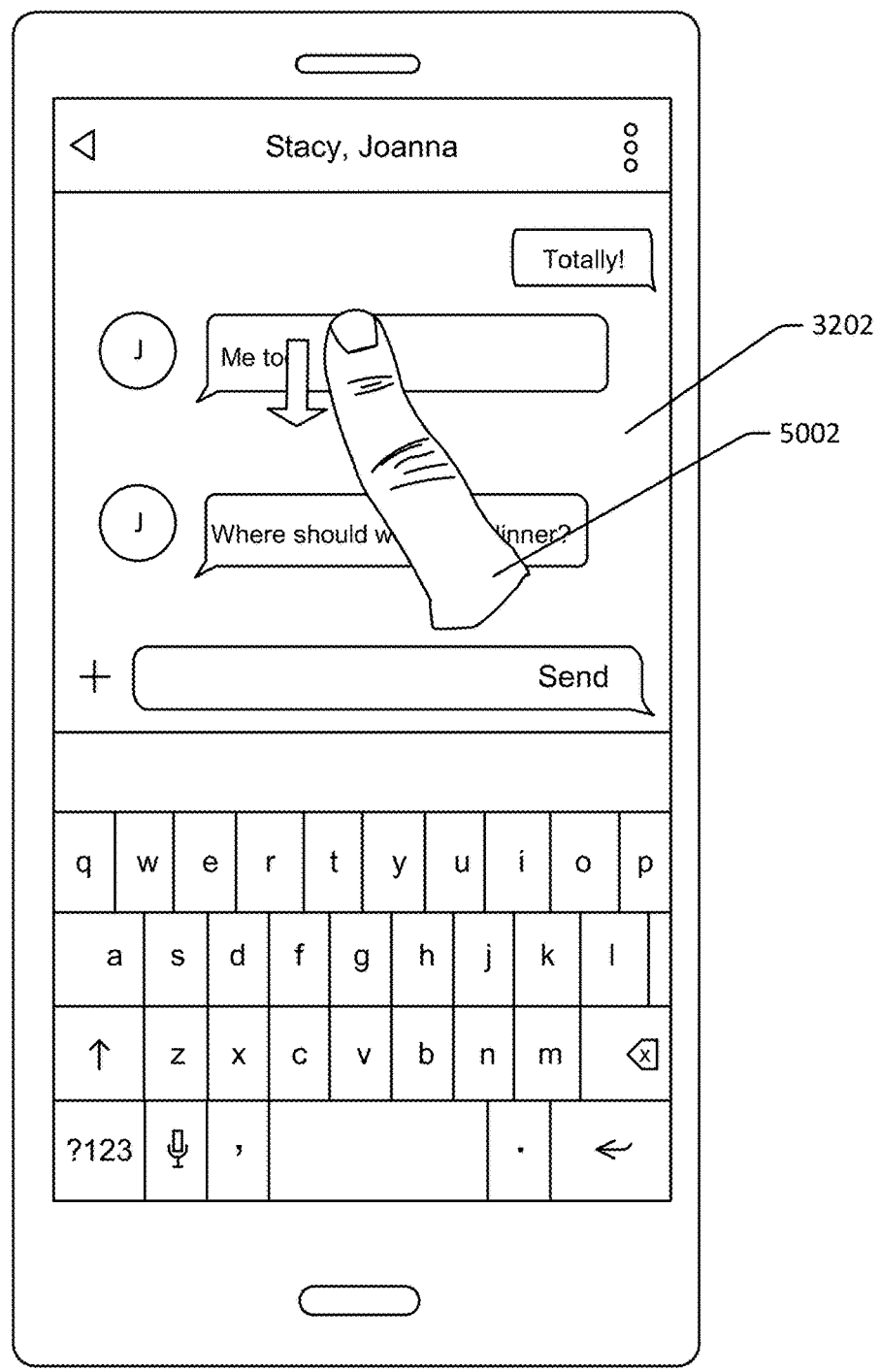
FIGS. 50-55 depict illustrative user interfaces for inputting a search string to obtain a listing of content cards that satisfy the search string and that are associated with one or more application templates in accordance with one or more example embodiments of the disclosure.
Figure 51:
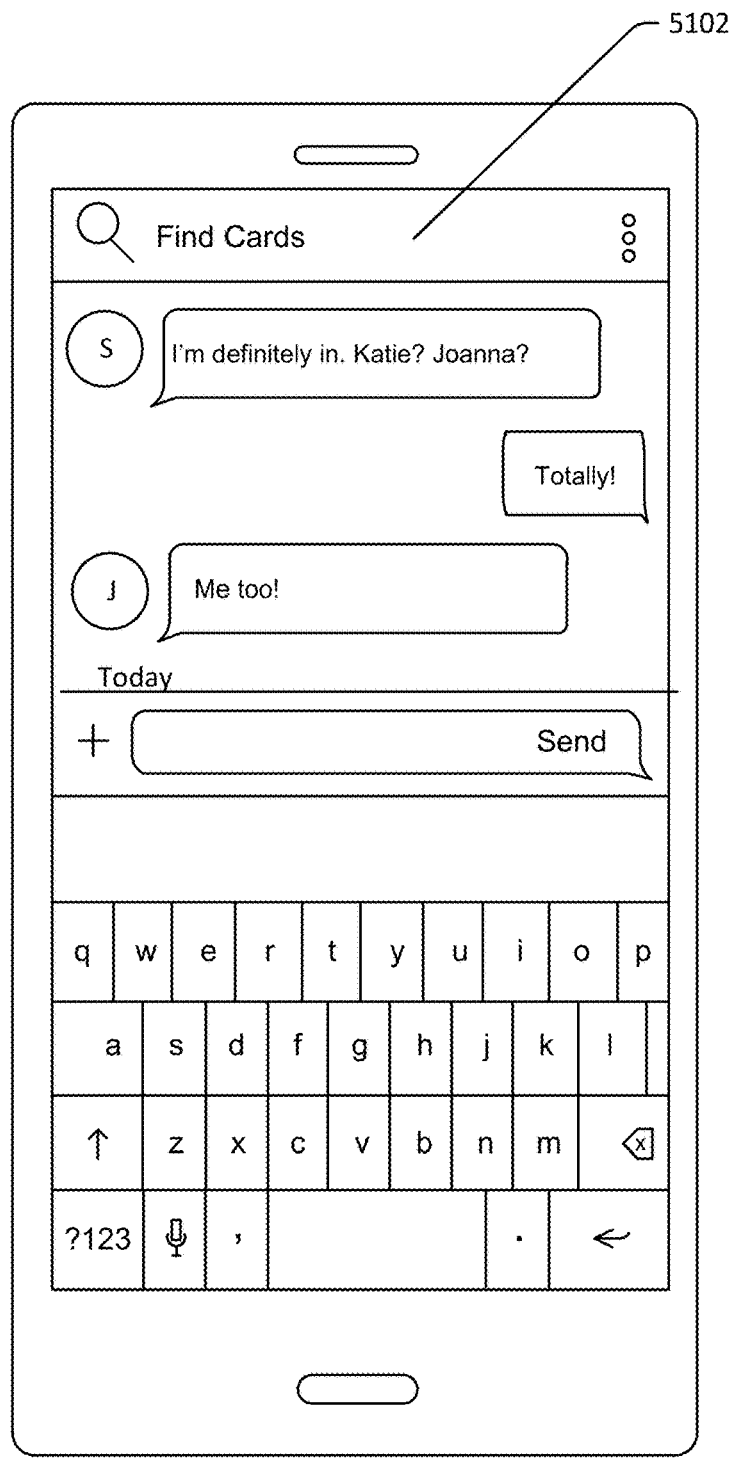
Figure 52:
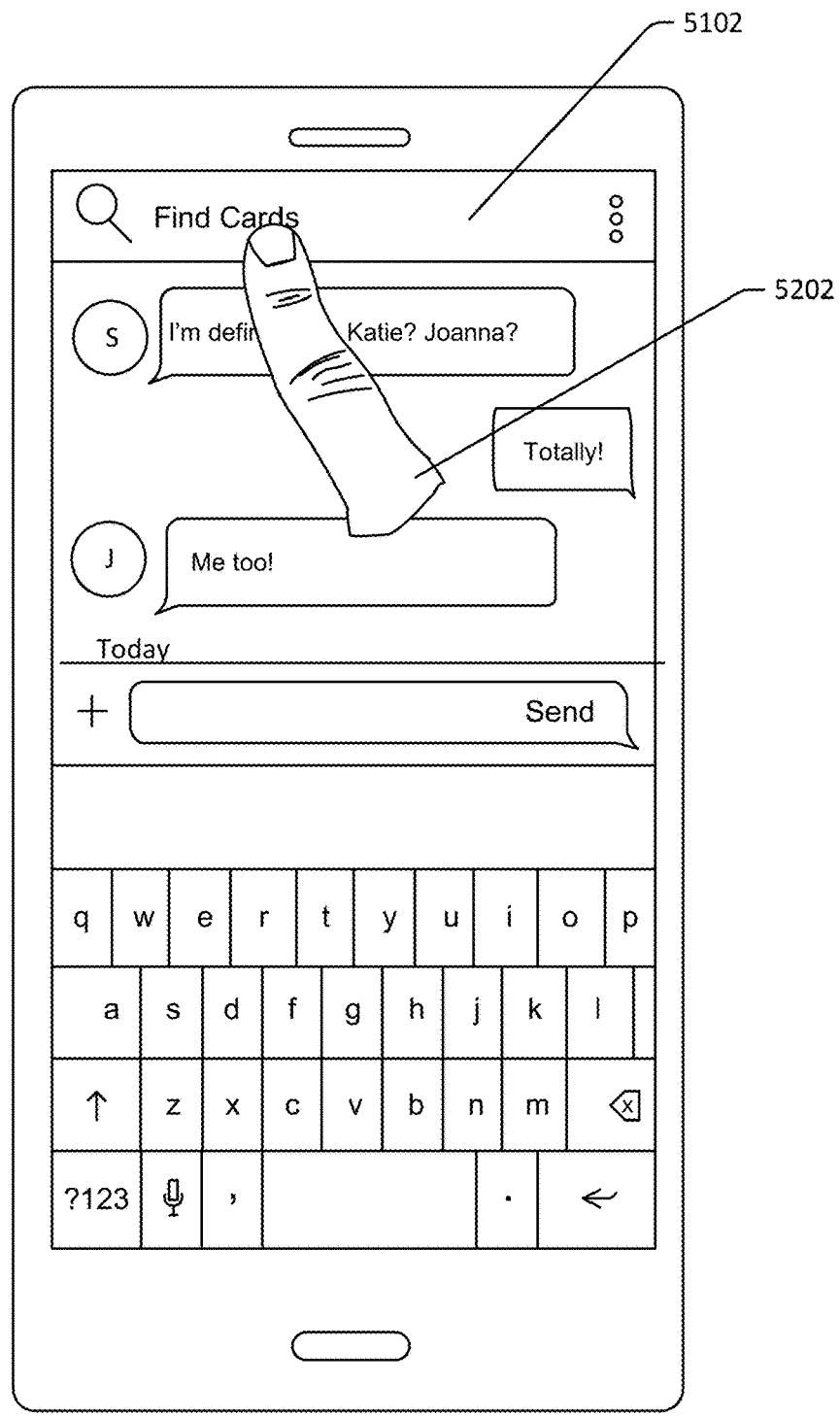
Figure 53:
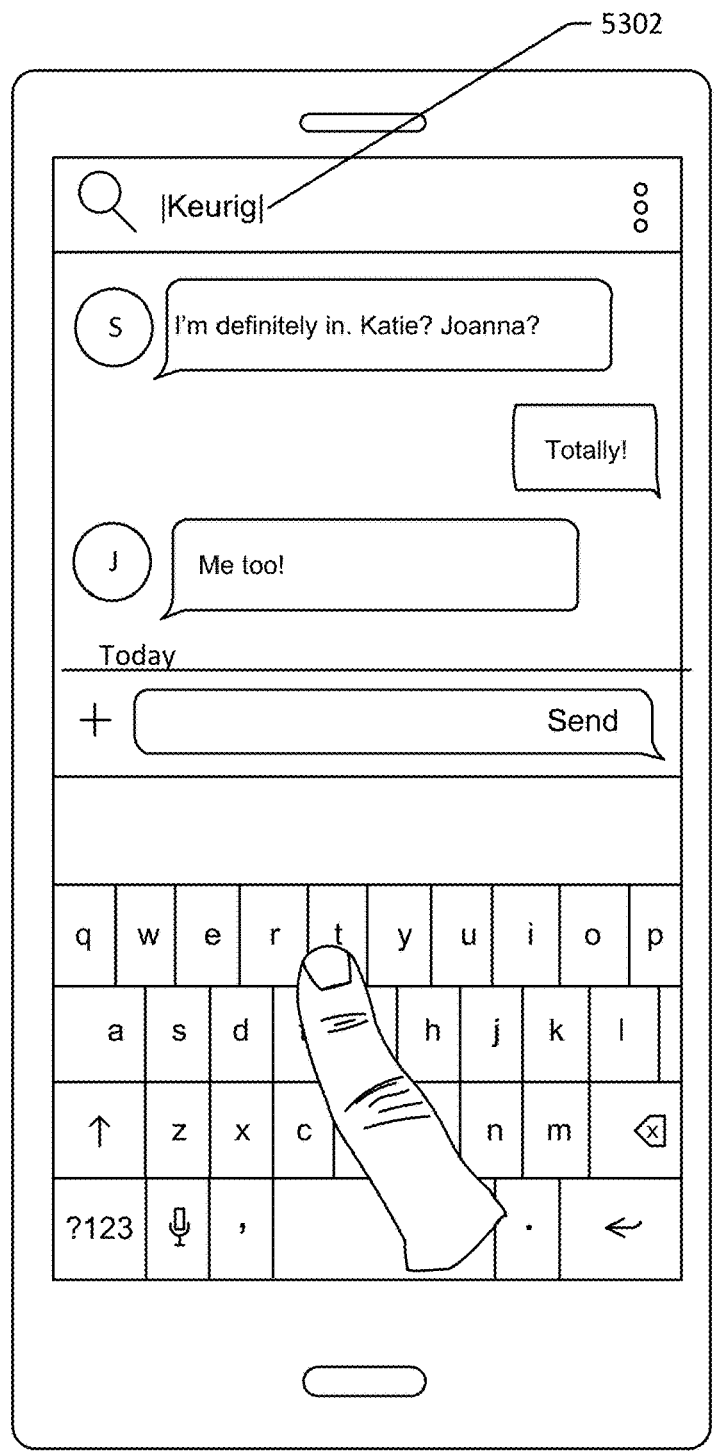

FIGS. 50-55 depict illustrative user interfaces for inputting a search string to obtain a listing of content cards that satisfy the search string and that are associated with one or more application templates in accordance with one or more example embodiments of the disclosure. As shown in FIG. 50, a user gesture 5002 (e.g., a swipe, tap, selection of a selectable widget, etc.) applied to a touch-sensitive display of the user device 3000 on which the user interface 3202 is being rendered may cause a search field 5102 to be displayed, as shown in FIG. 51. As shown in FIGS. 52-53, the search field 5102 may be selected 5202 to activate the search field 5102 and permit entry of search string 5302 in the search field 5102. The electronic messaging application may be configured to receive the search string 5302 as input and identify one or more content cards that include content that is related to the search string 5302. In certain example embodiments, content in the identified content cards may include the search string 5302 itself. In other example embodiments, metadata associated with the content cards may include one or more words in the search string 5302.

Figure 54:
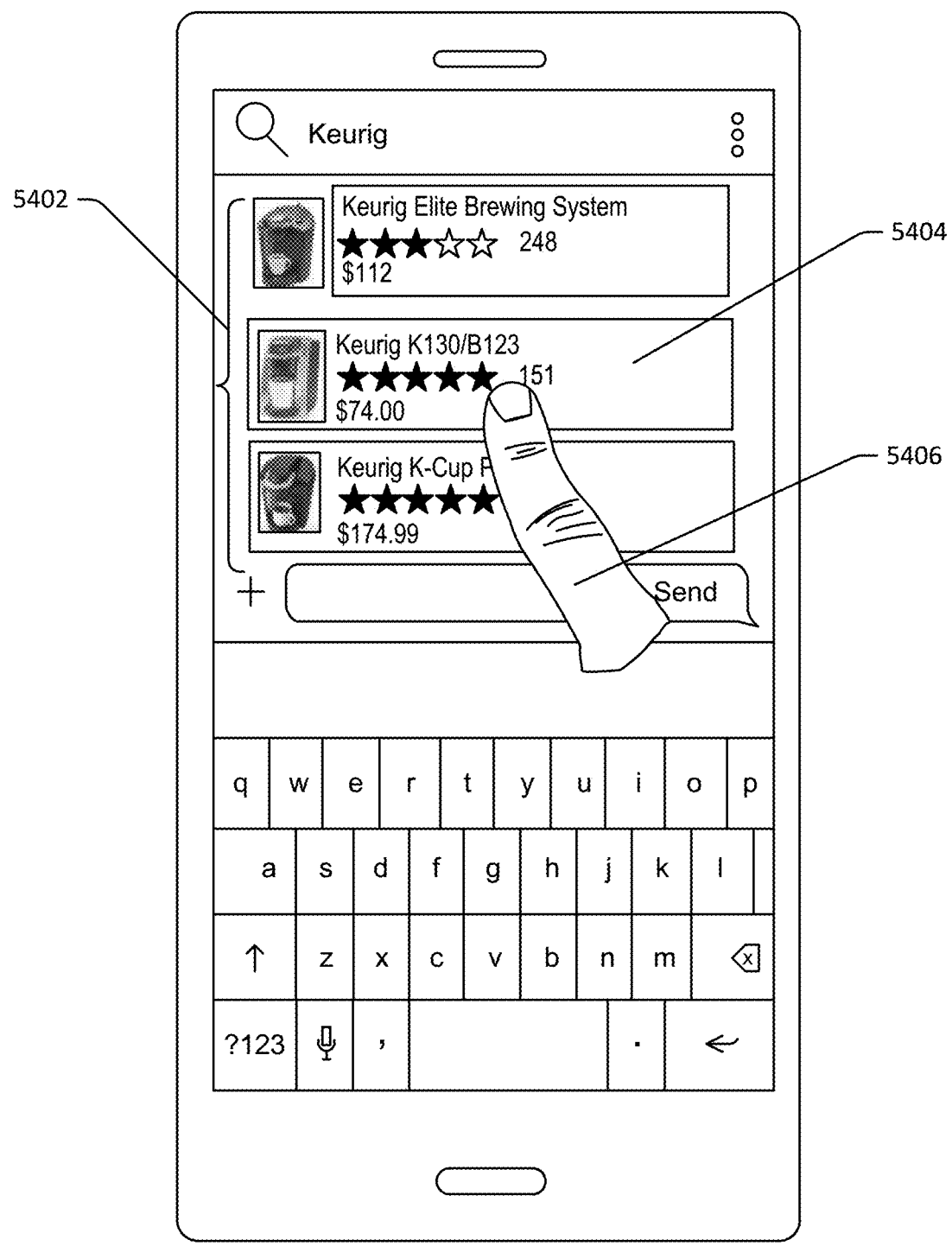
Figure 55:
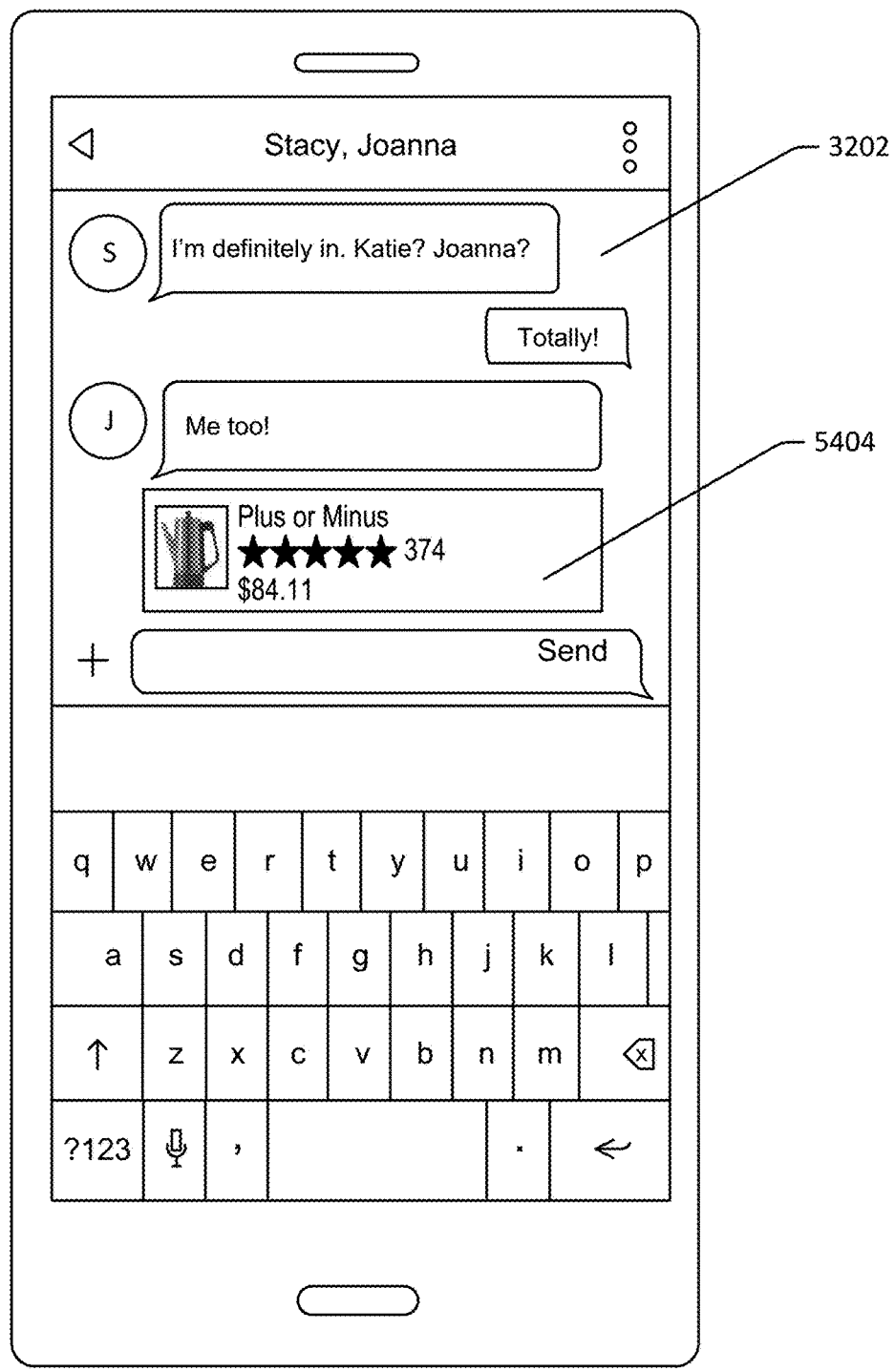

As shown in FIG. 54, a listing of the content cards 5402 identified based on the search string 5302 may be displayed. One or more content cards in the listing of content cards 5402 may include content that corresponds to application input data populated in one or more application template instances. For example, a content card in the listing of content cards 5402 may include content that is obtained from data populated in an online product order application template instance. The online product order application template instance may correspond to an online product order application template that requires a product identifier, payment information, and a delivery address as inputs in order to automatically initiate a product order. At least some of the application data corresponding to these inputs may be obtained from a user profile. Still referring to FIG. 54, a particular content card 5404 in the listing of content cards 5402 may be selected 5406 to cause the content card to be inserted into the electronic messaging conversation. For example, as shown in FIG. 55, the selected content card 5404 may be displayed in association with the electronic message text rendered in the user interface 3202. The electronic message text may be text generated as part of electronic messages exchanged during the electronic messaging conversation. The selected content card 4802 may be rendered in a respective messaging application user interface that corresponds to the electronic messaging application and that is being displayed on each user device associated with each user profile participating in the conversation.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether That which is claimed is:

1. A method comprising:
   determining, by one or more computer processors coupled to memory, a first message in an electronic message conversation associated with a user account, and sent by a first device;
   determining first contextual information using the first message;
   determining second contextual information using a second message in the electronic message conversation, the second message sent by a second device;
   determining, based at least in part on the first contextual information and the second contextual information, a list of content items associated with a first topic;
   receiving, by the first device, data indicative of a user selection of a first content item from the list of content items, the first content item comprising contextual message content;
   presenting the contextual message content in the message conversation on the first device;
   sending the contextual message content to the second device, the contextual message content configured for presentation in the message conversation on the second device;
   determining a mobile application associated with the first topic;
   generating an application template instance using content from at least one of the first message or the second message;
   presenting the application template instance in the message conversation on the first device; and
   sending the application template instance to the second device, the application template instance configured for presentation in the message conversation on the second device.

2. The method of claim 1, wherein the first message and the second message are non-consecutive messages in the electronic message conversation.

3. The method of claim 1, further comprising:
   determining that a third message is associated with a second topic; and
   determining, based at least in part on historical electronic messages, that the third message in the electronic message conversation is contextually unrelated to the second message.

4. The method of claim 1, further comprising:
   analyzing a set of historical electronic messages using semantic processing;
   determining a first subset of the set of historical electronic messages that is contextually related;
   analyzing first text of the first message using semantic processing; and
   analyzing second text of the second message using semantic processing.

5. The method of claim 1, further comprising:
   determining that the second message was received within a threshold length of time after the first message was generated.

6. The method of claim 1, wherein determining the list of content items comprises:
   determining contextual data representing at least one of: a device location, a time of day, a user activity, or a keyword present in the first message; and
   determining, based at least in part on the contextual data, that the second message in the electronic message conversation is contextually relevant to the first message.

7. A system comprising:
   memory configured to store computer-executable instructions; and
   at least one computer processor configured to access the memory and execute the computer-executable instructions to:
      determine a first message in an electronic message conversation associated with a user account;
      determine first contextual information using the first message;
      determine second contextual information using a second message in the electronic message conversation;
      determine, based at least in part on the first contextual information and the second contextual information, a list of content items associated with a first topic;
      receive data indicative of a selection of a first content item from the list of content items, the first content item comprising contextual message content;
      present the contextual message content in the message conversation on the first device;
      send the contextual message content to the second device, the contextual content configured for presentation in the message conversation on the second device;
      determine a mobile application associated with the first topic;
      generate an application template instance using content from at least one of the first message or the second message;
      present the application template instance in the message conversation on the first device; and
      send the application template instance to the second device, the application template instance configured for presentation in the message conversation on the second device.

8. The system of claim 7, wherein the first message and the second message are non-consecutive messages in the electronic message conversation.

9. The system of claim 7, wherein the at least one processor is further configured to access the memory and execute the computer-executable instructions to:
   determine that a third message is associated with a second topic; and
   determine, based at least in part on a set of historical electronic messages, that the third message in the electronic message conversation is contextually unrelated to the second message.

10. The system of claim 7, wherein the at least one processor is further configured to access the memory and execute the computer-executable instructions to:
    analyze a set of historical electronic messages using semantic processing;
    determine a first subset of the set of historical electronic messages that is contextually related;
    analyze first text of the first message using semantic processing; and
    analyze second text of the second message using semantic processing.

11. The system of claim 7, wherein the at least one processor is further configured to access the memory and execute the computer-executable instructions to:
determine that the second message was received within a threshold length of time after the first message was generated.

12. The system of claim 7, wherein the at least one processor is configured to determine the list of content items by executing the computer-executable instructions to:
determine contextual data representing at least one of: a device location, a time of day, a user activity, or a keyword present in the first message; and
determine, based at least in part on the contextual data, that the second message in the electronic message conversation is contextually relevant to the first message.

13. A method comprising:
receiving, by a first user device, a first electronic message comprising first message content;
determining first contextual information from the first message content;
determining that the first contextual information corresponds to a first topic;
sending a second electronic message comprising second message content;
determining second contextual information from the second message content;
determining, based at least in part on first contextual information and the second contextual information a list of content items;
receiving, by the first device, data indicative of a selection of a first content item from the list of content items, the first content item comprising contextual message content;
presenting the contextual message content in the message conversation on the first device;
sending the contextual message content to a second device, the contextual content configured for presentation in the message conversation on the second device;
determining a mobile application associated with the first topic;
generating an application template instance using content from at least one of the first message or the second message;
presenting the application template instance in the message conversation on the first user device; and
sending the application template instance to the second device, the application template instance configured for presentation in the message conversation on the second device.

14. The method of claim 13, further comprising:
determining that the first topic corresponds to a second mobile application; and
generating a second application template instance for the second mobile application using content from at least one of: the first message or the second message.

15. The method of claim 13, further comprising:
determining that the first topic corresponds to a first mobile application comprises determining, based at least in part on historical contextual data, that the first topic corresponds to a first mobile application.

16. The method of claim 13, wherein the first message and the second message are non-consecutive messages in an electronic message conversation.

* * * * *